US009562965B2

(12) United States Patent
Georgy et al.

(10) Patent No.: US 9,562,965 B2
(45) Date of Patent: Feb. 7, 2017

(54) TWO-STAGE FILTERING BASED METHOD FOR MULTIPLE TARGET TRACKING

(76) Inventors: Jacques Georgy, Calgary (CA); Aboelmagd Noureldin, Kingston (CA)

( * ) Notice: Subject to any disclaimer, the term of this patent is extended or adjusted under 35 U.S.C. 154(b) by 611 days.

(21) Appl. No.: 14/115,287

(22) PCT Filed: May 4, 2011

(86) PCT No.: PCT/CA2011/000519
§ 371 (c)(1),
(2), (4) Date: Feb. 4, 2014

(87) PCT Pub. No.: WO2012/149624
PCT Pub. Date: Nov. 8, 2012

(65) Prior Publication Data
US 2014/0372073 A1 Dec. 18, 2014

(51) Int. Cl.
G01C 17/00 (2006.01)
G01S 7/41 (2006.01)
G01S 5/02 (2010.01)
G01S 13/72 (2006.01)
G01S 15/66 (2006.01)
G01S 7/539 (2006.01)

(52) U.S. Cl.
CPC .............. *G01S 7/418* (2013.01); *G01S 5/0294* (2013.01); *G01S 7/539* (2013.01); *G01S 13/726* (2013.01); *G01S 15/66* (2013.01)

(58) Field of Classification Search
CPC ...... G01S 13/726; G01S 15/66; G01S 5/0294; G01S 7/418; G01S 7/539
See application file for complete search history.

(56) References Cited

U.S. PATENT DOCUMENTS 5,706,010 A * 1/1998 Franke .................... G01S 5/12
342/13
8,131,239 B1 * 3/2012 Walker .................. G01S 7/021
340/10.42

OTHER PUBLICATIONS

Jin Wei; Xudong Wang; Syrrnos, V.L.; , "Multi-target tracking in a two-tier hierarchical architecture," Information Fusion, 2008 11th International Conference on, pp. 1-8, Jun. 30, 2008-Jul. 3, 2008 Jun. 3, 2008.
Jing Wang; Hong Man; Yafeng Yin;, "Multitarget tracking using Gaussian Process Dynamical Model particle filter," Image Processing, 2008. ICIP 2008. 15th IEEE International Conference on, pp. 1580-1583, Oct. 12-15, 2008 Oct. 15, 2008.

(Continued)

*Primary Examiner* — Elias Desta
(74) *Attorney, Agent, or Firm* — Marsh Fischmann & Breyfogle LLP; Jonathan A. Szumny

(57) ABSTRACT

A two-filter based method of detecting and tracking a target that can track an unknown and time-varying number of targets, while keeping continuous track, even in scenarios with large number of false contacts or missing measurements, is provided. More specifically, a first filter provides target detection, a second filter provides target tracking of the detected targets, and a clustering technique that operates after the first filter. The first filter starts with a uniform distribution over the surveillance area and resets periodically after the clustering technique is run. When the clustering technique runs, it detects the clusters corresponding to the different targets and passes them to the second filter that tracks these targets.

11 Claims, 99 Drawing Sheets

A flow chart diagram demonstrating one iteration of the presented method.

(56) References Cited

OTHER PUBLICATIONS

Jungen Zhang; Hongbing Ji, "A Novel Multitarget Tracking Algorithm Based on Fuzzy Clustering Technique and Gaussian Particle Filter," Information Engineering and Computer Science, 2009. ICIECS 2009. International Conference on, pp. 1-4, Dec. 19-20, 2009 Dec. 20, 2009.

Atia, M.M.; Georgy, J.; Korenberg, M.J.; Noureldin, A.; , "Real-time implementation of mixture particle filter for 30 RISS/GPS integrated navigation solution," Electronics Letters, vol. 46, No. IS, pp. 1083-1084, Jul. 22, 2010 Jul. 22, 2010.

Georgy, J.; Noureldin, A.; Bayoumi, M., "Mixture Particle Filter for Low Cost INS/Odometer/GPS Integration in Land Vehicles," Vehicular Technology C-0nference, 2009. VTC Spring 2009. IEEE 69th, pp. 1-5, Apr. 26-29, 2009 Apr. 29, 2009.

Georgy, J.; Noureldin, A.; Mellema, G.; , "Clustered Mixture Particle Filter for Underwater Multitarget Tracking in Multistatic Active Sonobuoy Systems," Systems, Man, and Cybernetics, Part C: Applications and Reviews, IEEE Transactions on , vol. PP, No. 99, pp. 1-14, Jun. 16, 2011 Jun. 19, 2011.

"Clustered Mixture Particle Filter for Underwater Multitarget Tracking in Multistatic Active Sonobuoy Systems" (IEEE Transactions on Systems, Man, Cybernetics, Part C: Applications and Reviews, vol. 42, No. 4, Jul. 2012, p. 547) Jul. 2012.

\* cited by examiner

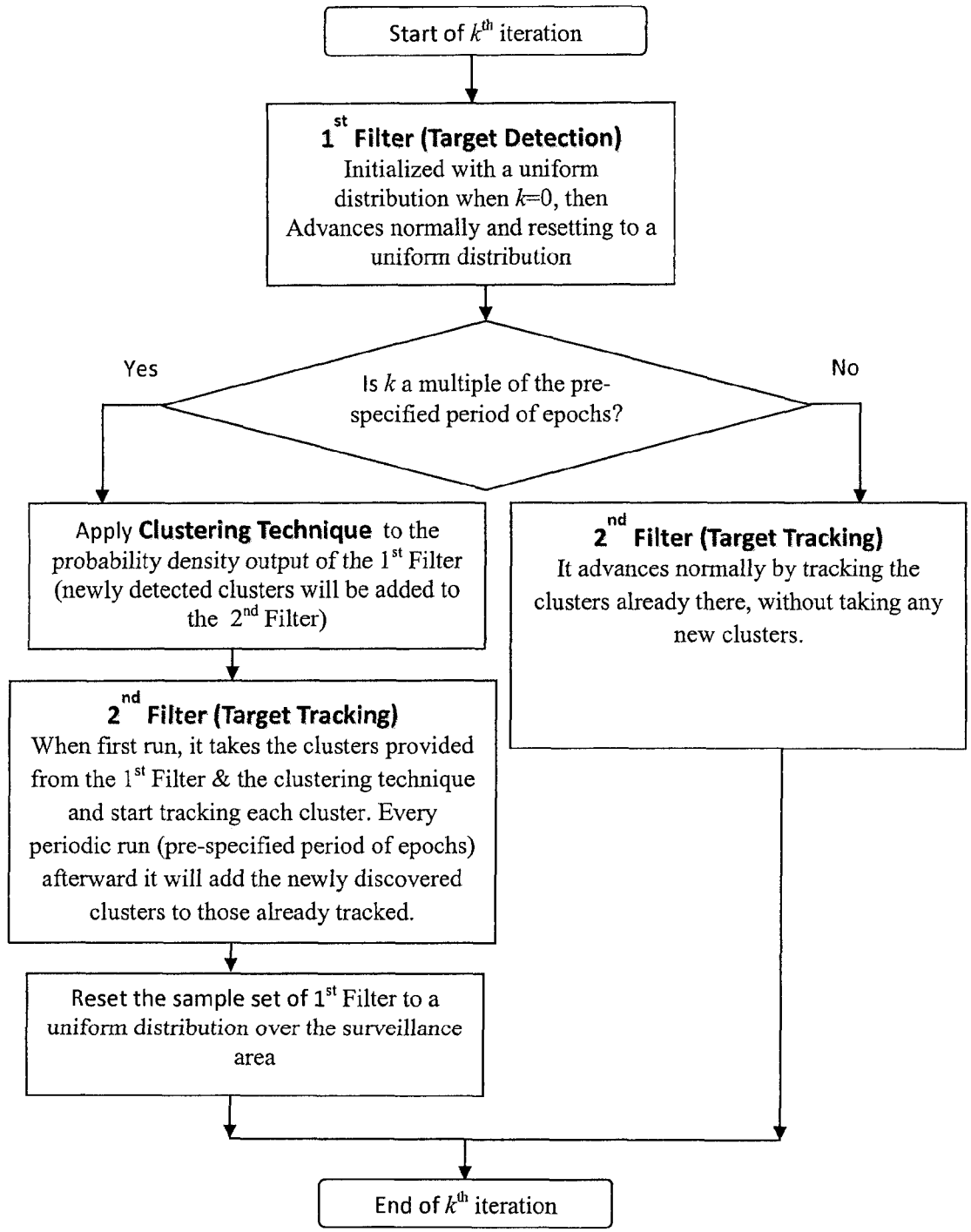
Figure 1: A flow chart diagram demonstrating one iteration of the presented method.

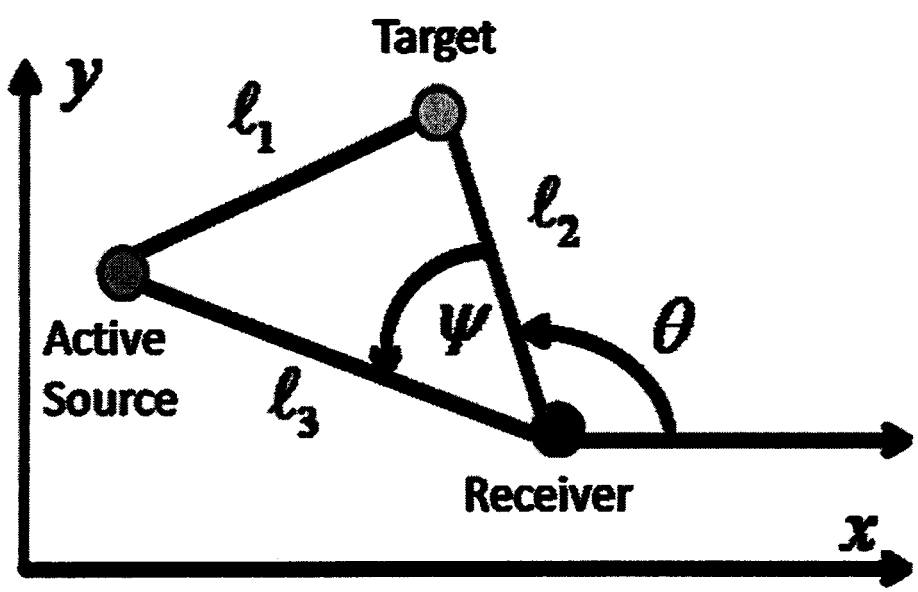
Figure 2: An example of source-receiver-target geometry in an active system.

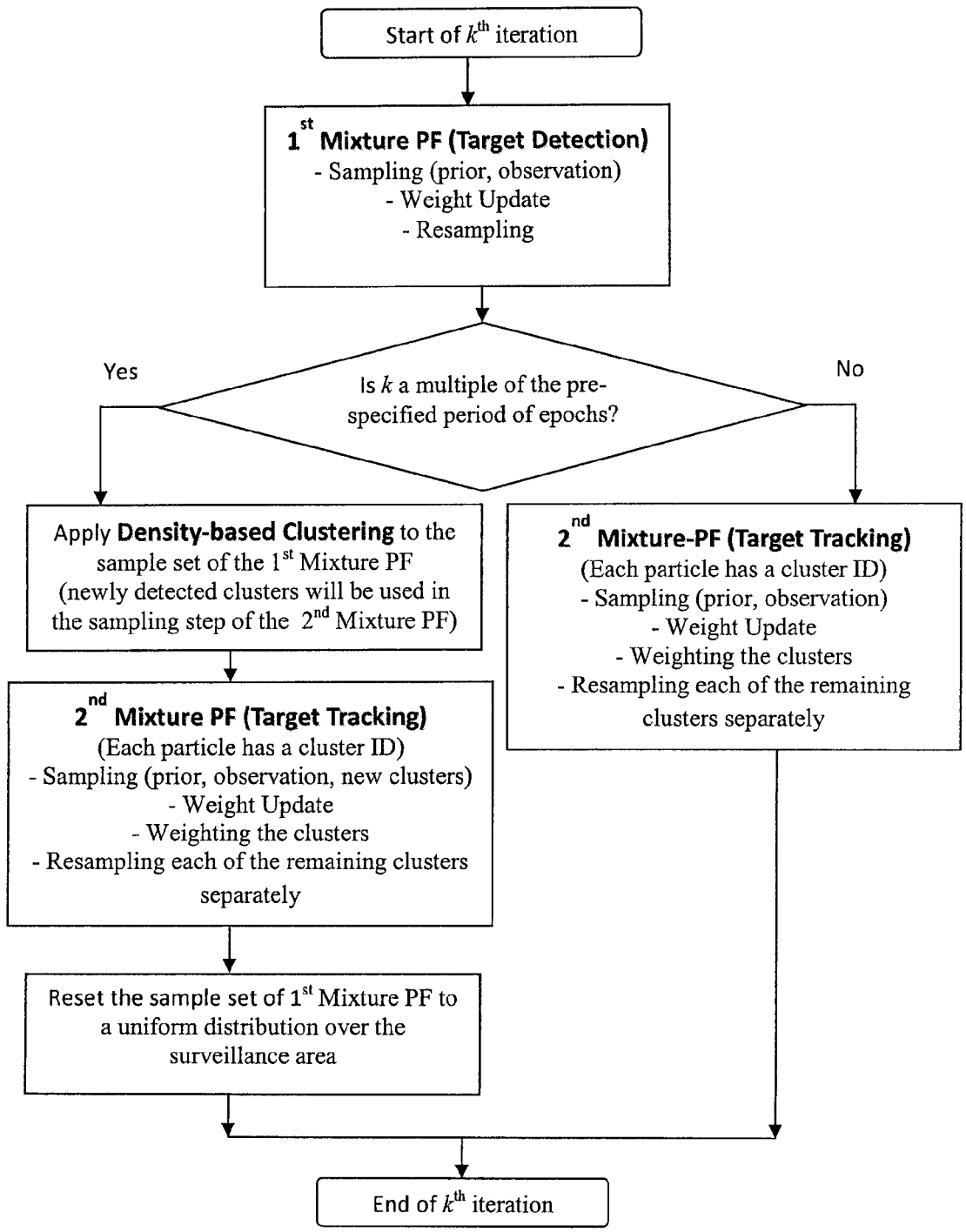
Figure 3: A flow chart diagram demonstrating one iteration of the Clustered Mixture PF algorithm of Example 1 and 2.

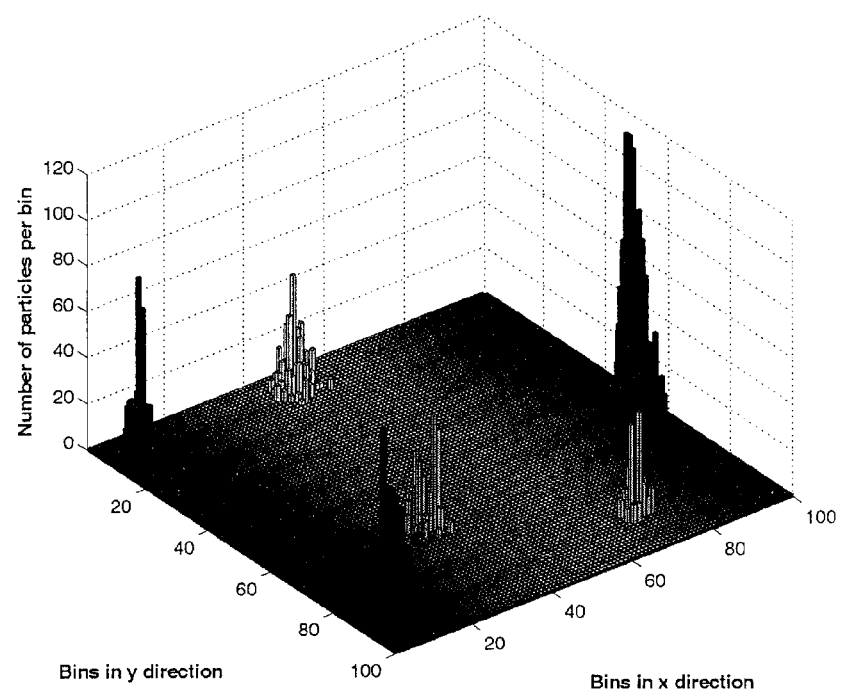
Figure 4: An example of a two dimensional histogram of particles showing six clusters corresponding to six targets.

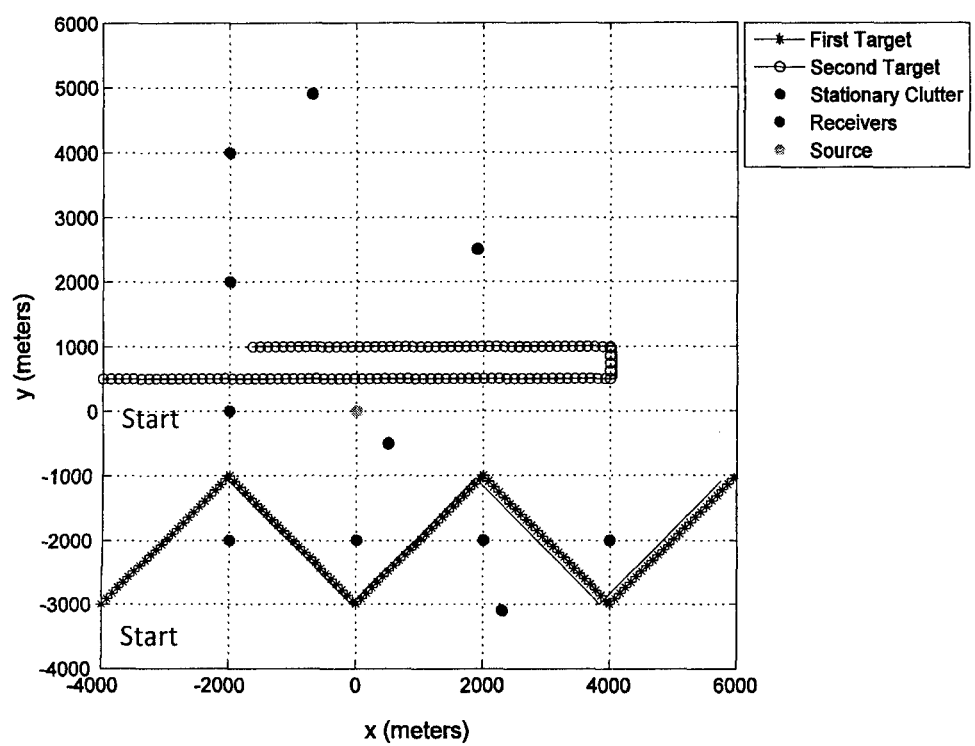
Figure 5: First simulated scenario, the active buoy is in green and the seven receivers are in red.

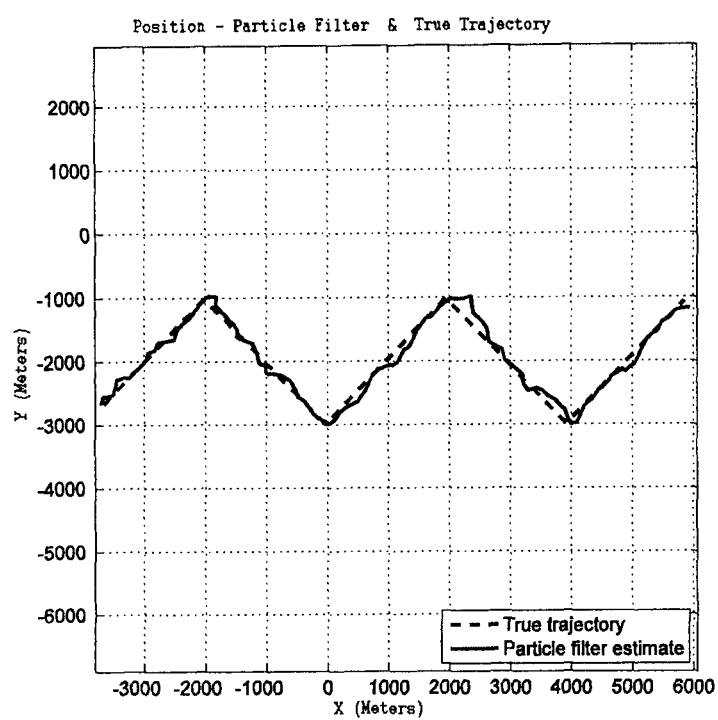
Figure 6: Estimated target track for the first target in the first scenario.

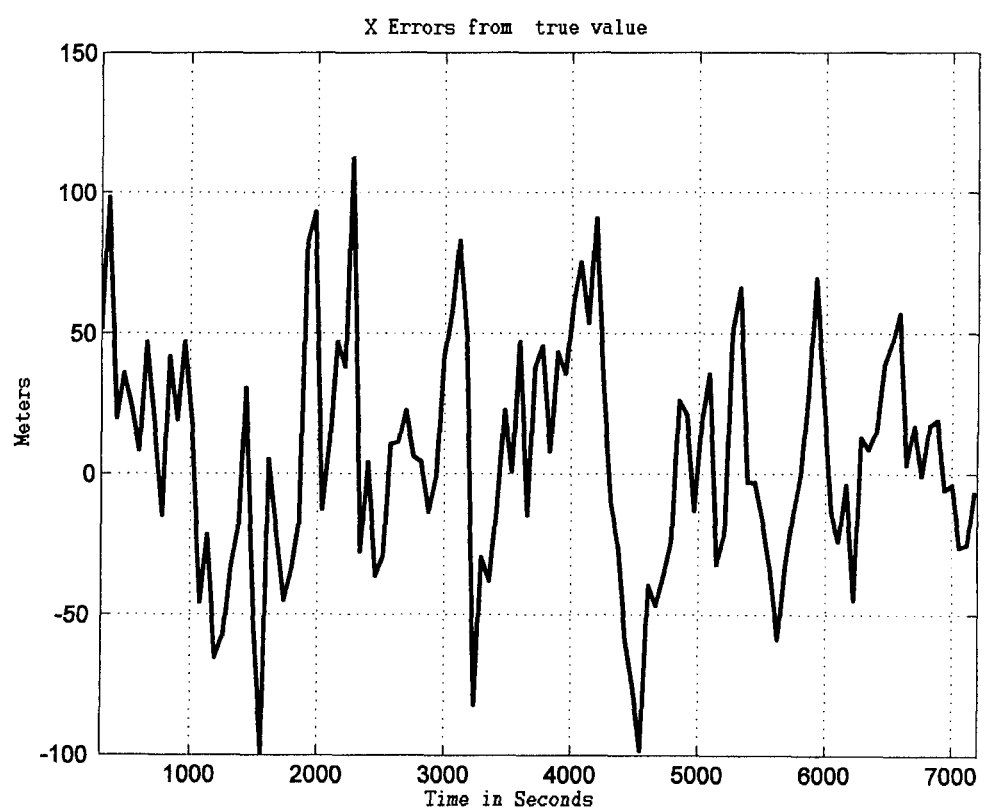
Figure 7: Position error along X direction for the first target of the first scenario.

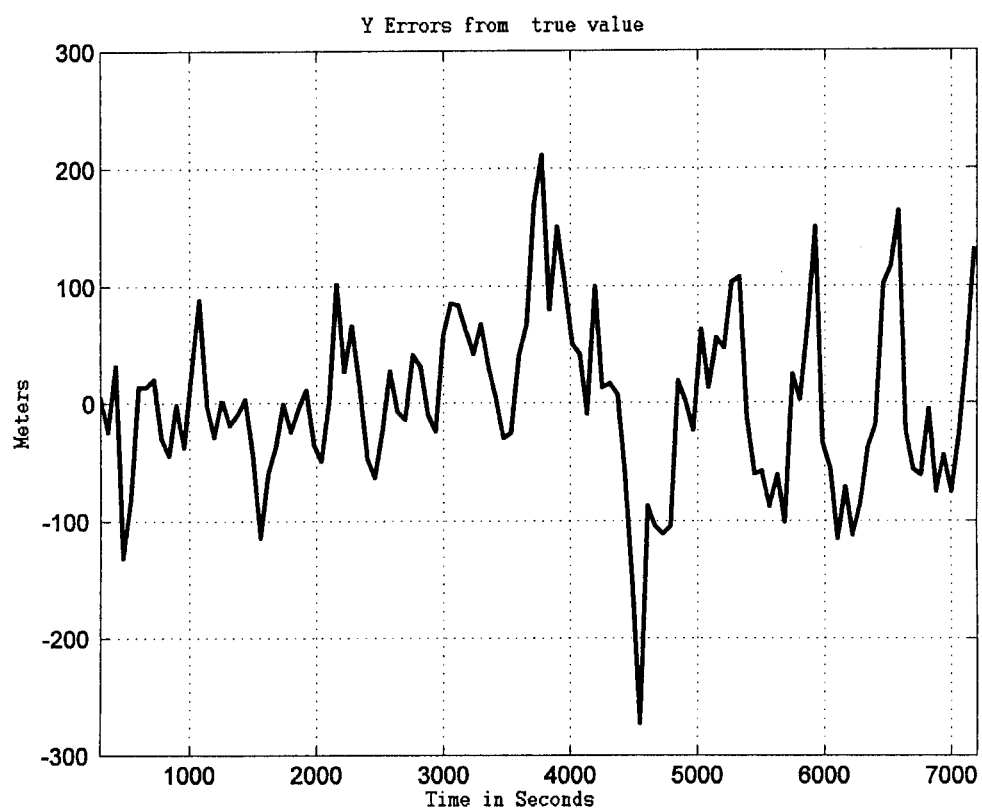
Figure 8: Position error along Y direction for the first target of the first scenario.

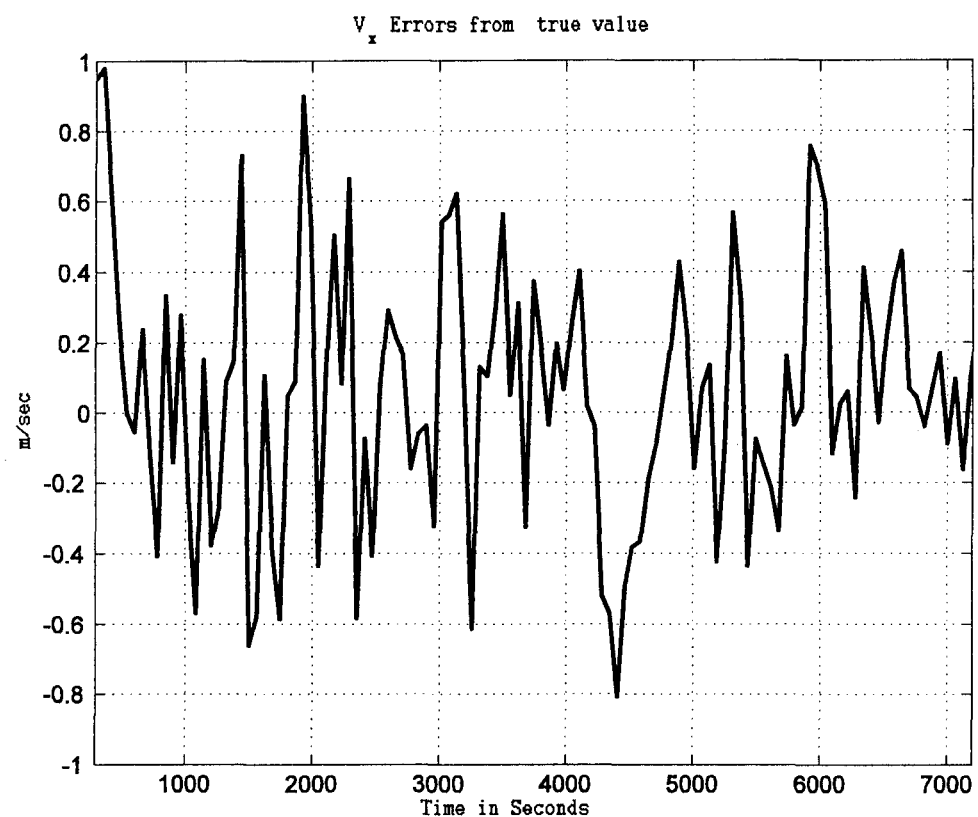
Figure 9: Velocity error along X direction for the first target of the first scenario.

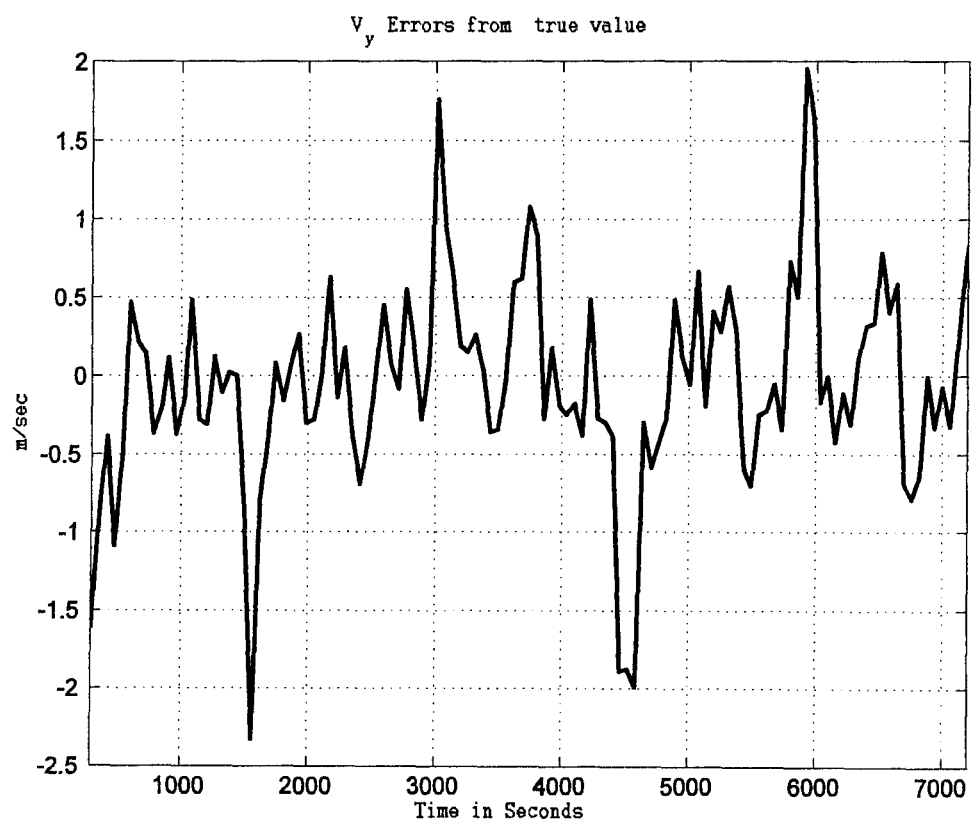
Figure 10: Velocity error along Y direction for the first target of the first scenario.

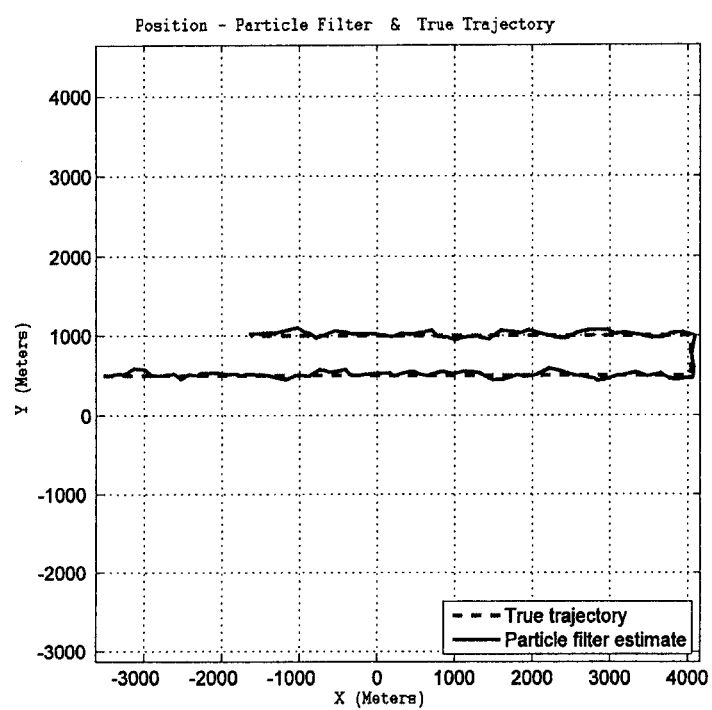
Figure 11: Estimated target track for the second target in the first scenario.

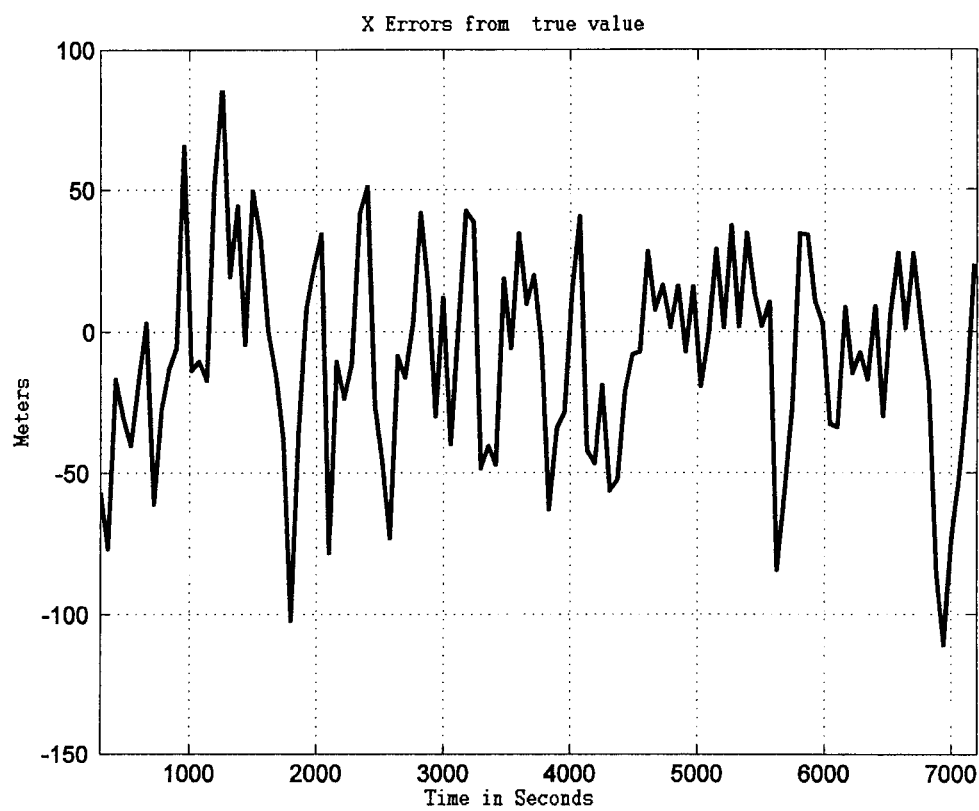
Figure 12: Position error along X direction for the second target of the first scenario.

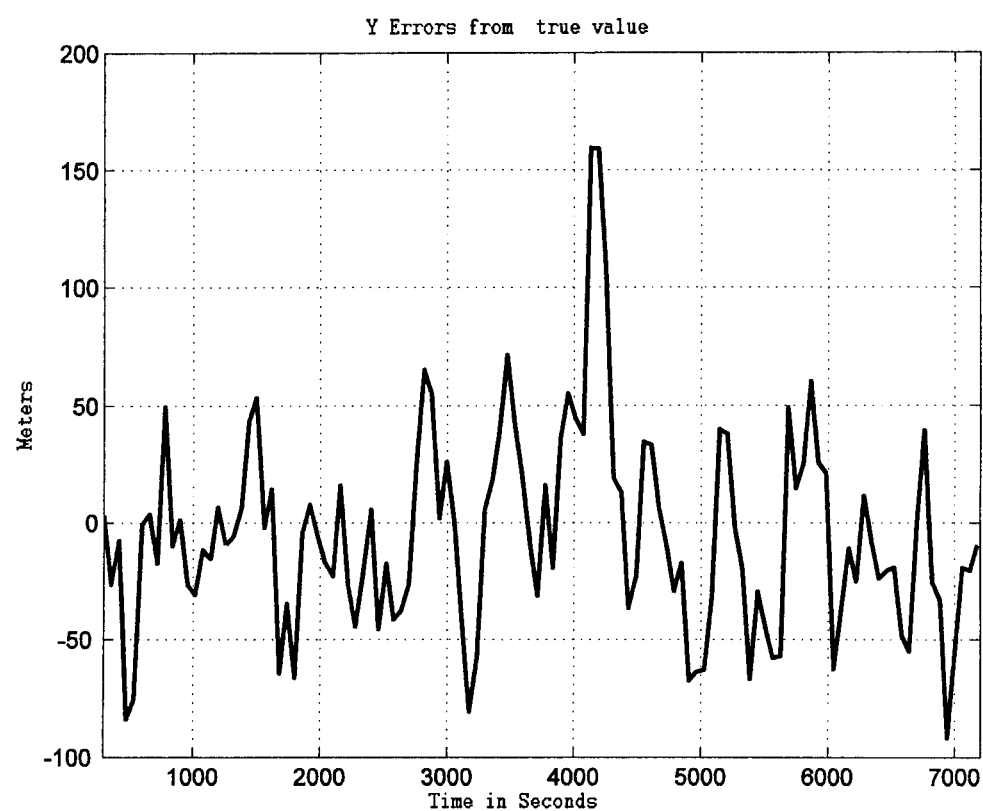
Figure 13: Position error along Y direction for the second target of the first scenario.

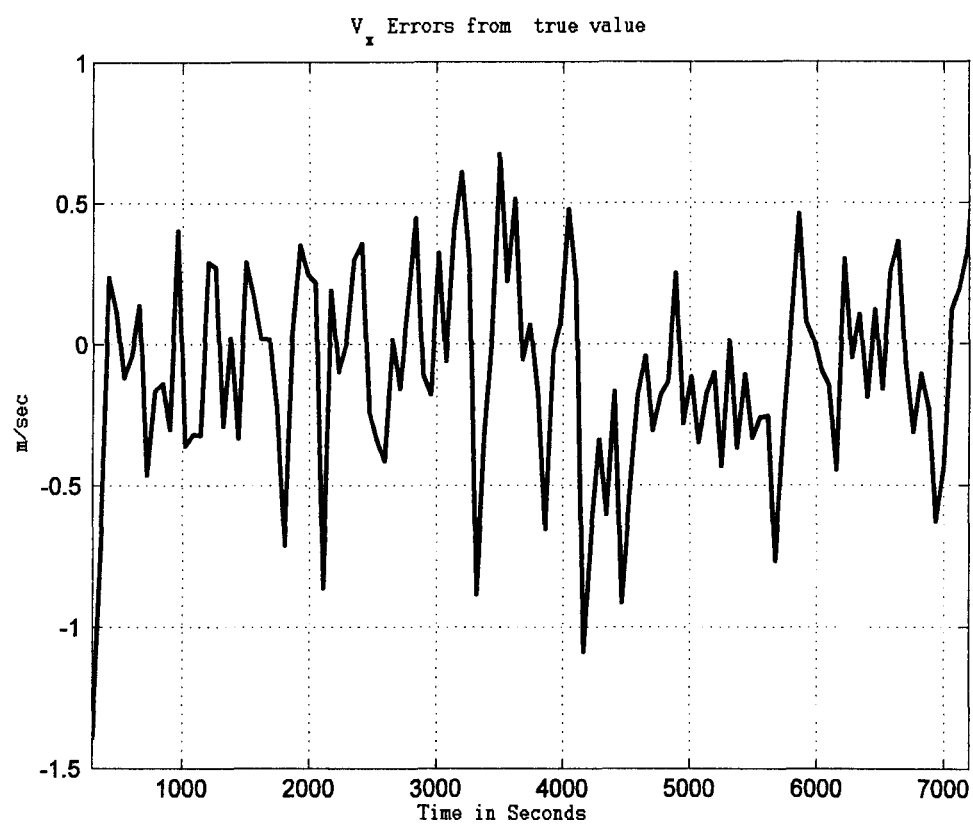
Figure 14: Velocity error along X direction for the second target of the first scenario.

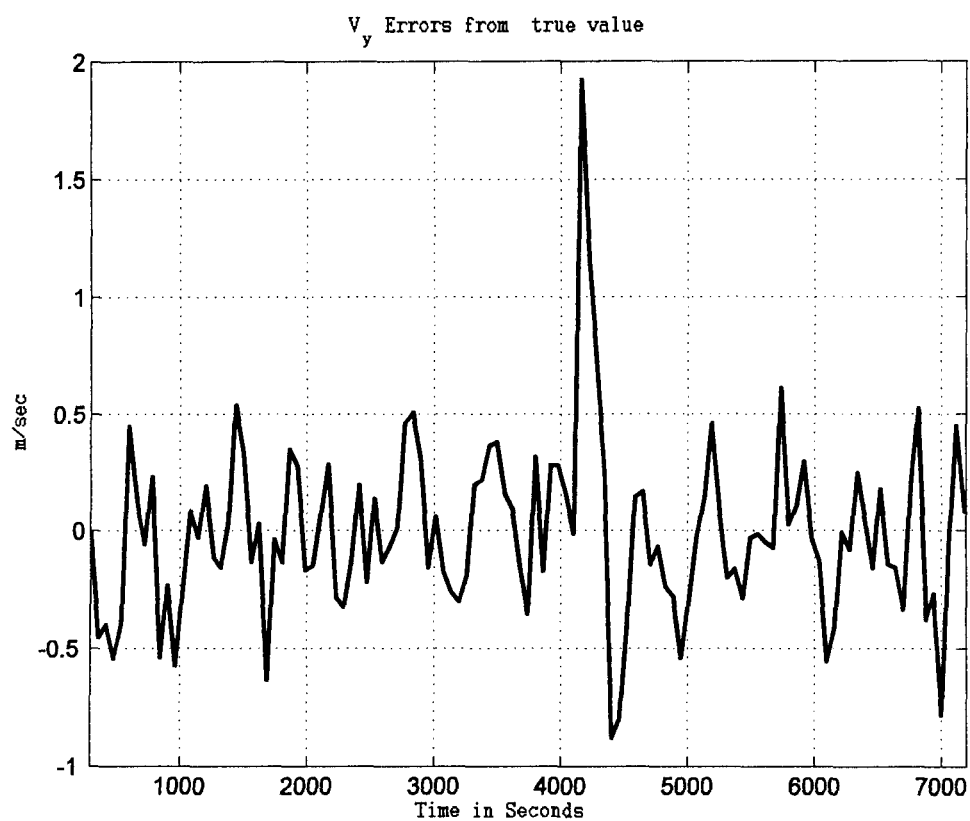
Figure 15: Velocity error along Y direction for the second target of the first scenario.

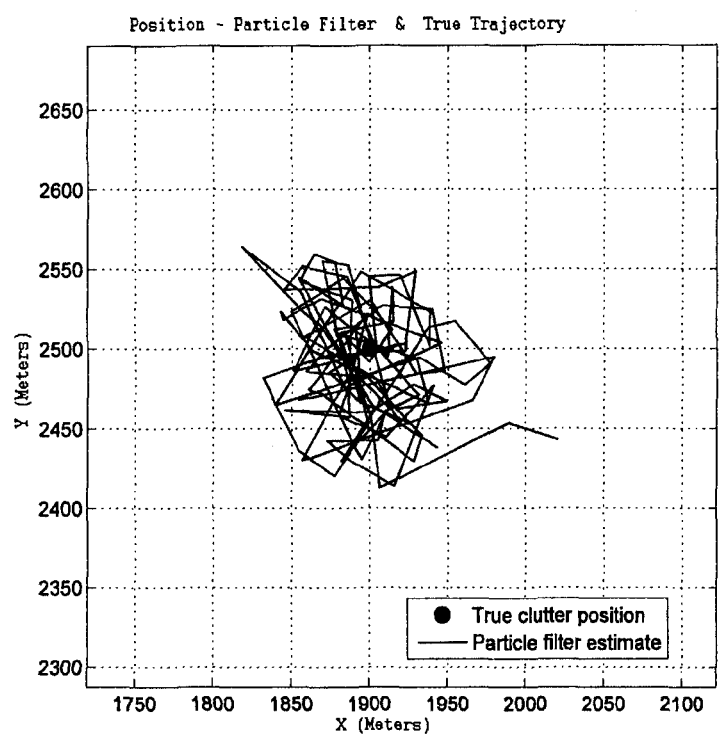
Figure 16: Estimated target track for the third target in the first scenario (i.e. the first stationary clutter) showing the noise in estimation as compared to the true location.

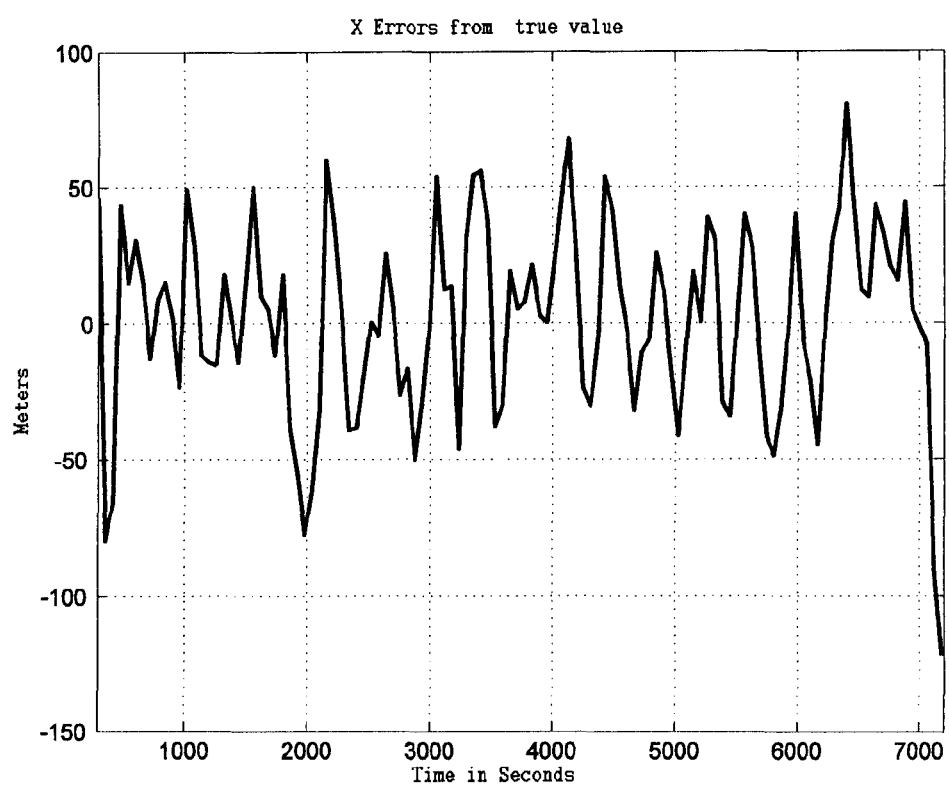
Figure 17: Position error along X direction for third target in the first scenario (i.e. the first stationary clutter).

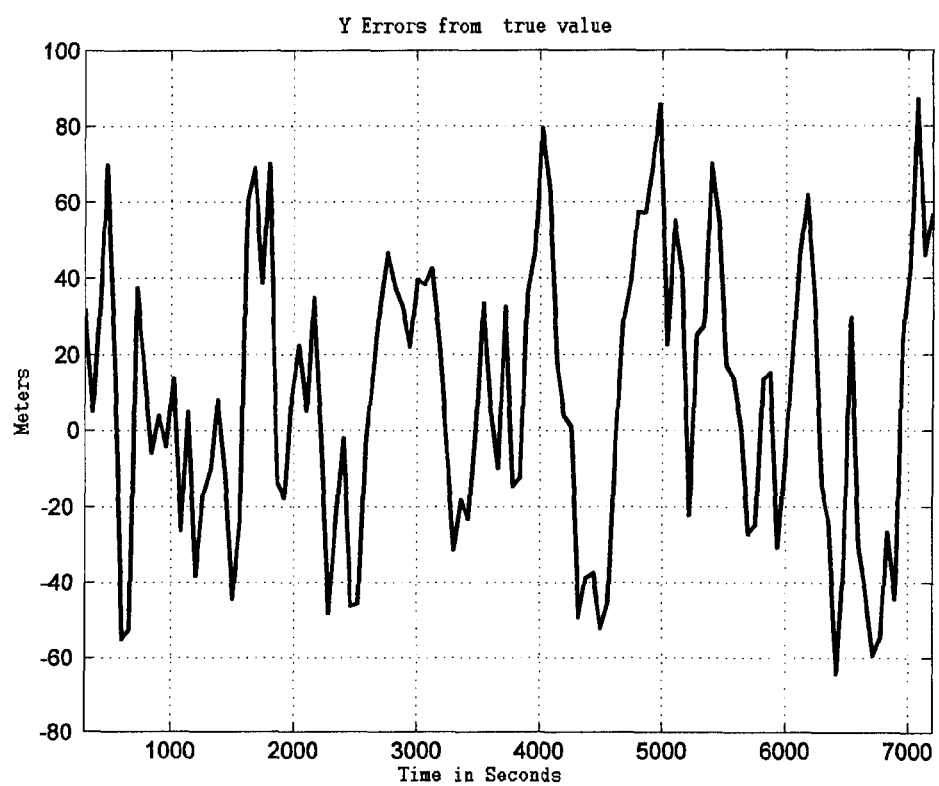
Figure 18: Position error along Y direction for third target in the first scenario (i.e. the first stationary clutter).

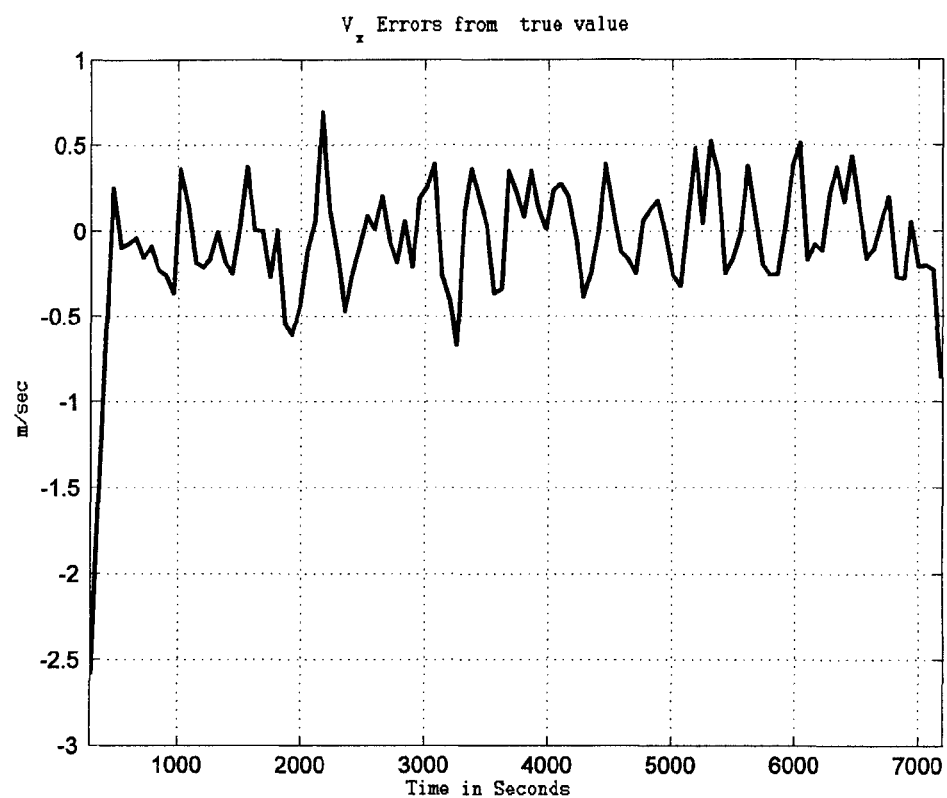
Figure 19: Velocity error along X direction third target in the first scenario (i.e. the first stationary clutter).

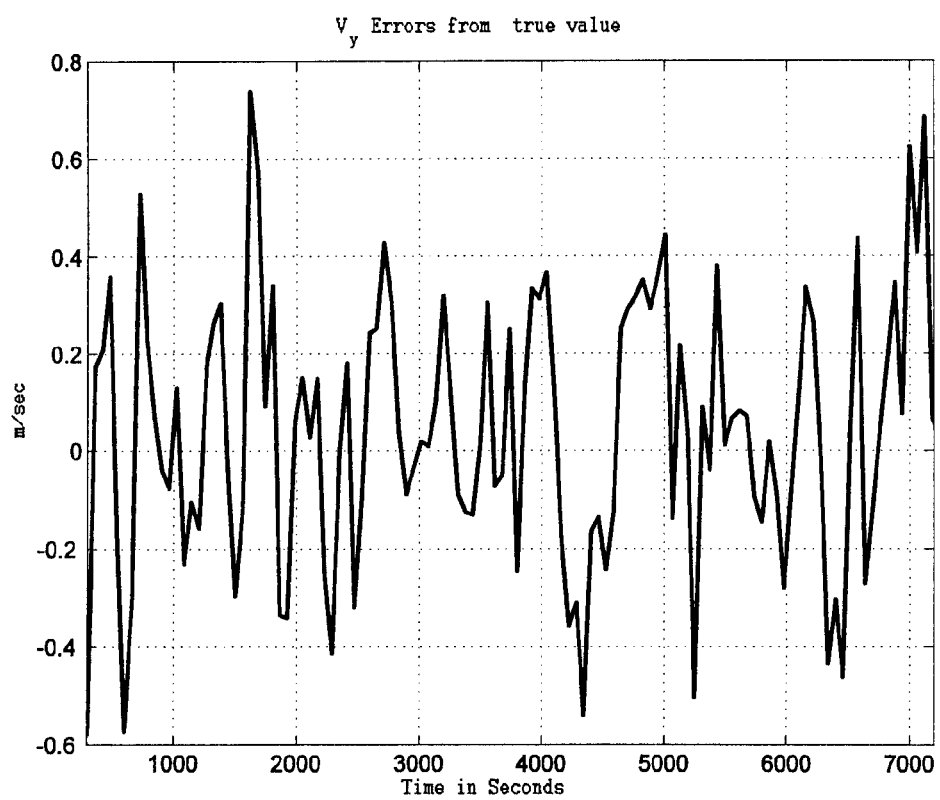
Figure 20: Velocity error along Y direction for third target in the first scenario (i.e. the first stationary clutter).

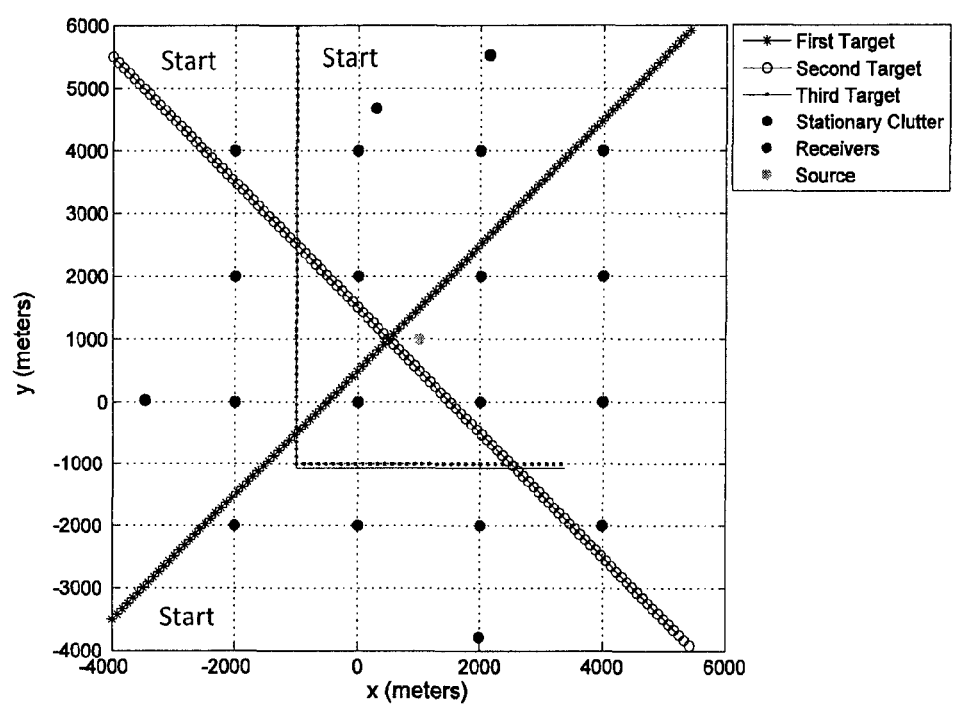
Figure 21: Second simulated scenario having three moving targets with two crossing each other and one starting later, the active buoy is in green and the sixteen receivers are in red.

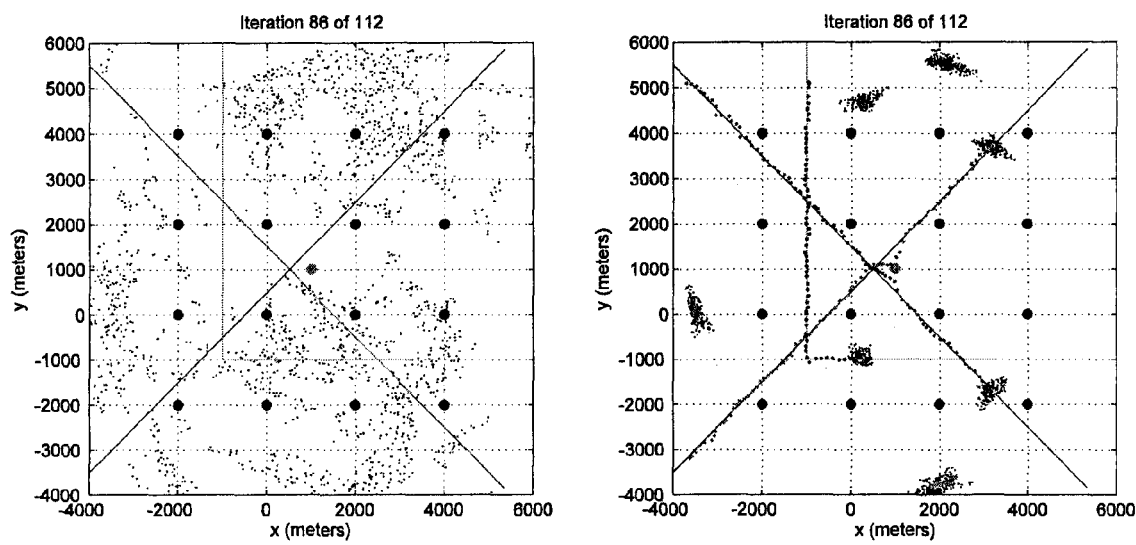
Figure 22: A snapshot from the results of the two filters during the second simulated scenario. In left figure the current moving target locations are in green and stationary clutters are in orange, the seven corresponding clusters of particles can be seen in the right figure.

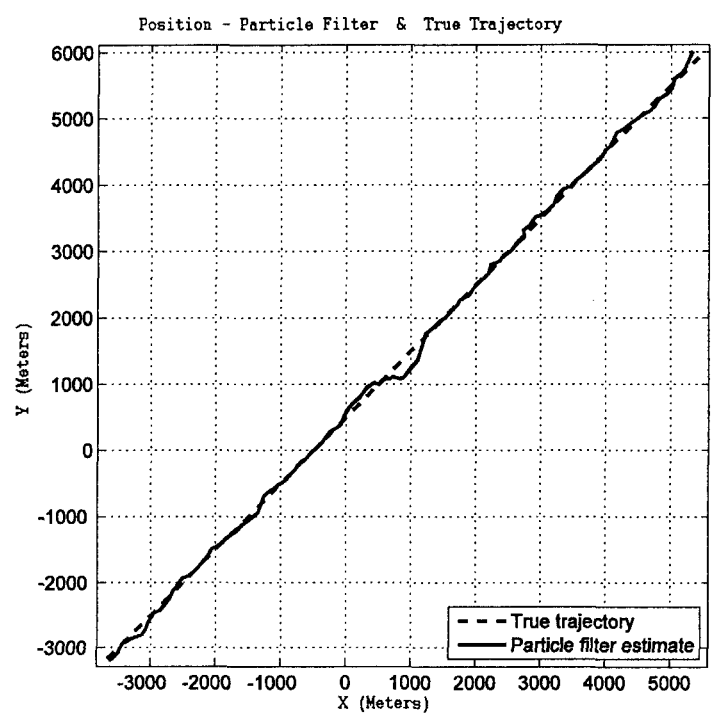
Figure 23: Estimated target track for the first target in the second scenario.

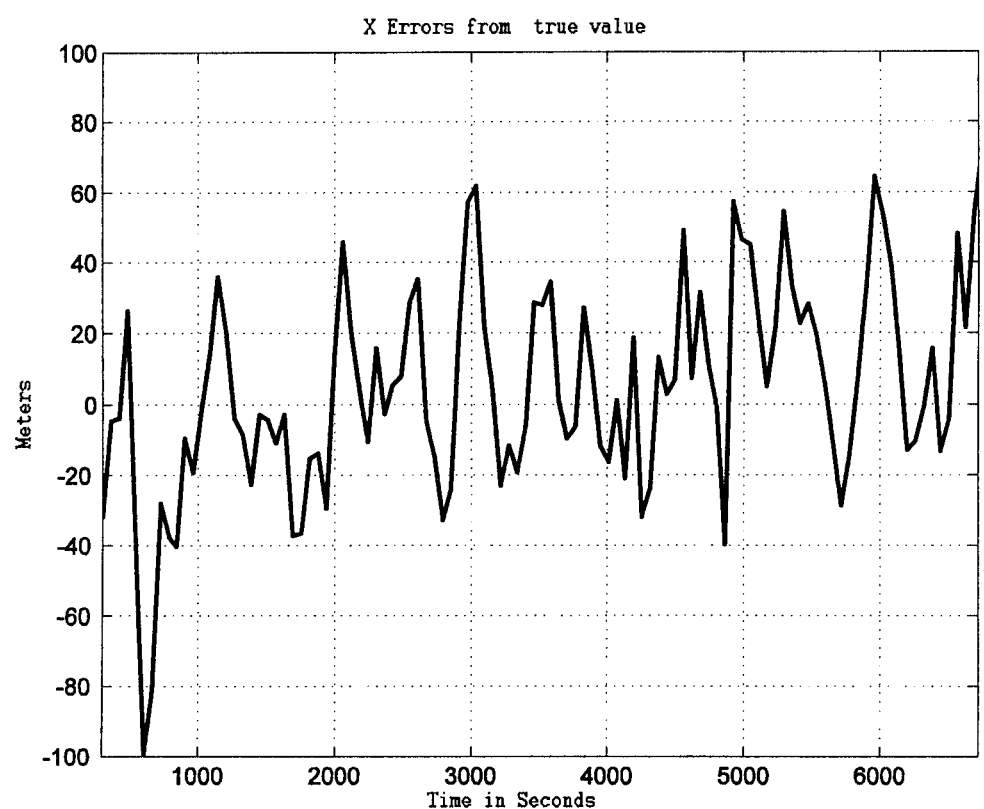
Figure 24: Position error along X direction for the first target of the second scenario.

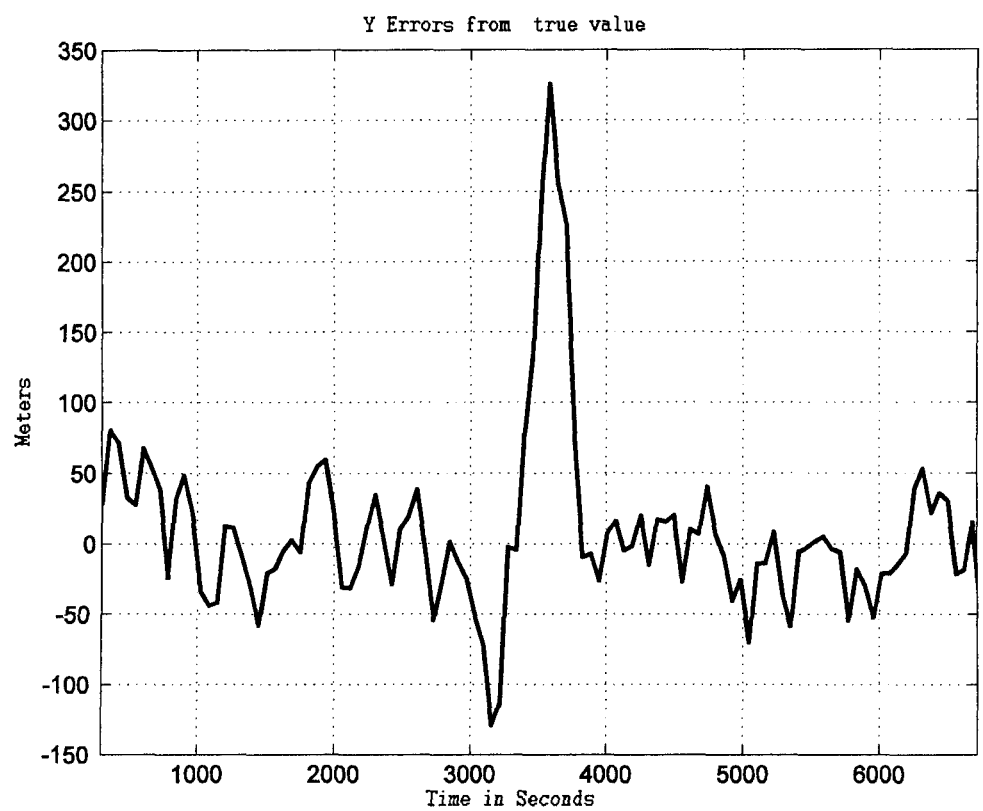
Figure 25: Position error along Y direction for the first target of the second scenario.

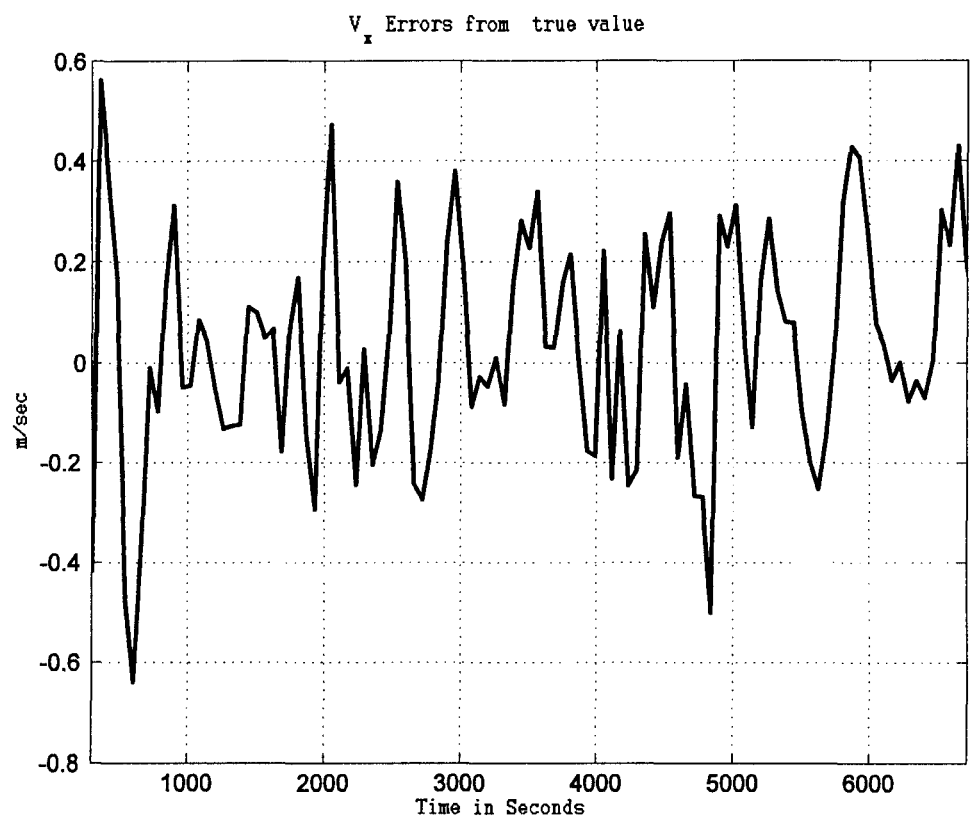
Figure 26: Velocity error along X direction for the first target of the second scenario.

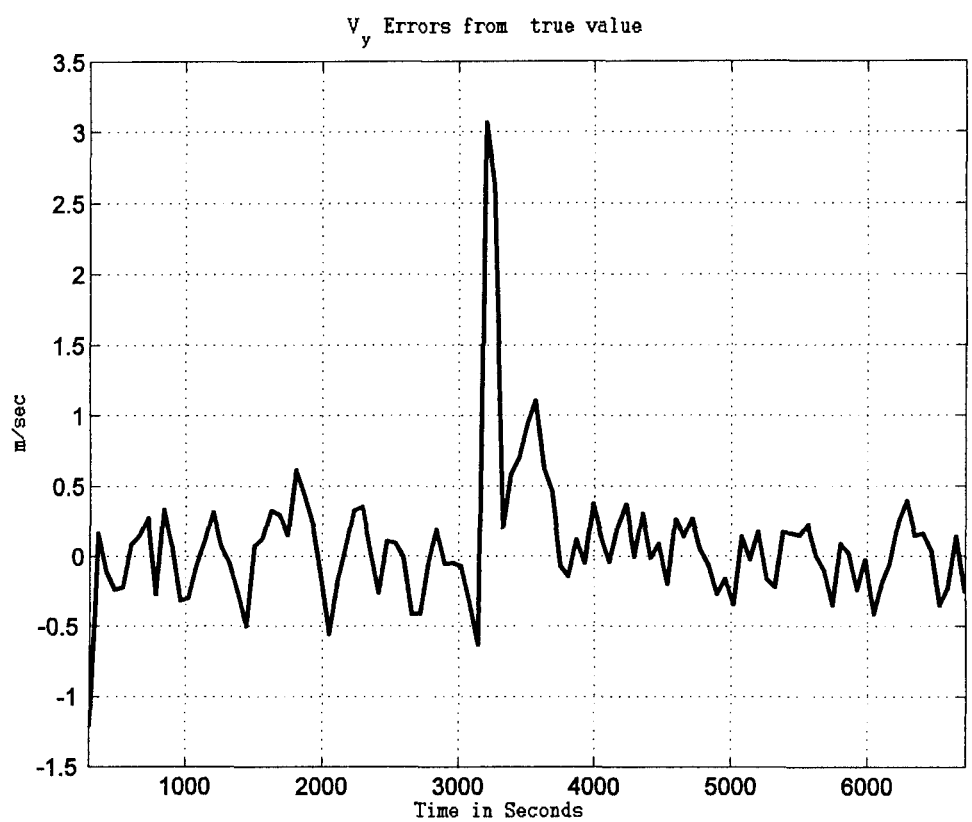
Figure 27: Velocity error along Y direction for the first target of the second scenario.

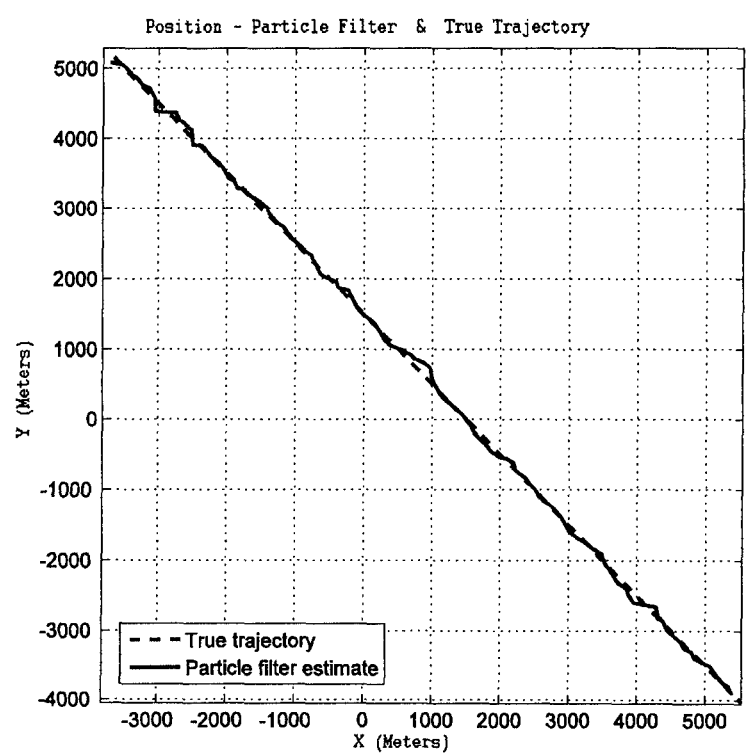
Figure 28: Estimated target track for the second target in the second scenario.

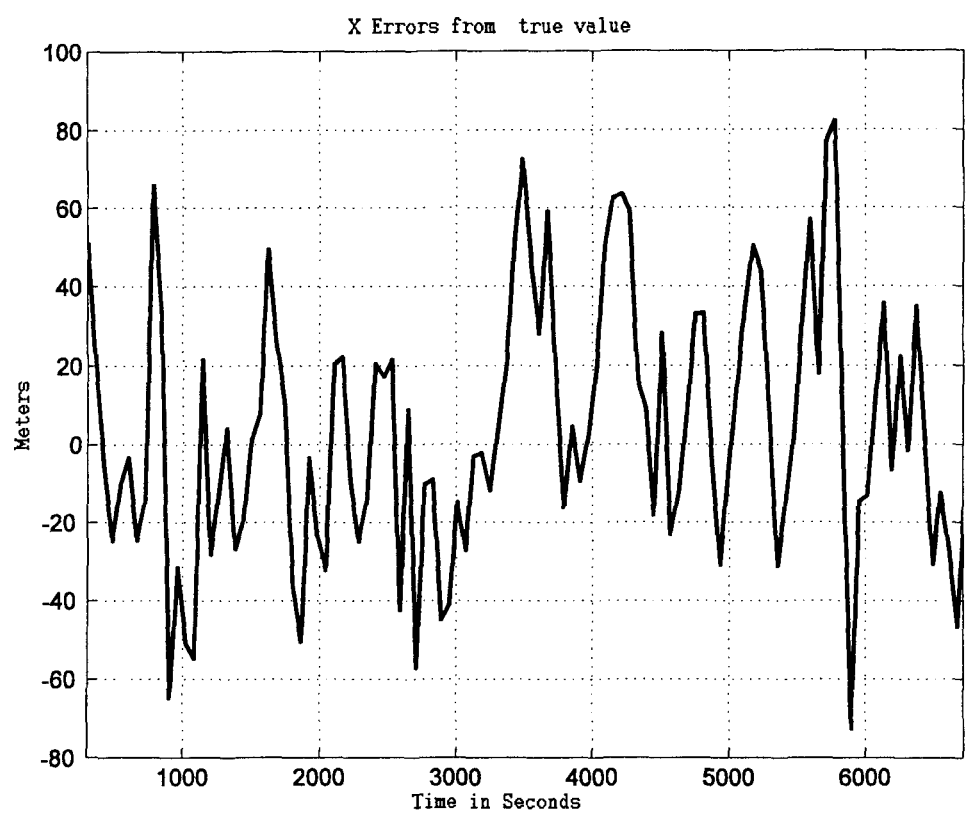
Figure 29: Position error along X direction for the second target of the second scenario.

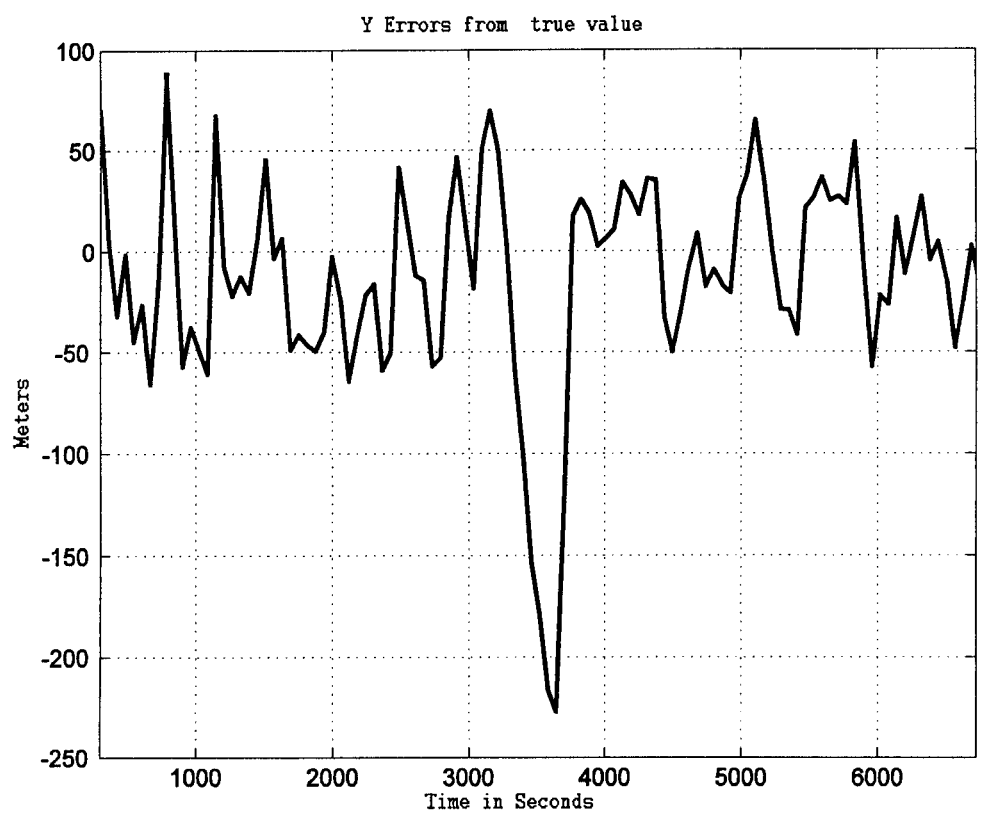
Figure 30: Position error along Y direction for the second target of the second scenario.

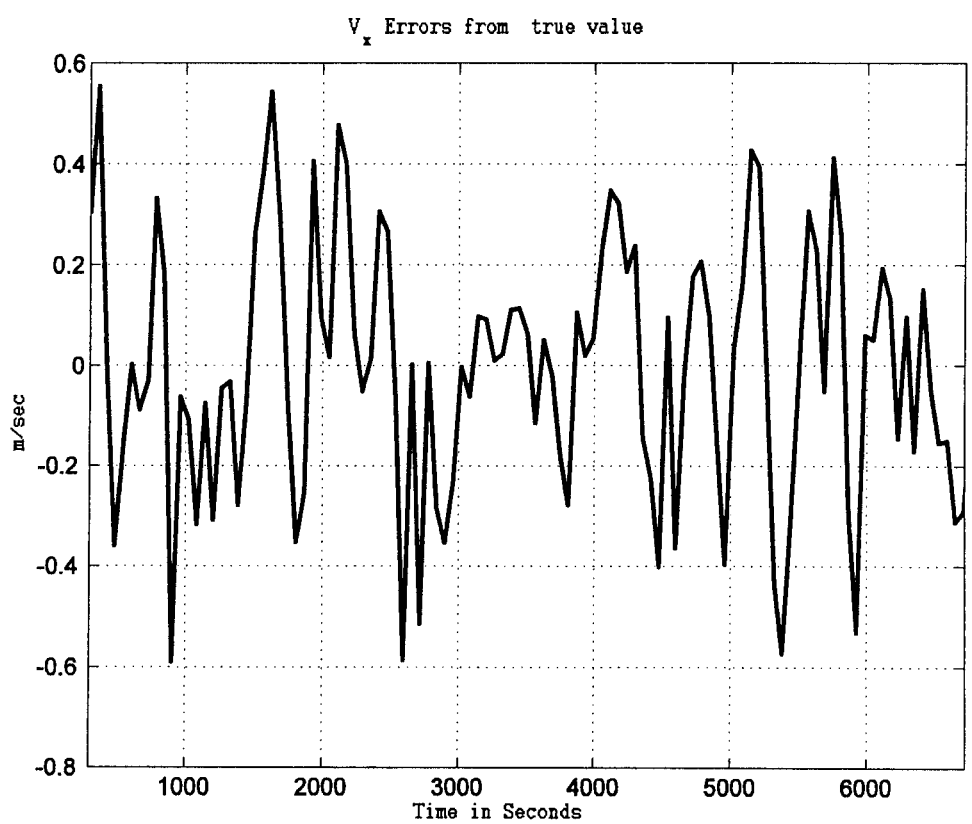
Figure 31: Velocity error along X direction for the second target of the second scenario.

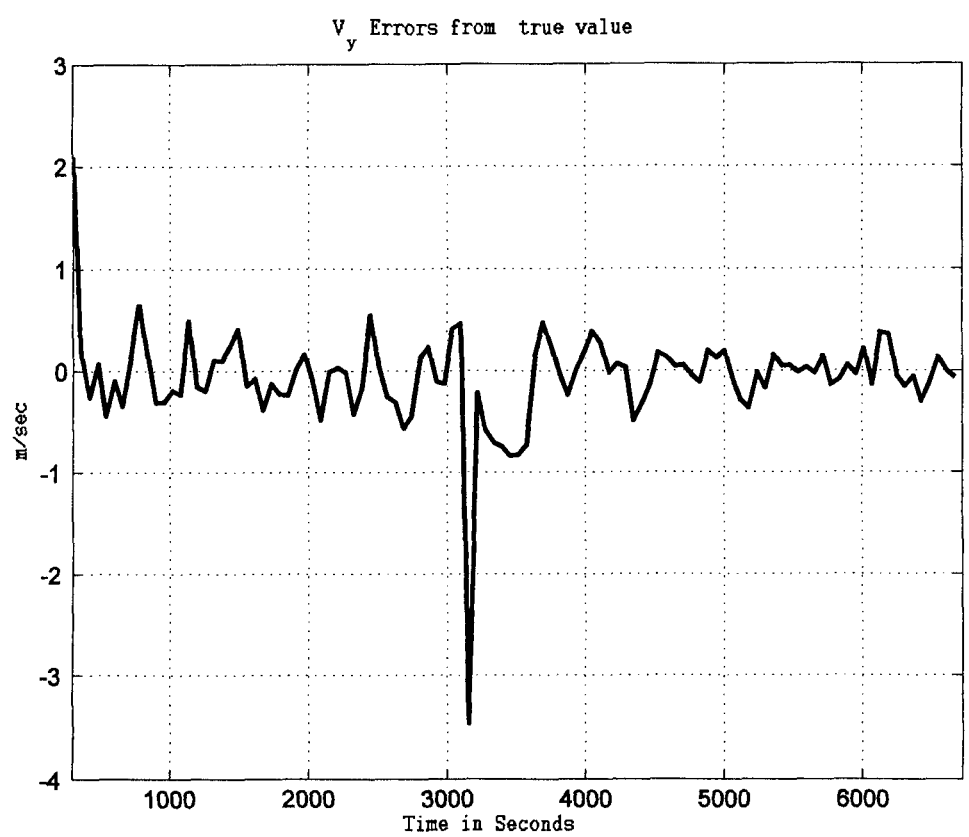
Figure 32: Velocity error along Y direction for the second target of the second scenario.

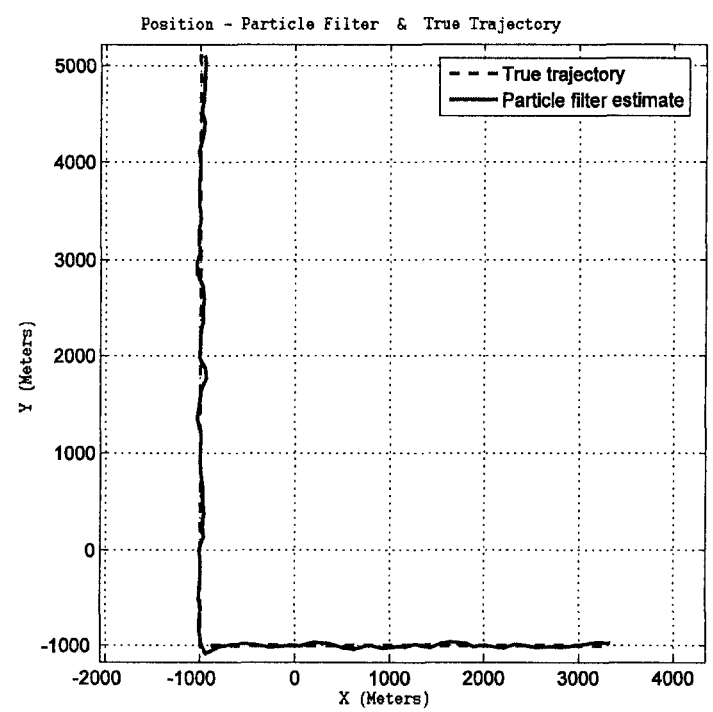
Figure 33: Estimated target track for the third target in the second scenario.

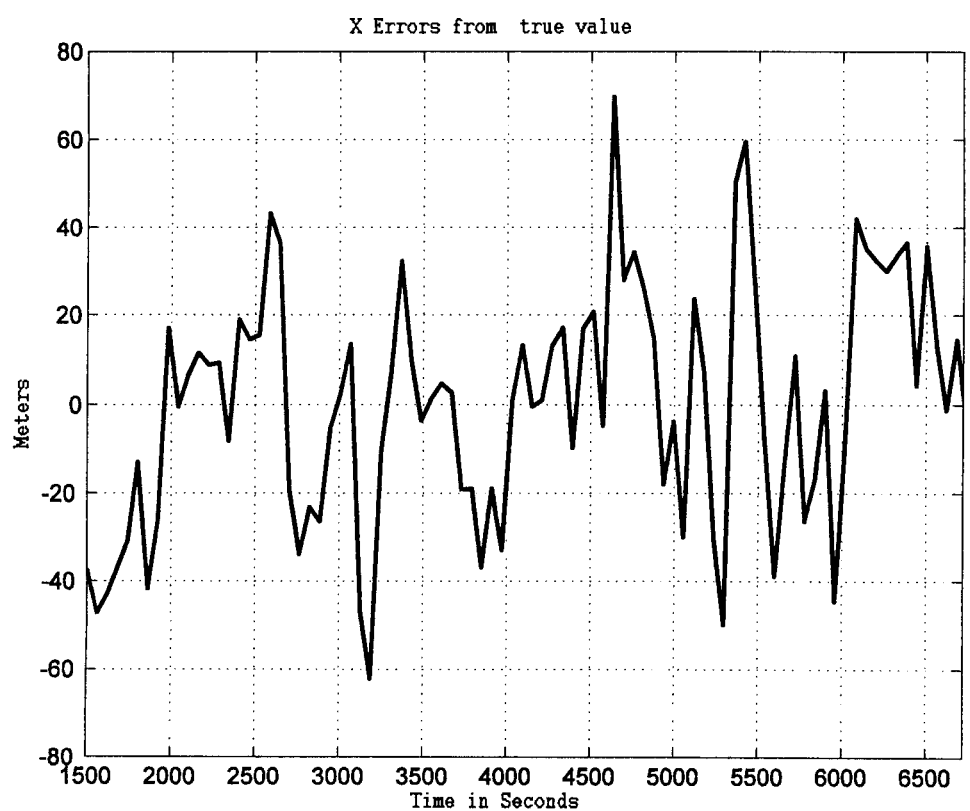
Figure 34: Position error along X direction for the third target of the second scenario.

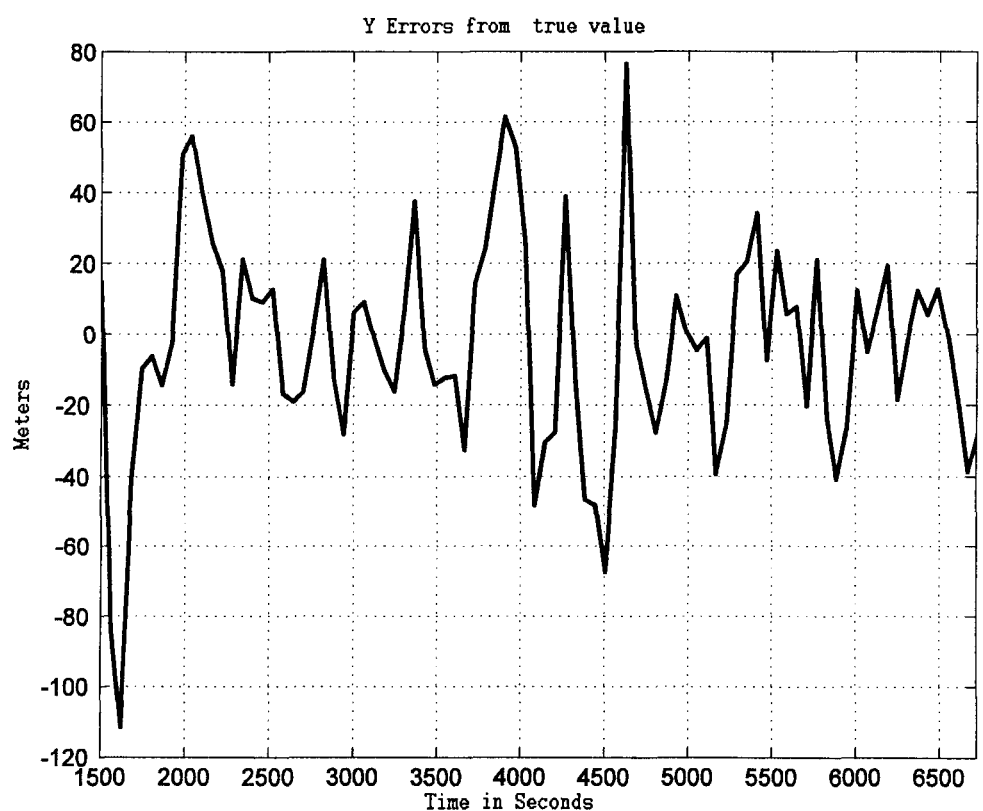
Figure 35: Position error along Y direction for the third target of the second scenario.

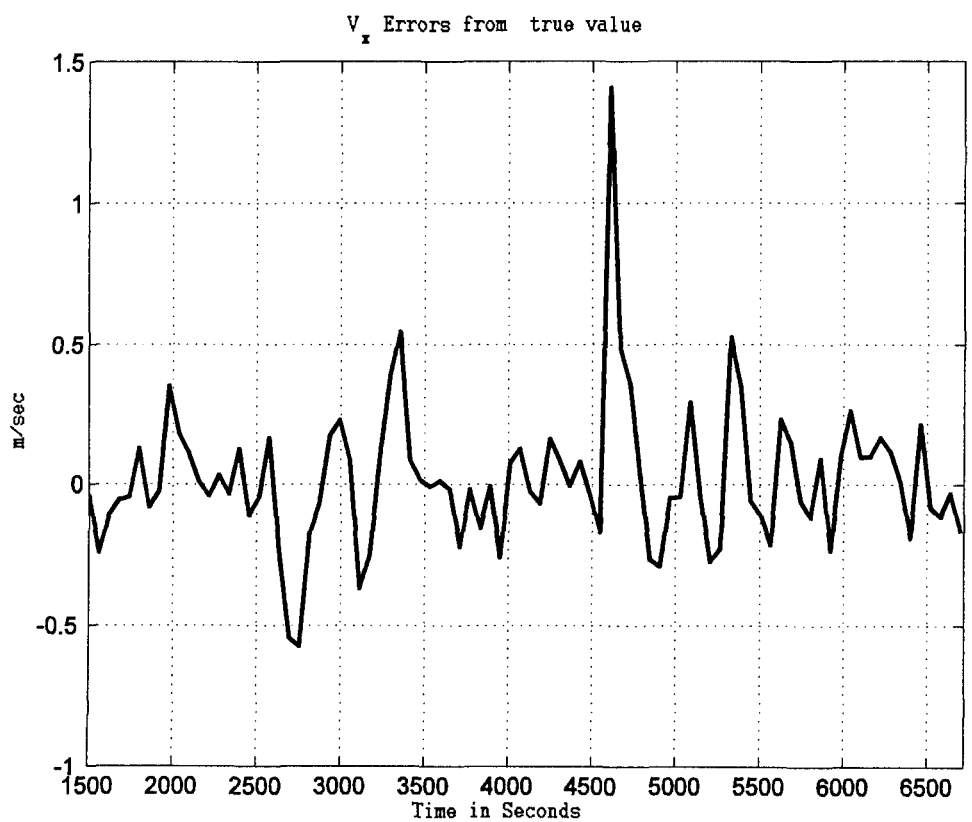
Figure 36: Velocity error along X direction for the third target of the second scenario.

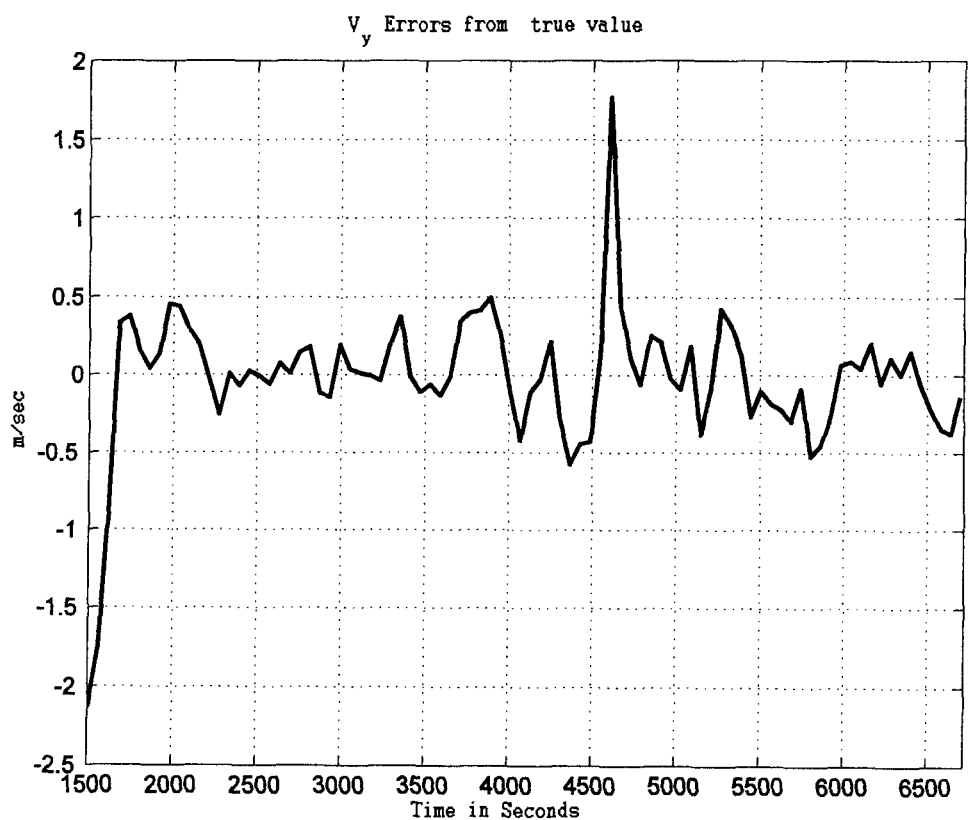
Figure 37: Velocity error along Y direction for the third target of the second scenario.

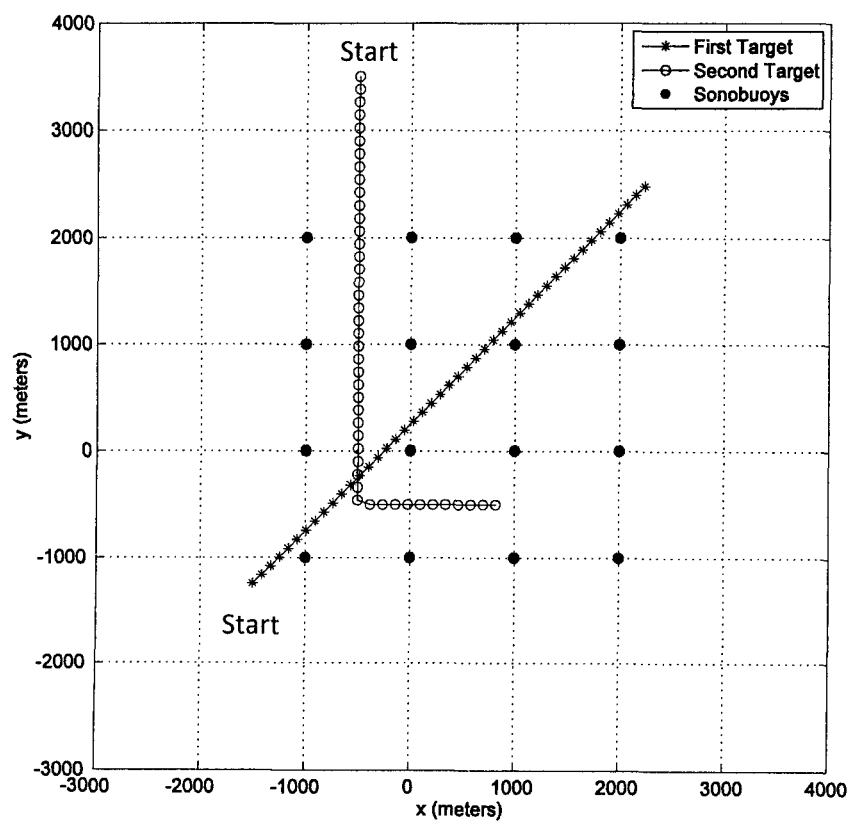
Figure 38: Third simulated scenario, the sixteen passive sonobuoys are in red.

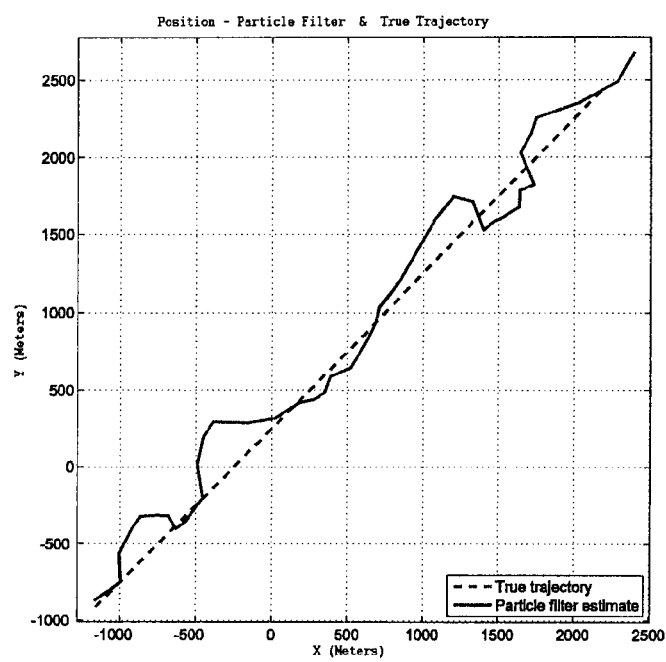
Figure 39: Estimated target track for the first target in the third scenario without Doppler measurement.

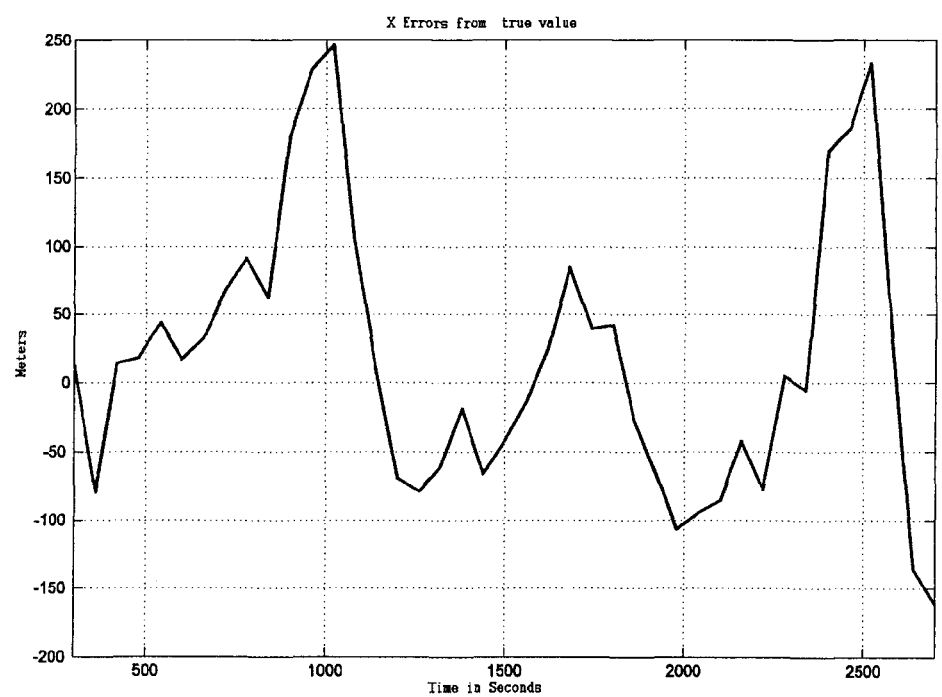
Figure 40: Position error along X direction for the first target of the third scenario without Doppler measurement.

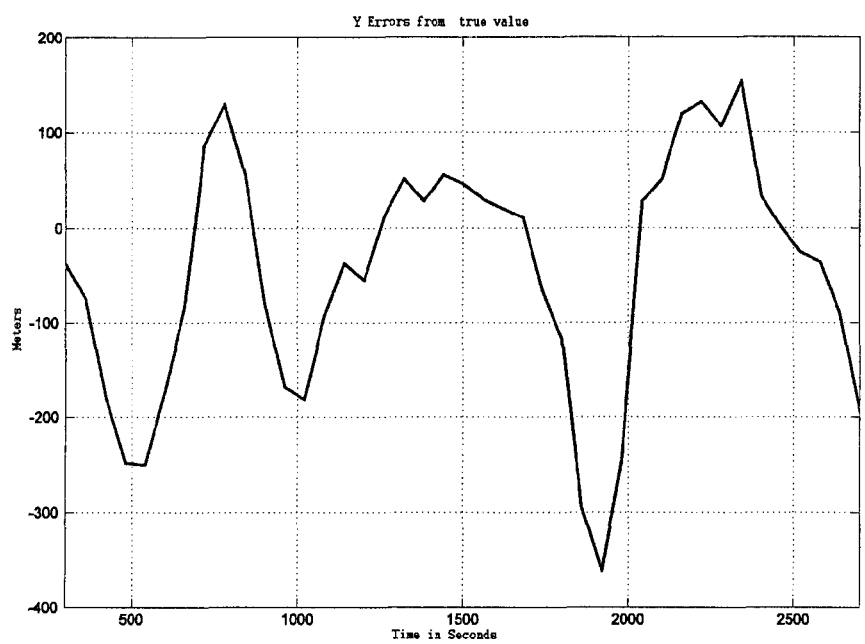
Figure 41: Position error along Y direction for the first target of the third scenario without Doppler measurement.

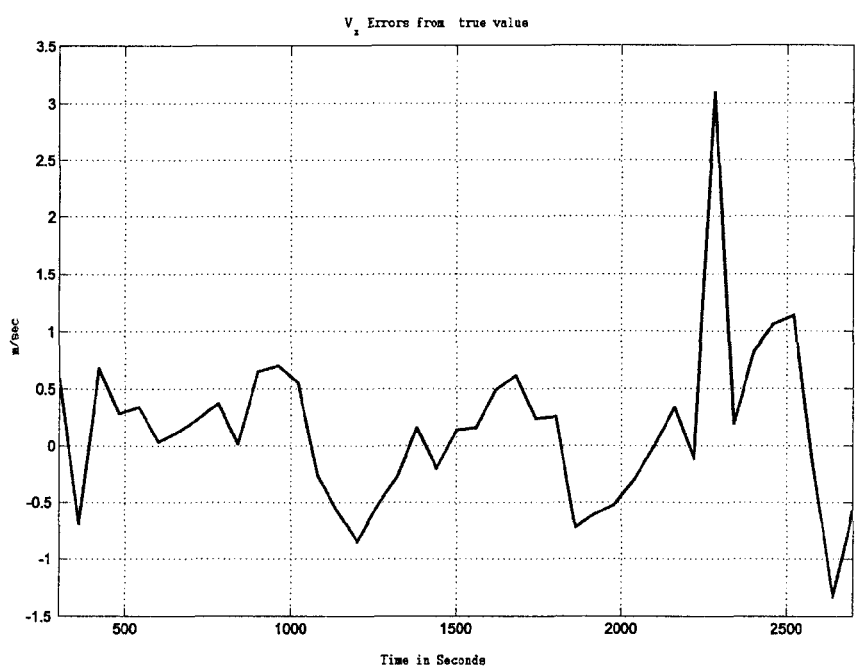
Figure 42: Velocity error along X direction for the first target of the third scenario without Doppler measurement.

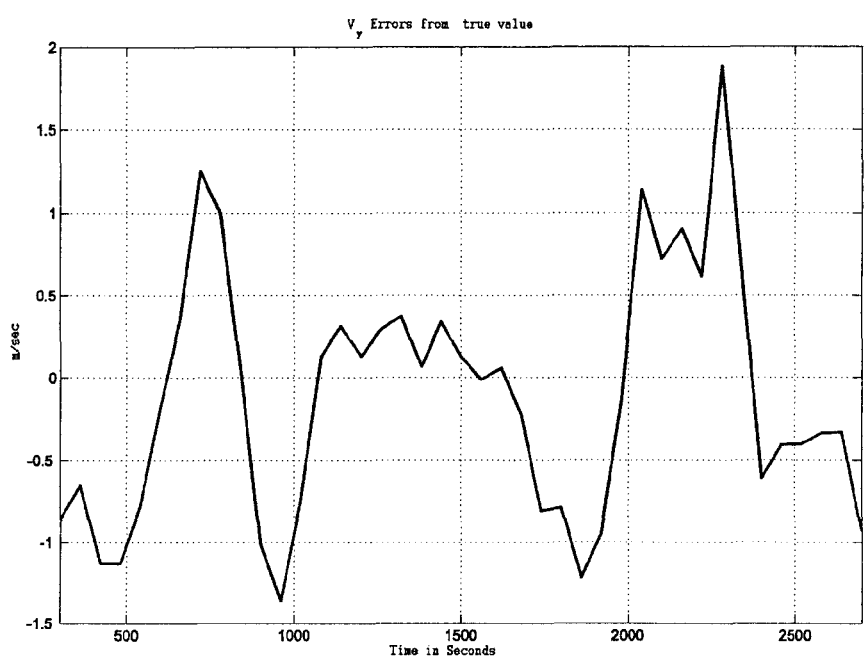
Figure 43: Velocity error along Y direction for the first target of the third scenario without Doppler measurement.

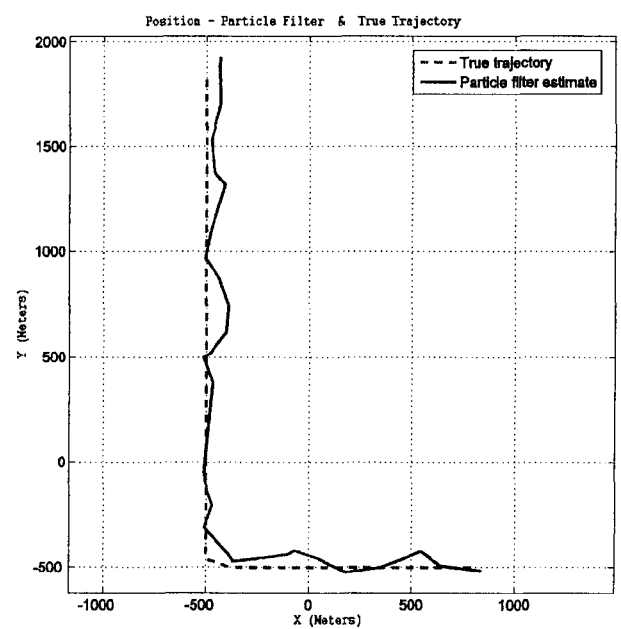
Figure 44: Estimated target track for the second target in the third scenario without Doppler measurement.

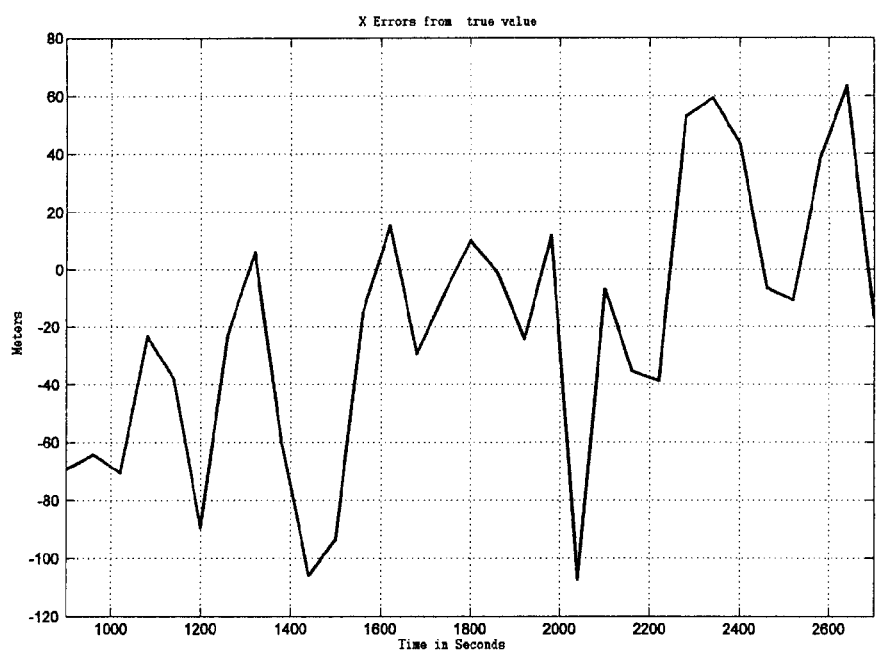
Figure 45: Position error along X direction for the second target of third scenario without Doppler measurement.

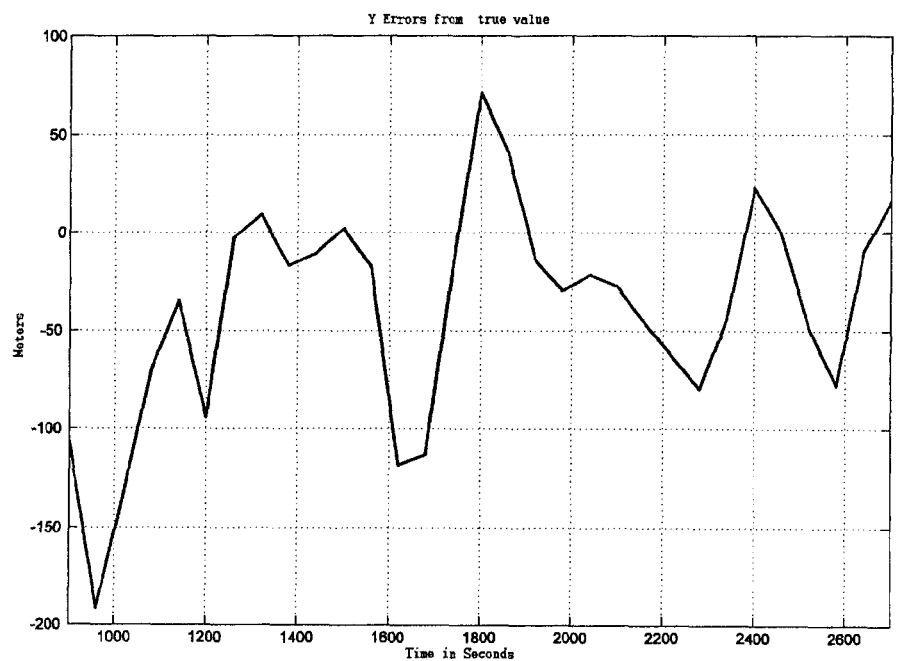
Figure 46: Position error along Y direction for the second target of third scenario without Doppler measurement.

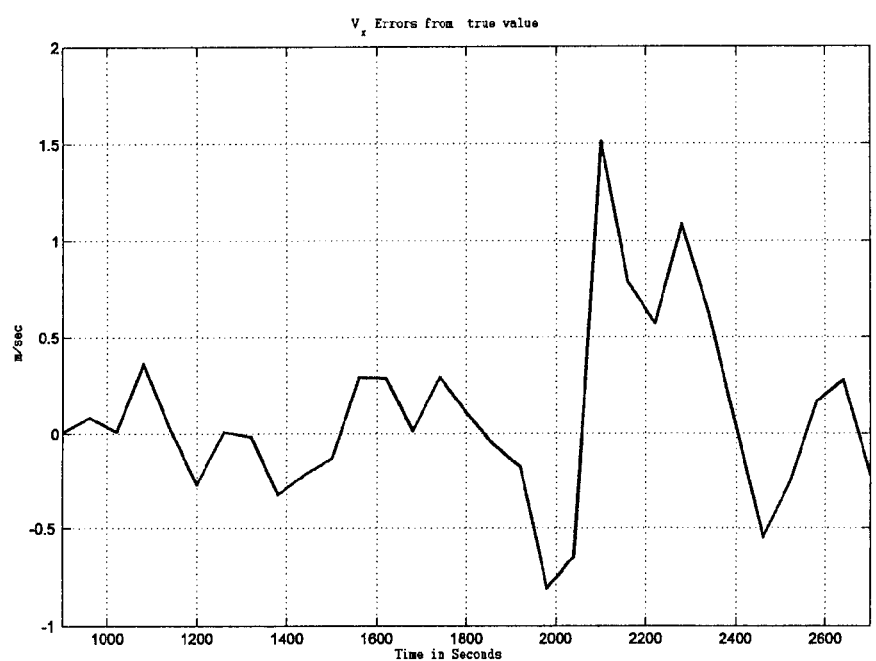
Figure 47: Velocity error along X direction for the second target of third scenario without Doppler measurement.

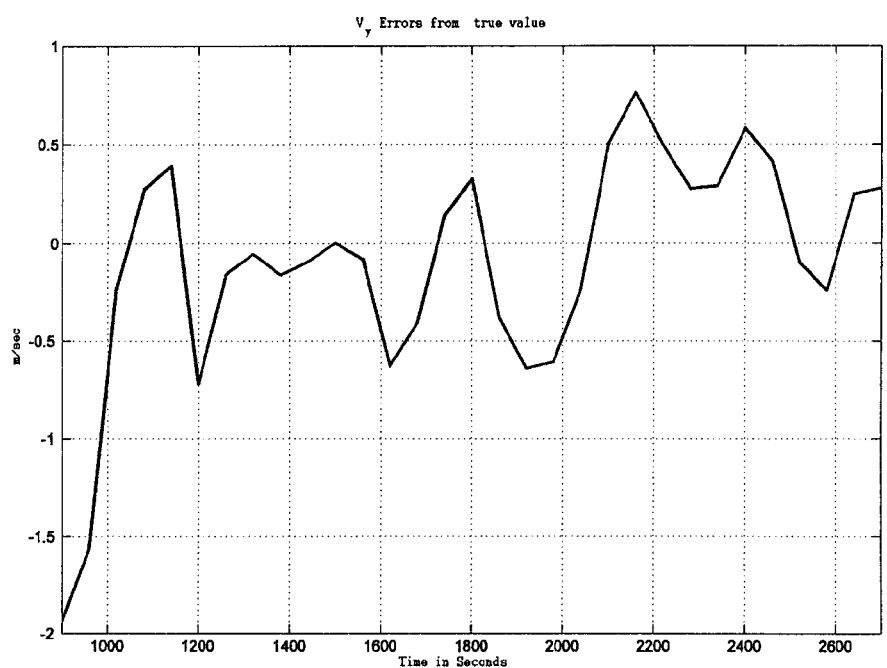
Figure 48: Velocity error along Y direction for the second target of the third scenario without Doppler measurement.

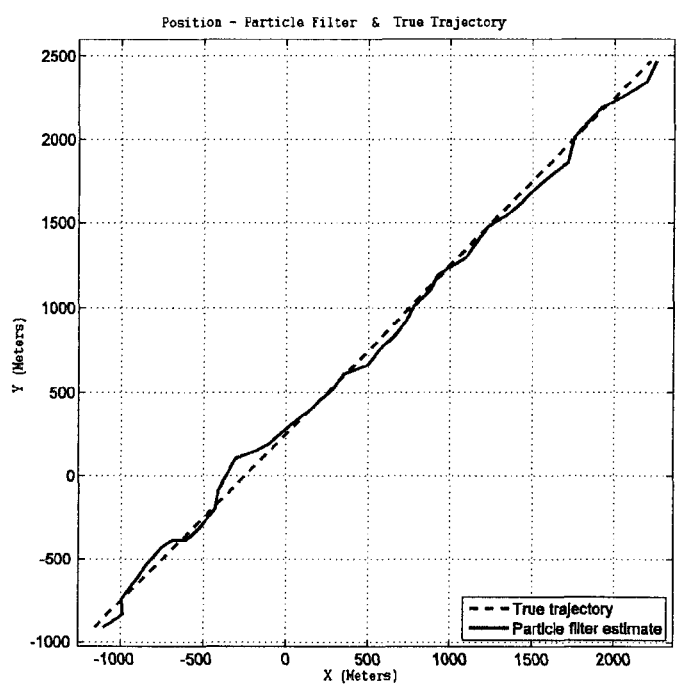
Figure 49: Estimated target track for the first target in the third scenario with Doppler measurement.

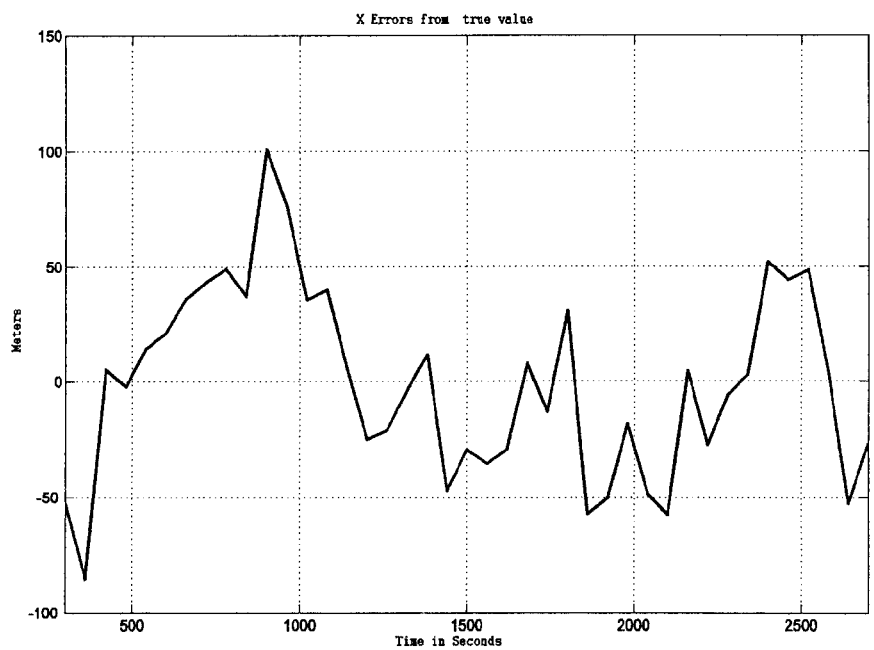
Figure 50: Position error along X direction for the first target of the third scenario with Doppler measurement.

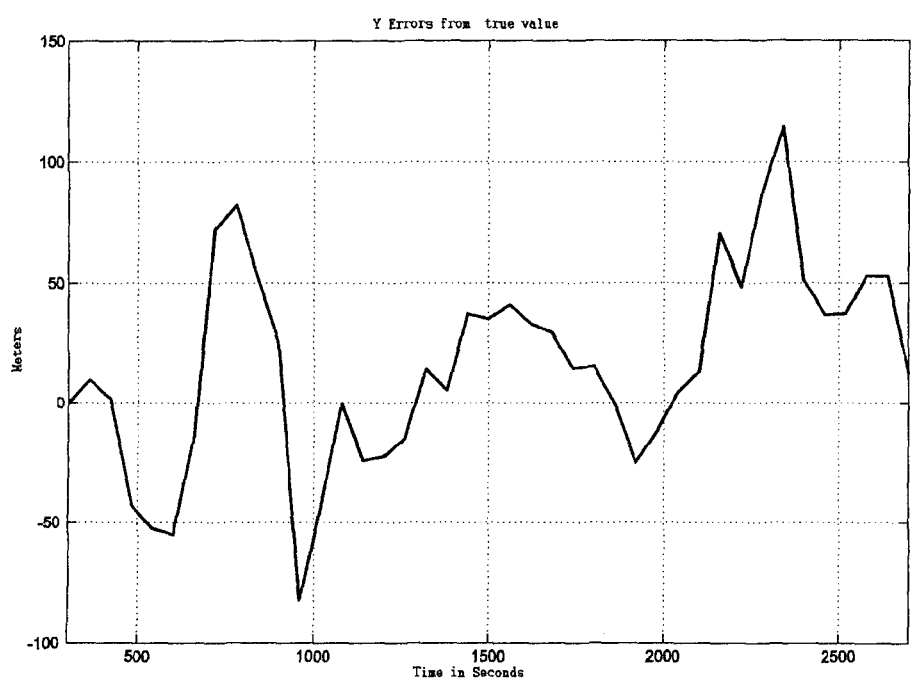
Figure 51: Position error along Y direction for the first target of the third scenario with Doppler measurement.

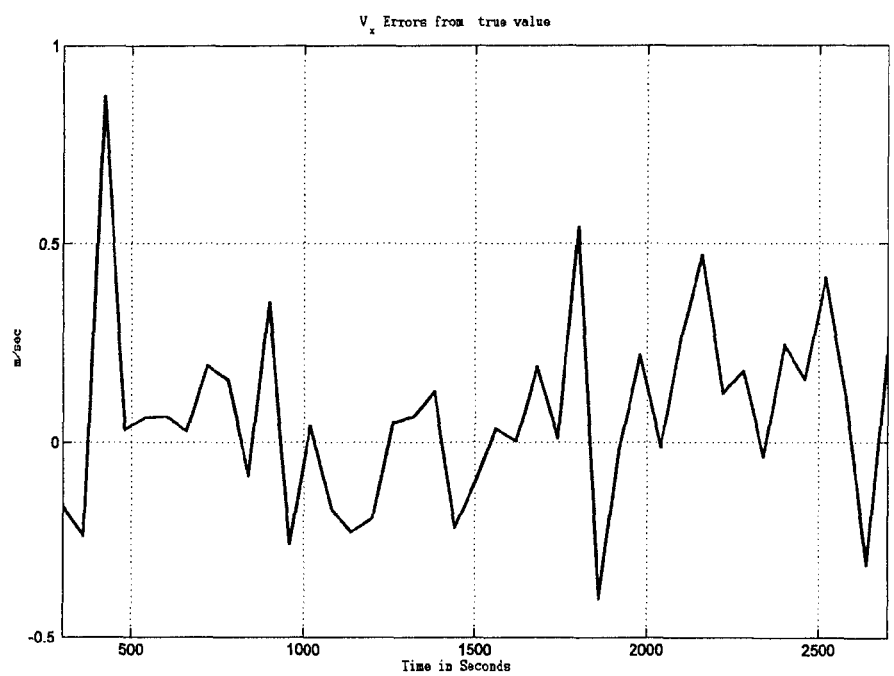
Figure 52: Velocity error along X direction for the first target of the third scenario with Doppler measurement.

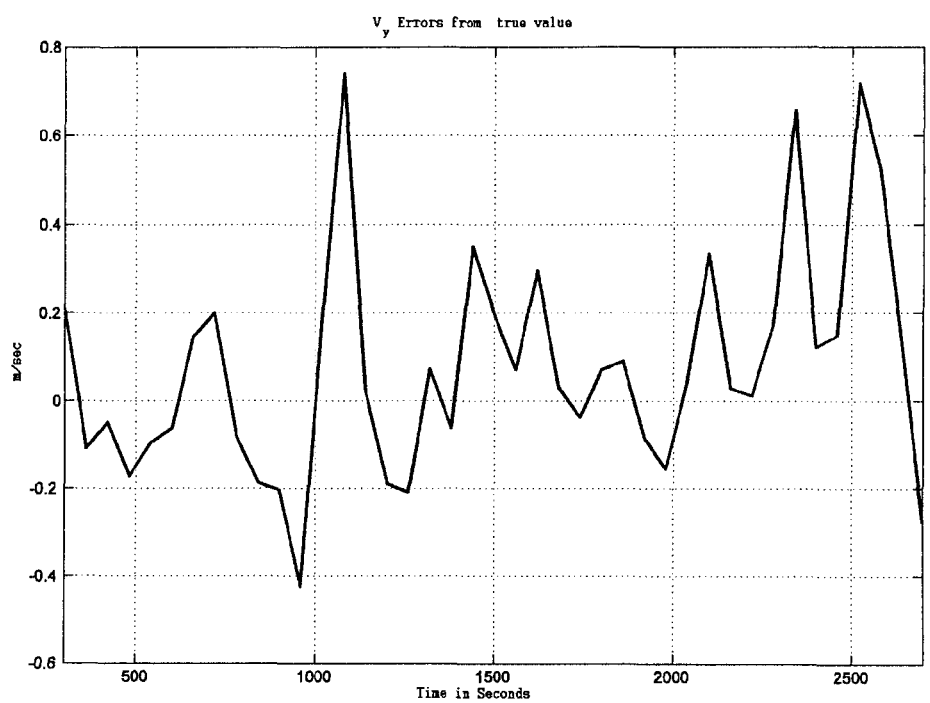
Figure 53: Velocity error along Y direction for the first target of the third scenario with Doppler measurement.

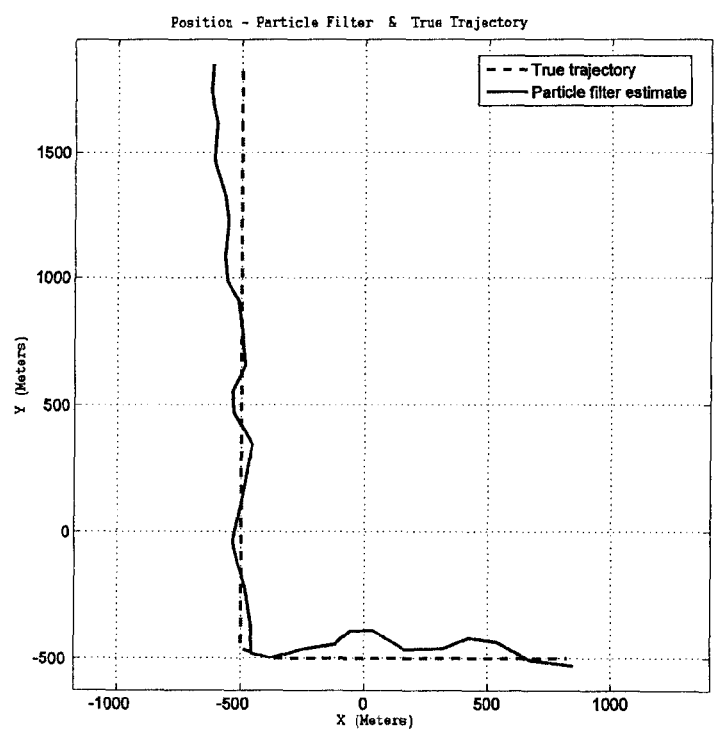
Figure 54: Estimated target track for the second target in the third scenario with Doppler measurement.

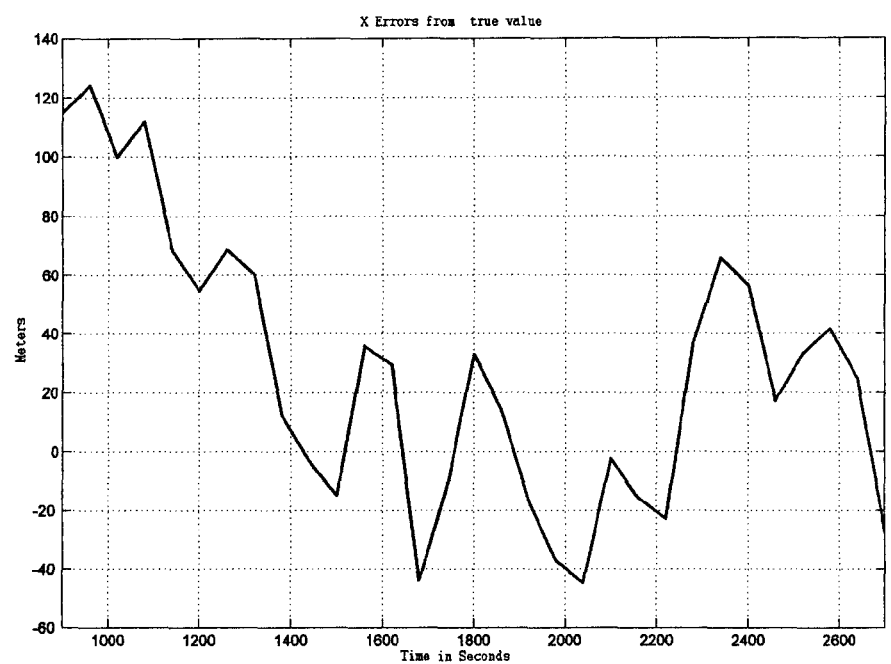
Figure 55: Position error along X direction for the second target of third scenario with Doppler measurement.

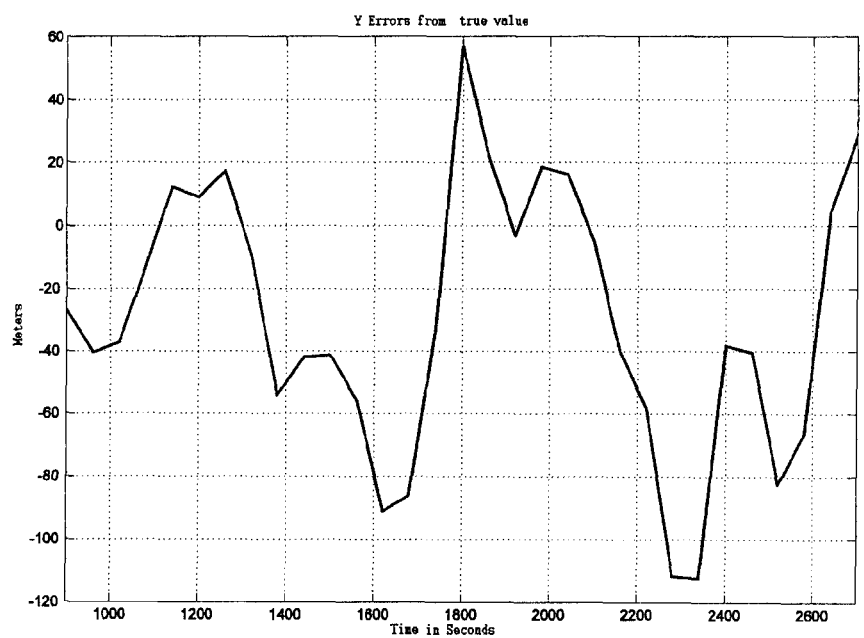
Figure 56: Position error along Y direction for the second target of third scenario with Doppler measurement.

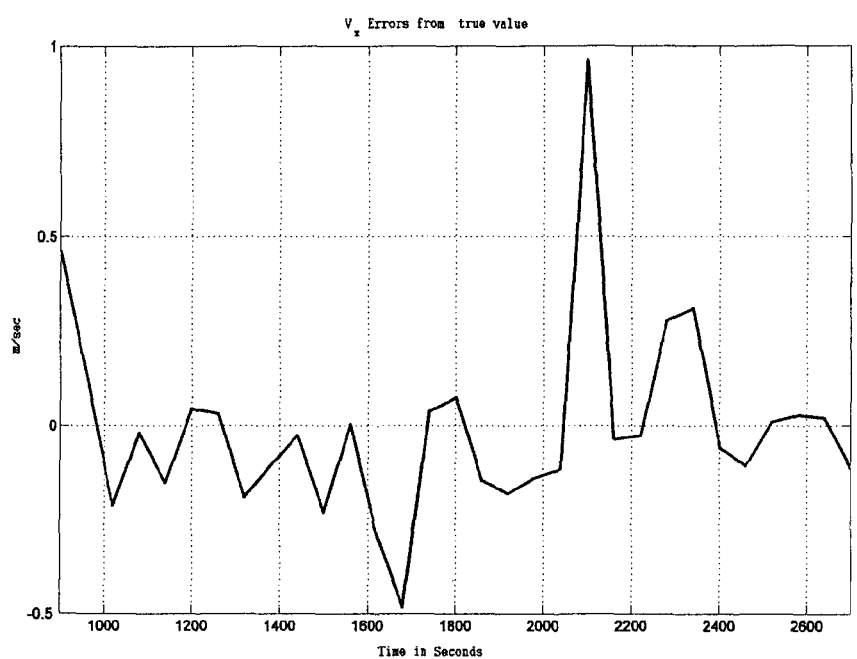
Figure 57: Velocity error along X direction for the second target of third scenario with Doppler measurement.

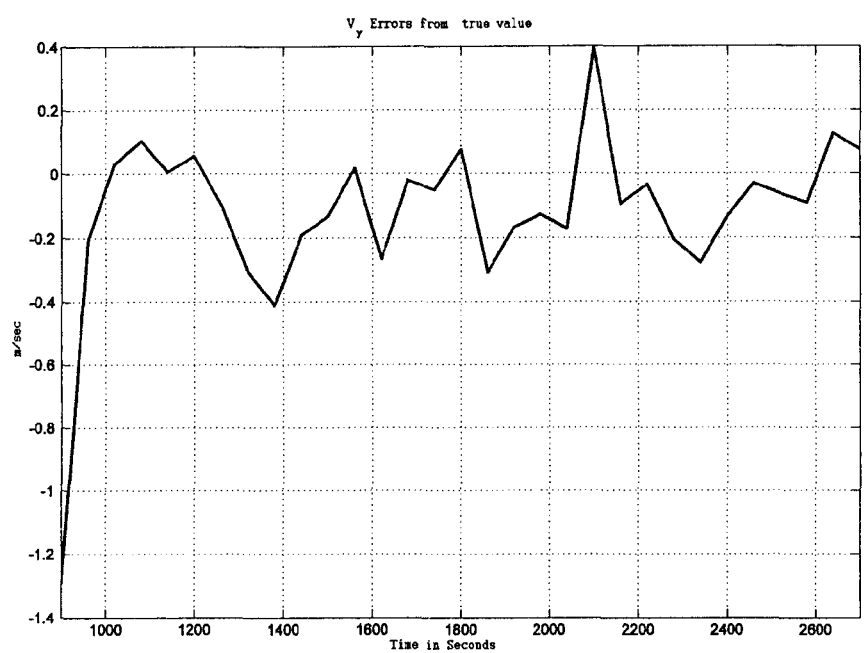
Figure 58: Velocity error along Y direction for the second target of the third scenario with Doppler measurement.

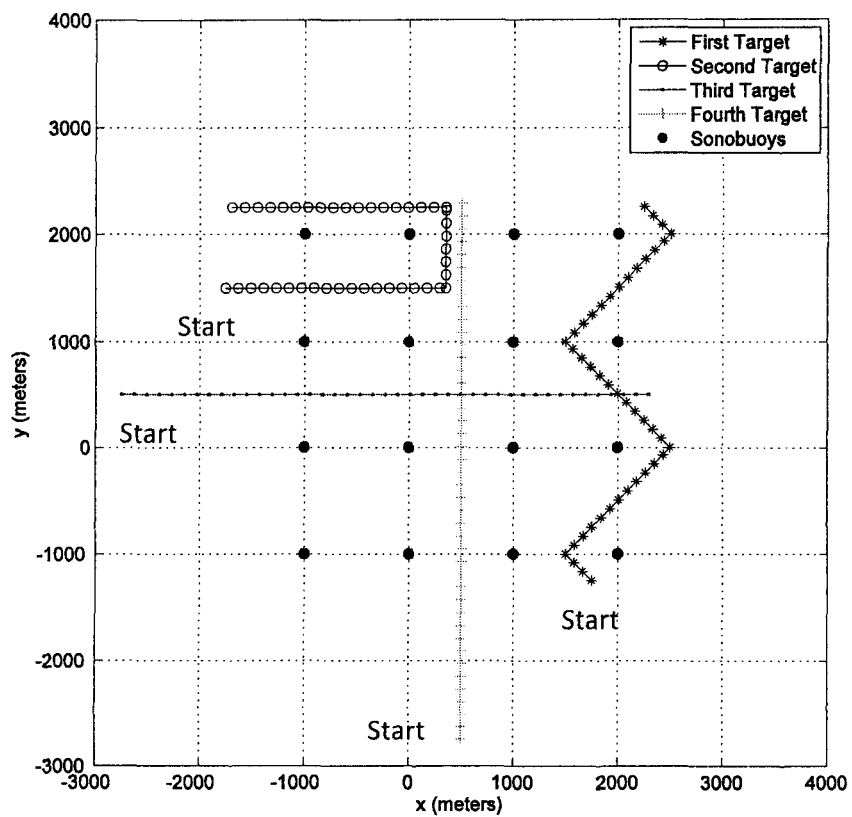
Figure 59: Fourth simulated scenario, the sixteen passive sonobuoys are in red.

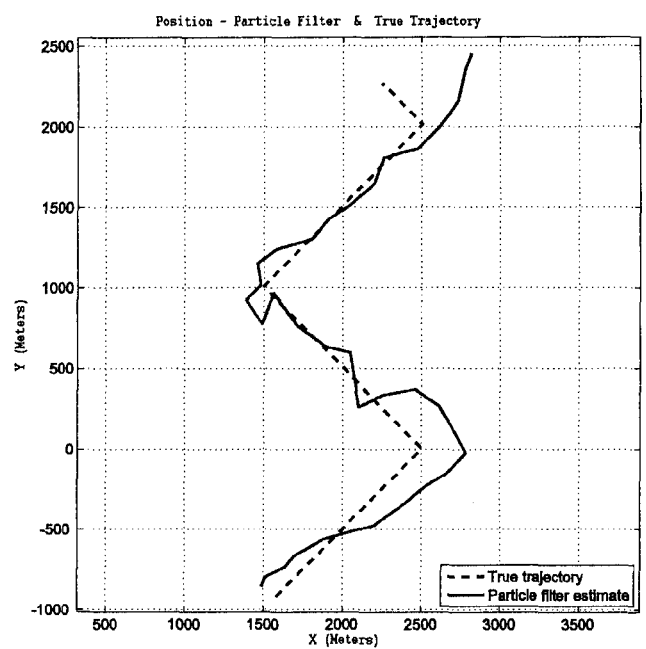
Figure 60: Estimated target track for the first target in the fourth scenario without Doppler measurement.

Figure 61: Position error along X direction for the first target of the fourth scenario without Doppler measurement.

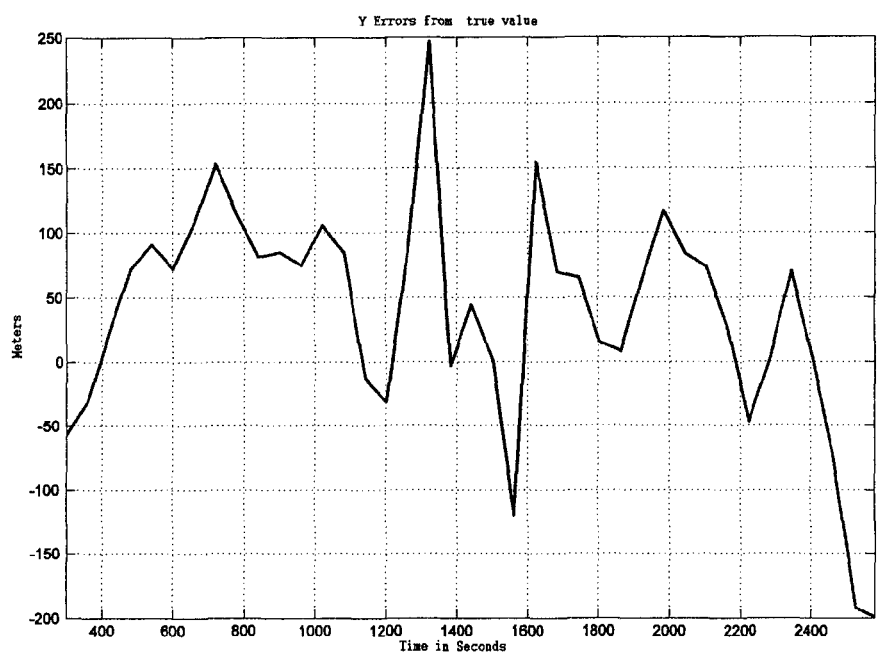
Figure 62: Position error along Y direction for the first target of the fourth scenario without Doppler measurement.

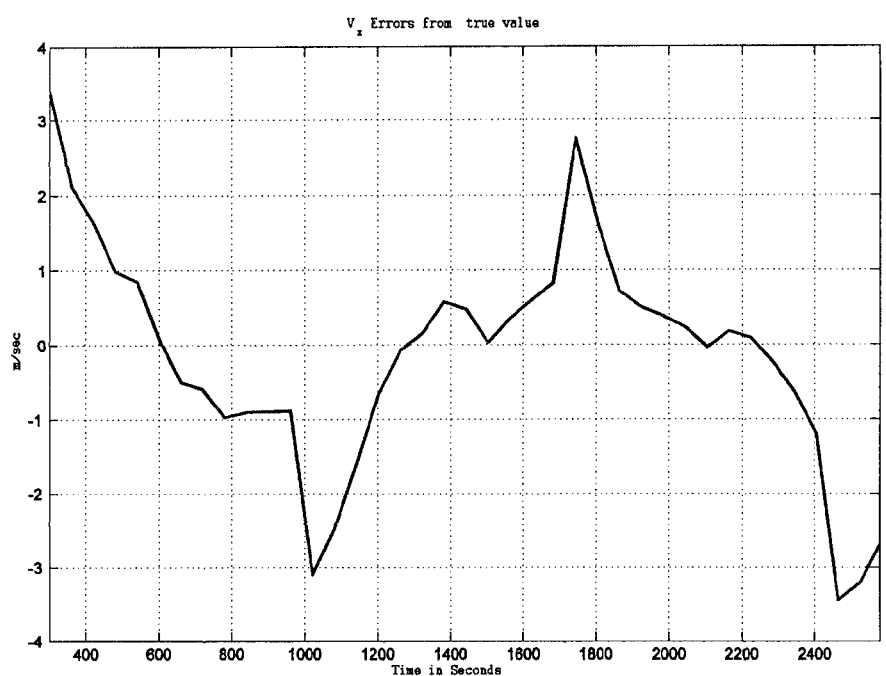
Figure 63: Velocity error along X direction for the first target of the fourth scenario without Doppler measurement.

Figure 64: Velocity error along Y direction for the first target of the fourth scenario without Doppler measurement.

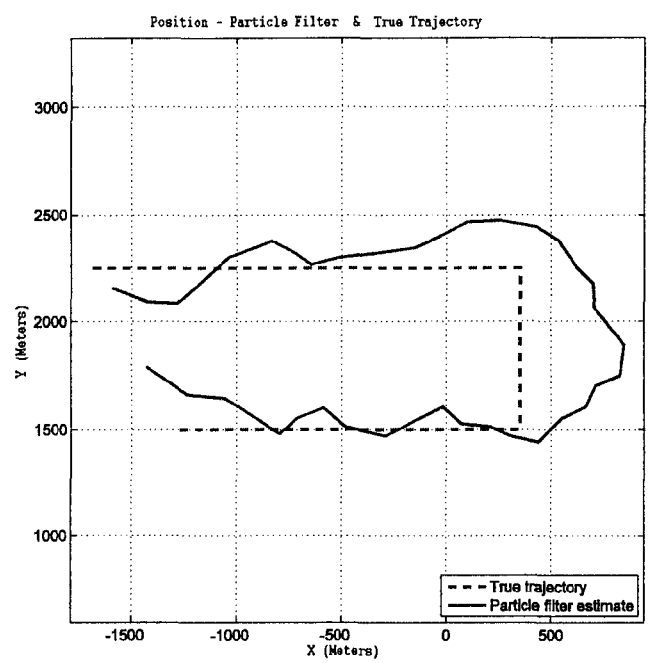
Figure 65: Estimated target track for the second target in the fourth scenario without Doppler measurement.

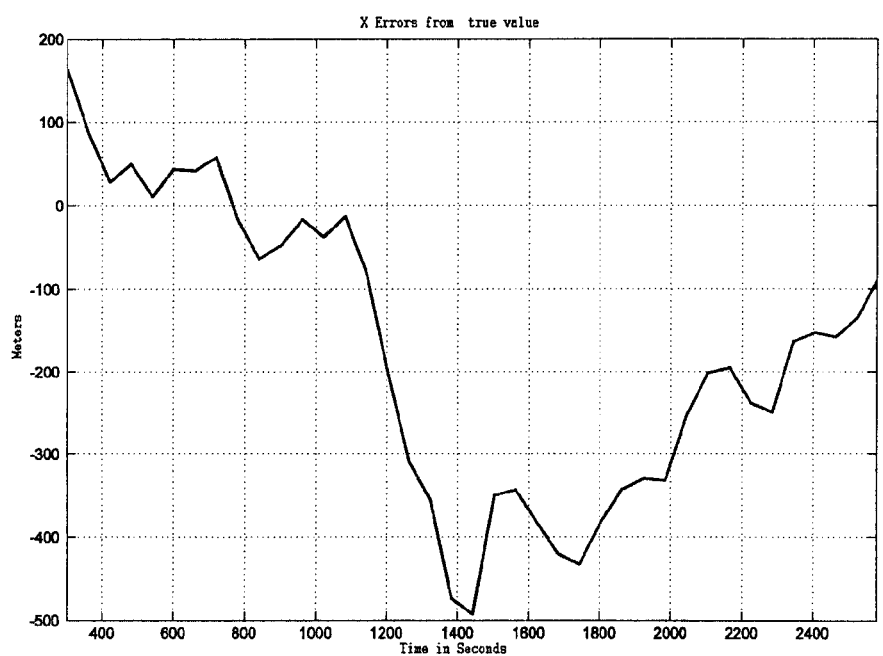
Figure 66: Position error along X direction for the second target of fourth scenario without Doppler measurement.

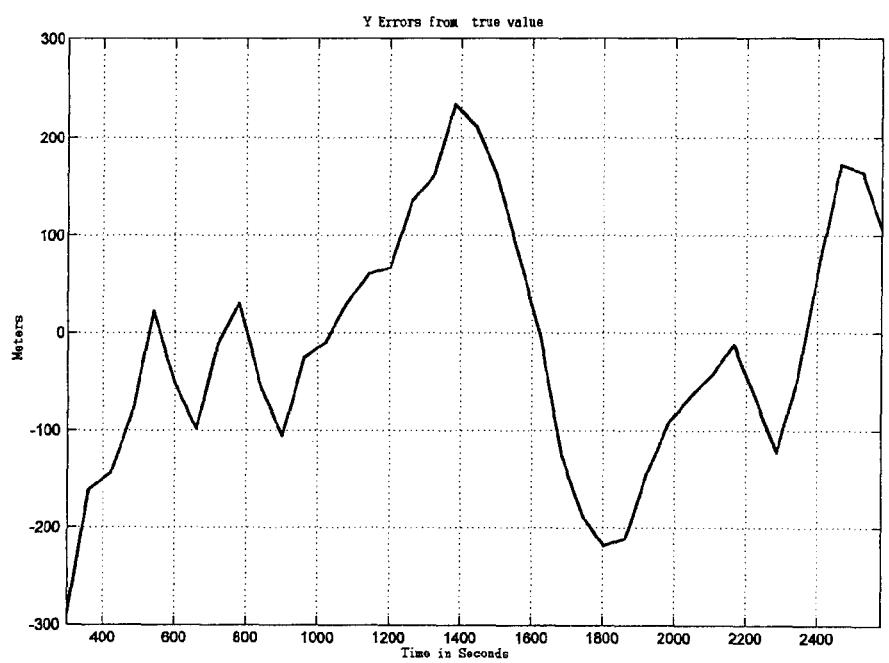
Figure 67: Position error along Y direction for the second target of fourth scenario without Doppler measurement.

Figure 68: Velocity error along X direction for the second target of fourth scenario without Doppler measurement.

Figure 69: Velocity error along Y direction for the second target of the fourth scenario without Doppler measurement.

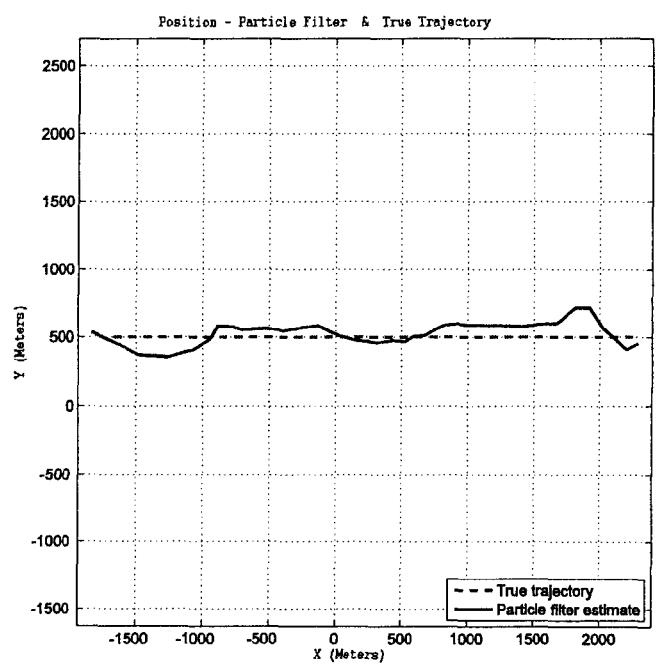
Figure 70: Estimated target track for the third target in the fourth scenario without Doppler measurement.

Figure 71: Position error along X direction for third target of the fourth scenario without Doppler measurement.

Figure 72: Position error along Y direction for third target of the fourth scenario without Doppler measurement.

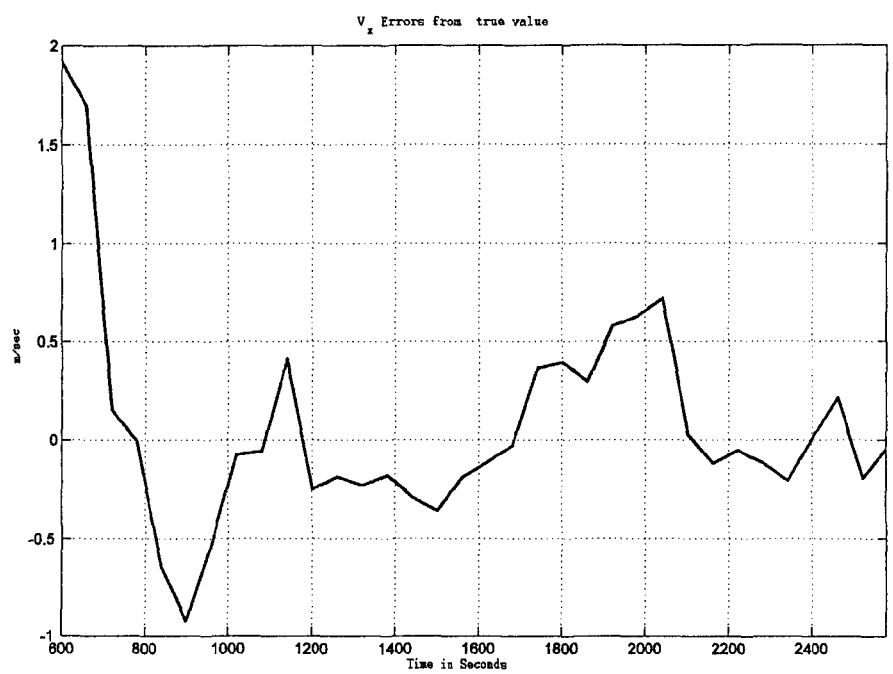
Figure 73: Velocity error along X direction third target of the fourth scenario without Doppler measurement.

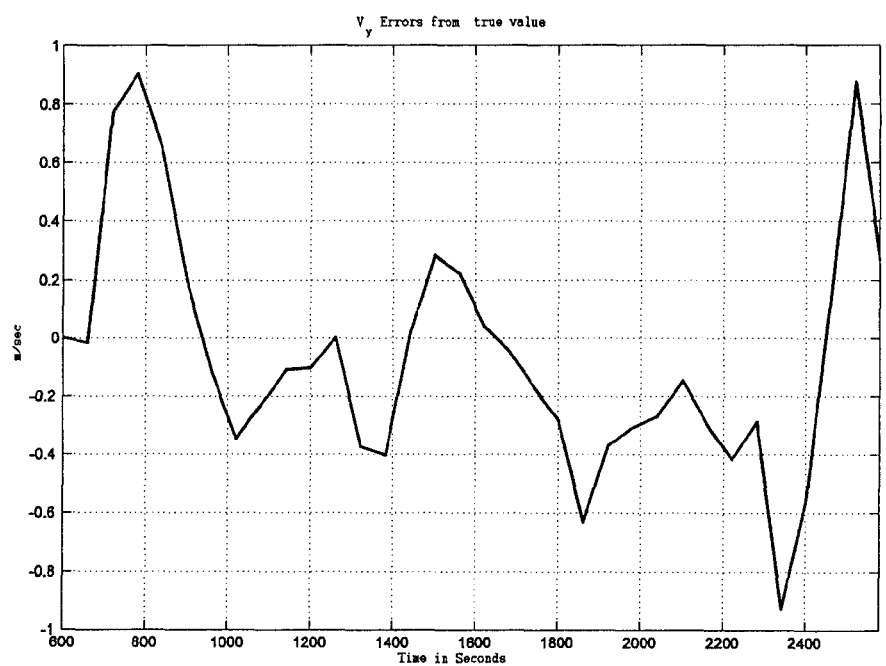
Figure 74: Velocity error along Y direction for third target of the fourth scenario without Doppler measurement.

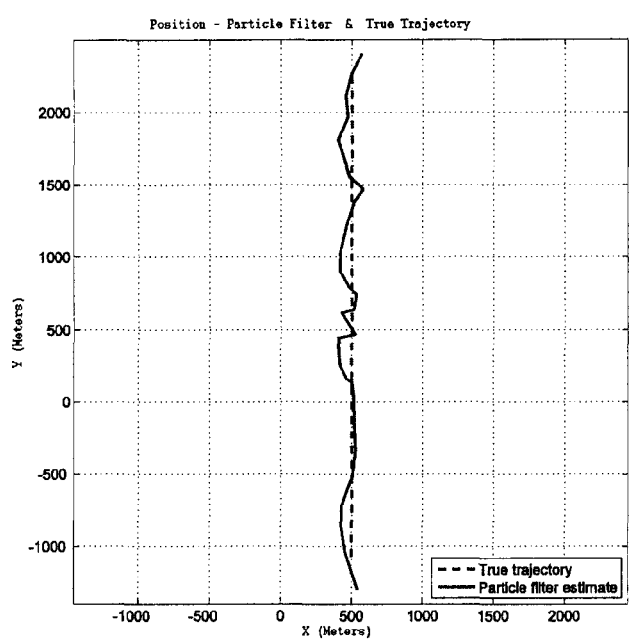
Figure 75: Estimated target track for the fourth target in the fourth scenario without Doppler measurement.

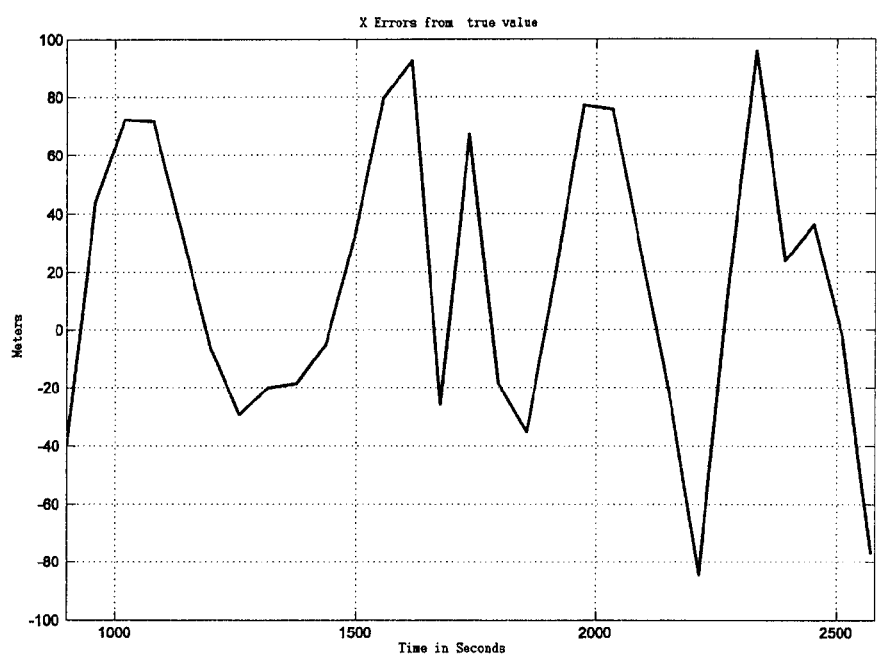
Figure 76: Position error along X direction for fourth target of the fourth scenario without Doppler measurement.

Figure 77: Position error along Y direction for fourth target of the fourth scenario without Doppler measurement.

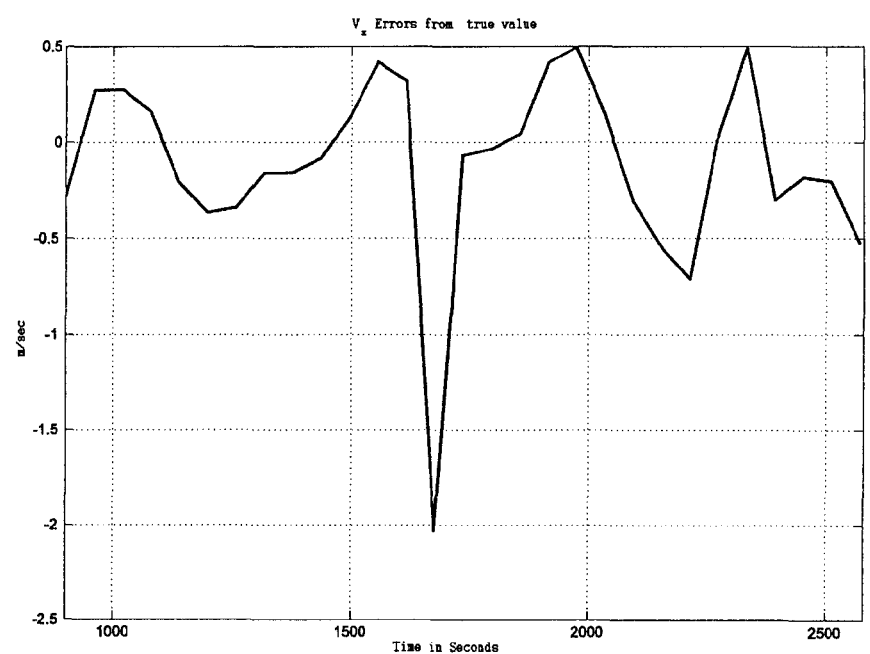
Figure 78: Velocity error along X direction fourth target of the fourth scenario without Doppler measurement.

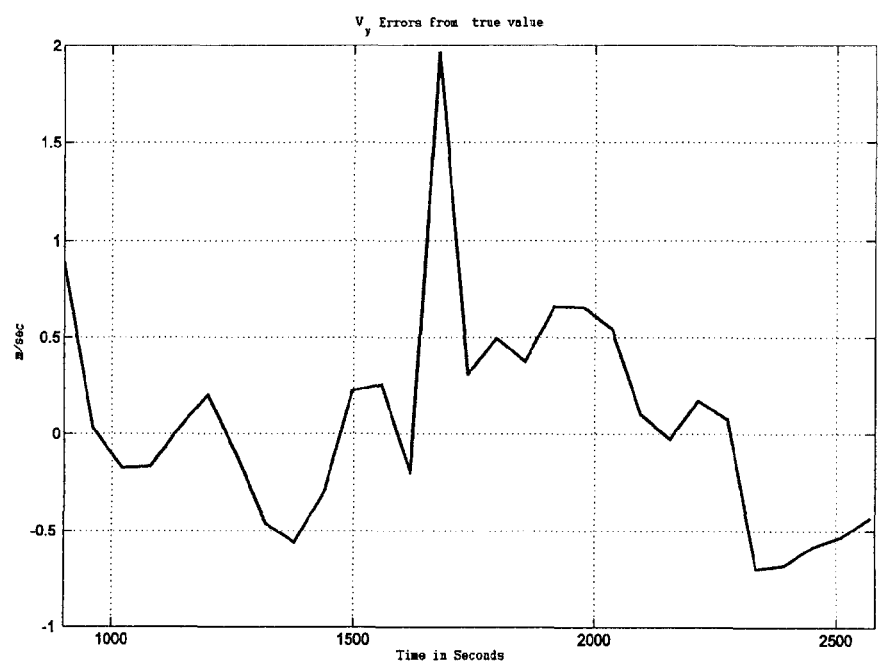
Figure 79: Velocity error along Y direction for fourth target of the fourth scenario without Doppler measurement.

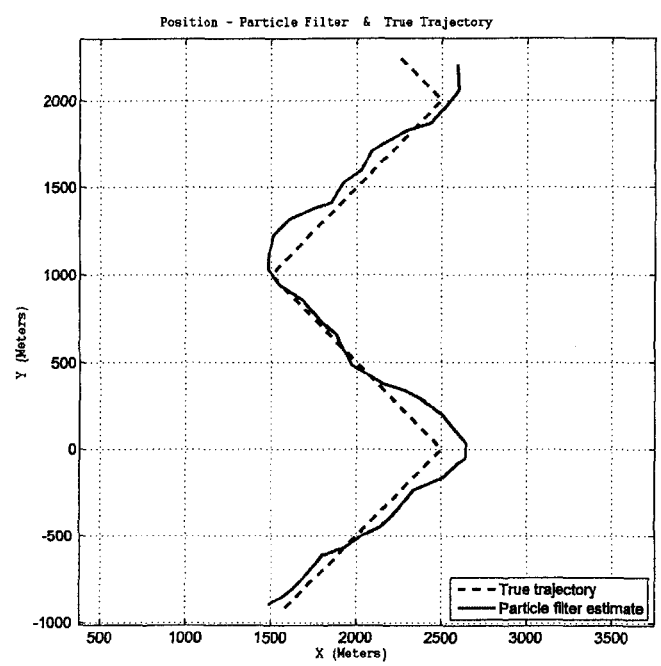
Figure 80: Estimated target track for the first target in the fourth scenario with Doppler measurement.

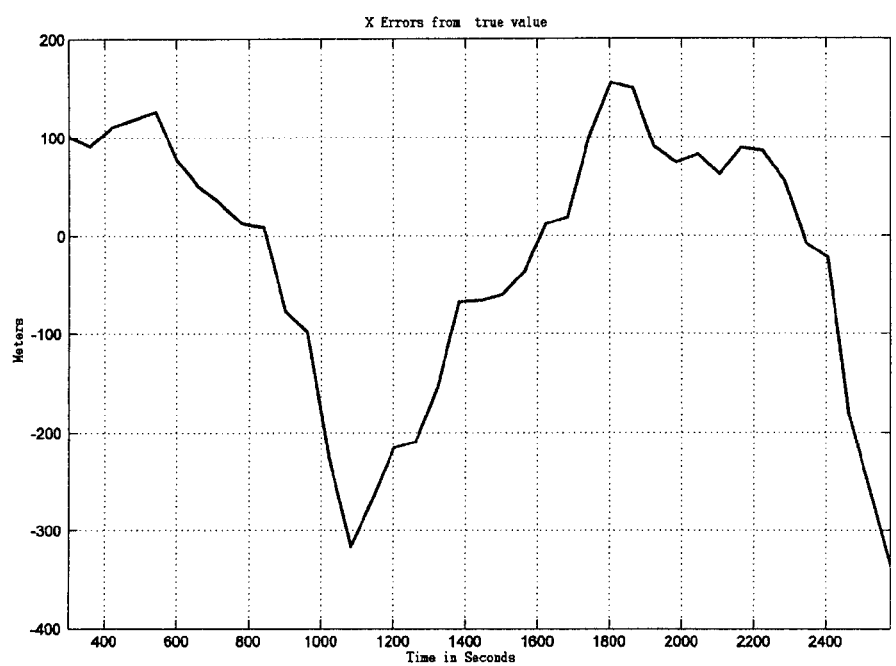
Figure 81: Position error along X direction for the first target of the fourth scenario with Doppler measurement.

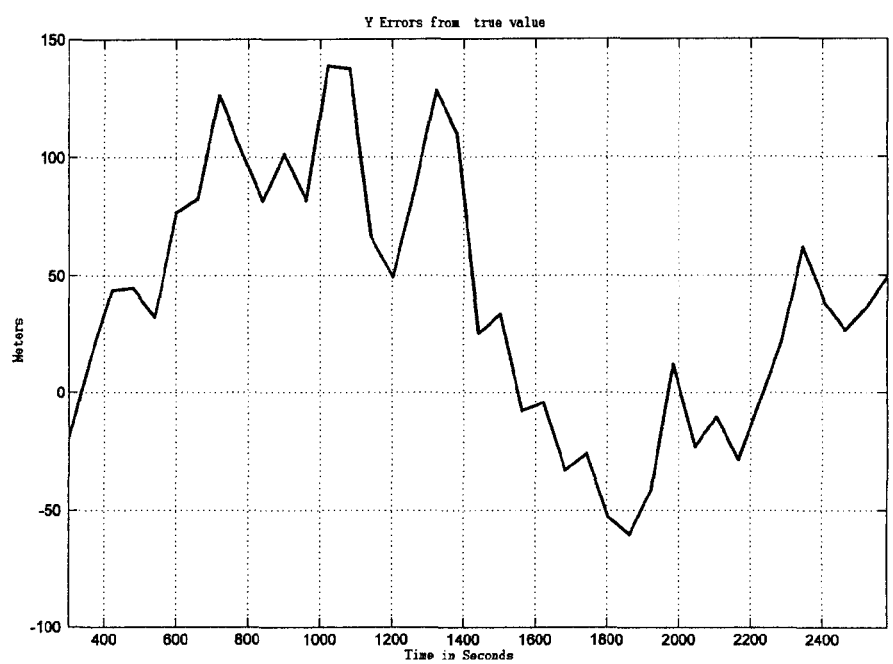
Figure 82: Position error along Y direction for the first target of the fourth scenario with Doppler measurement.

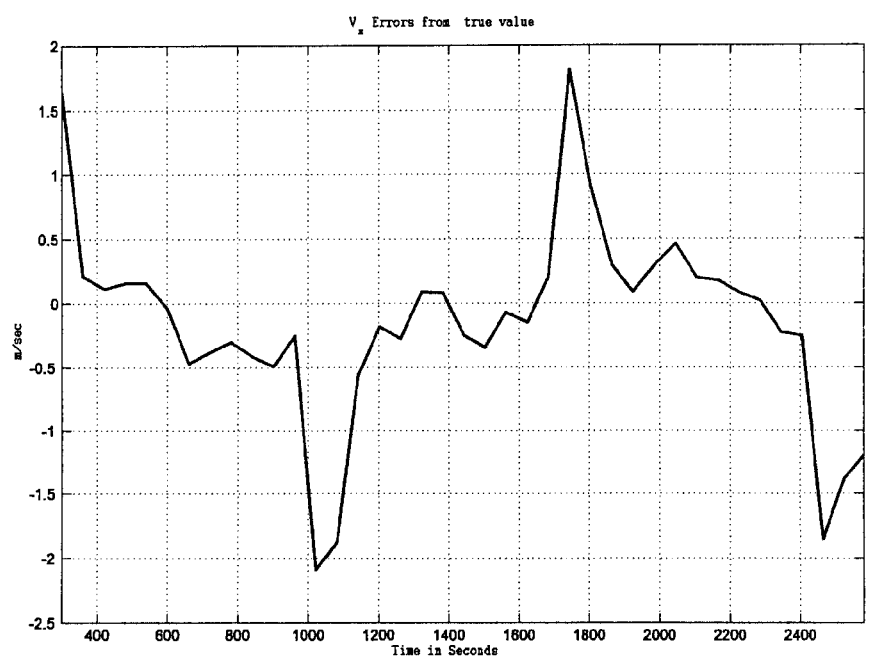
Figure 83: Velocity error along X direction for the first target of the fourth scenario with Doppler measurement.

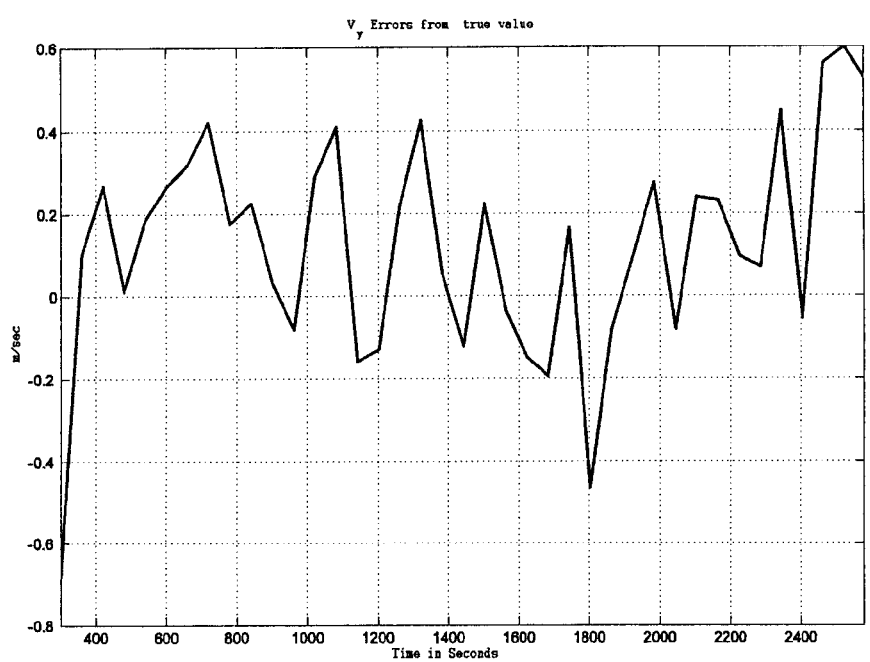
Figure 84: Velocity error along Y direction for the first target of the fourth scenario with Doppler measurement.

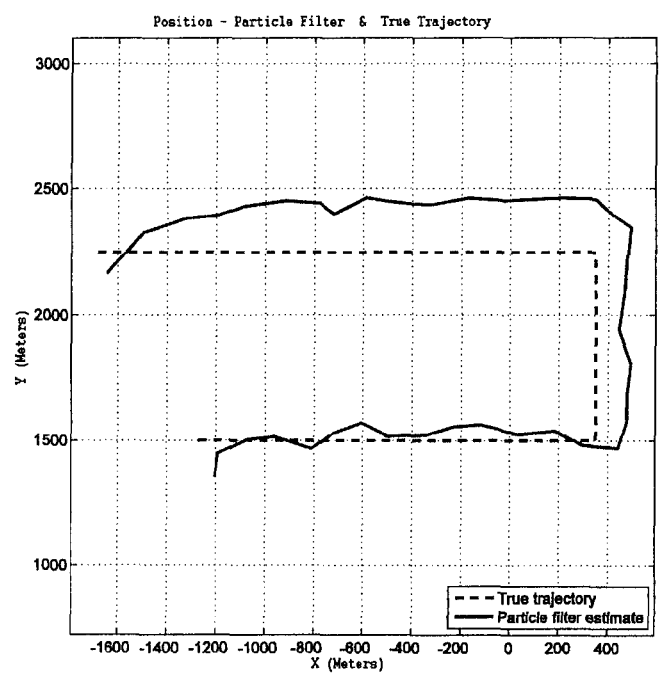
Figure 85: Estimated target track for the second target in the fourth scenario with Doppler measurement.

Figure 86: Position error along X direction for the second target of fourth scenario with Doppler measurement.

Figure 87: Position error along Y direction for the second target of fourth scenario with Doppler measurement.

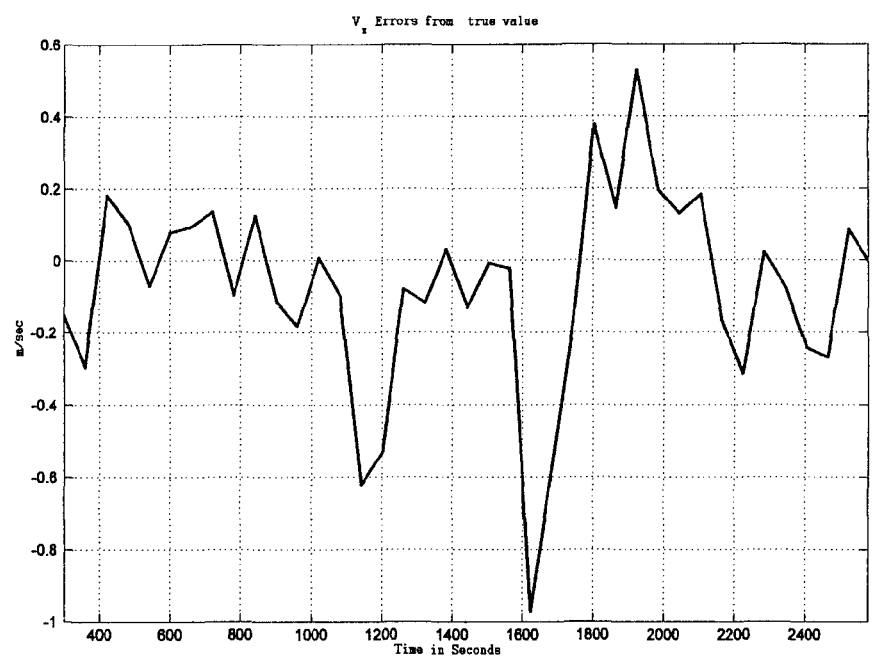
Figure 88: Velocity error along X direction for the second target of fourth scenario with Doppler measurement.

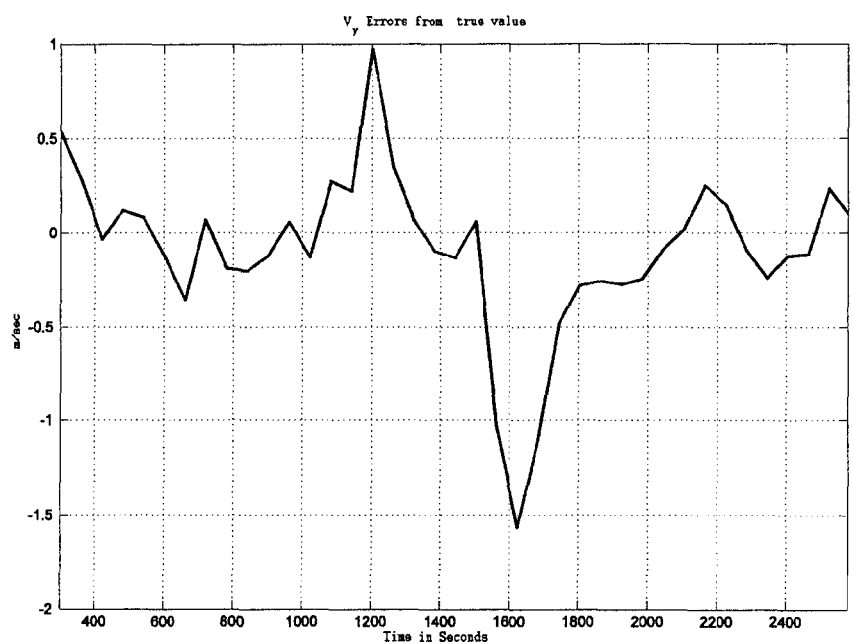
Figure 89: Velocity error along Y direction for the second target of the fourth scenario with Doppler measurement.

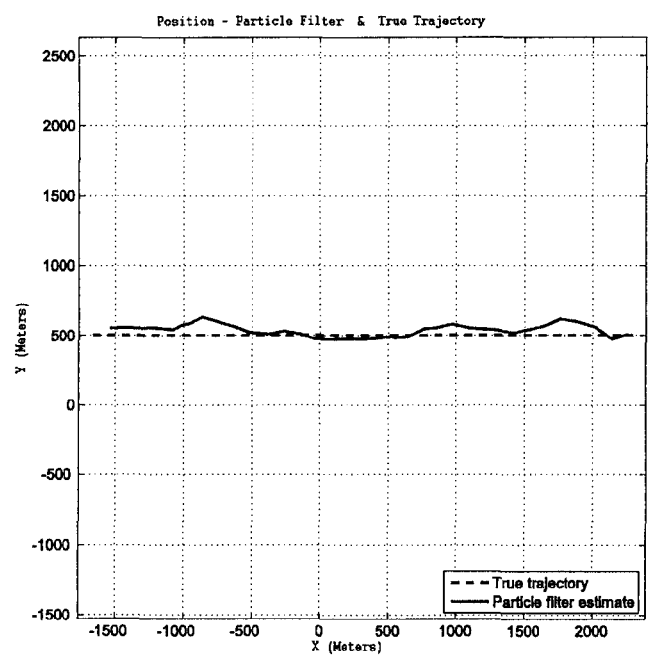
Figure 90: Estimated target track for the third target in the fourth scenario with Doppler measurement.

Figure 91: Position error along X direction for third target of the fourth scenario with Doppler measurement.

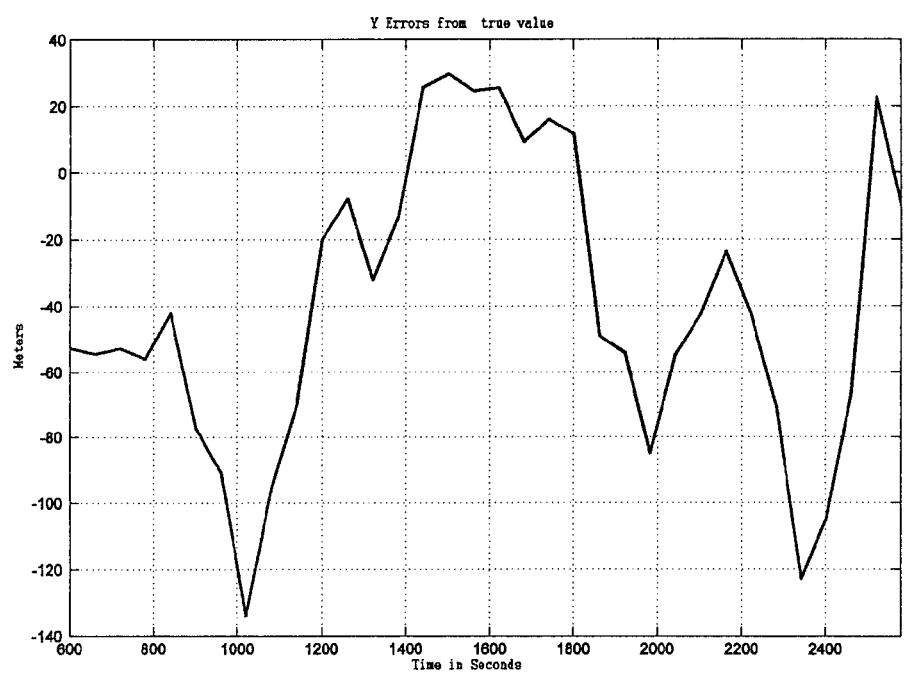
Figure 92: Position error along Y direction for third target of the fourth scenario with Doppler measurement.

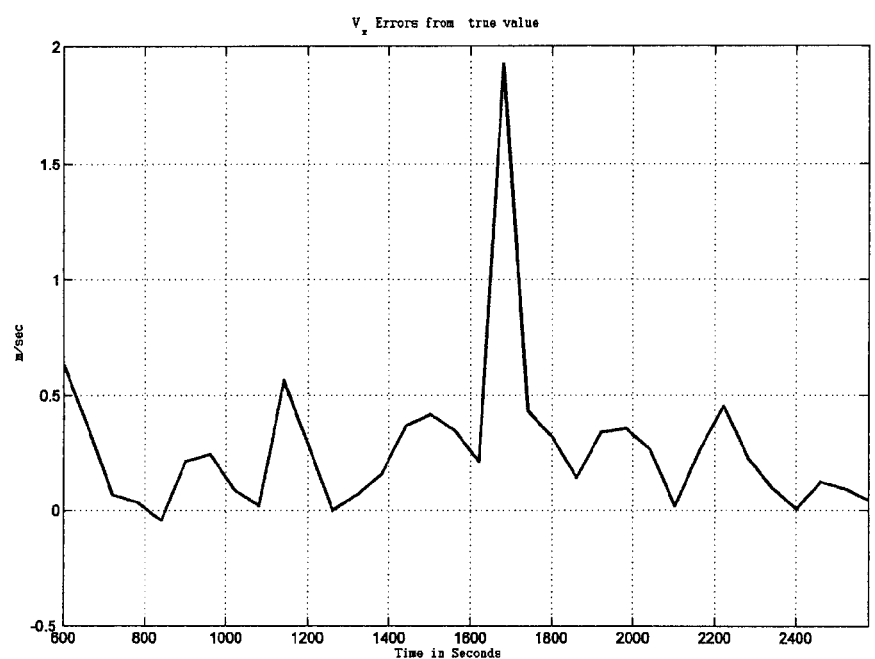
Figure 93: Velocity error along X direction third target of the fourth scenario with Doppler measurement.

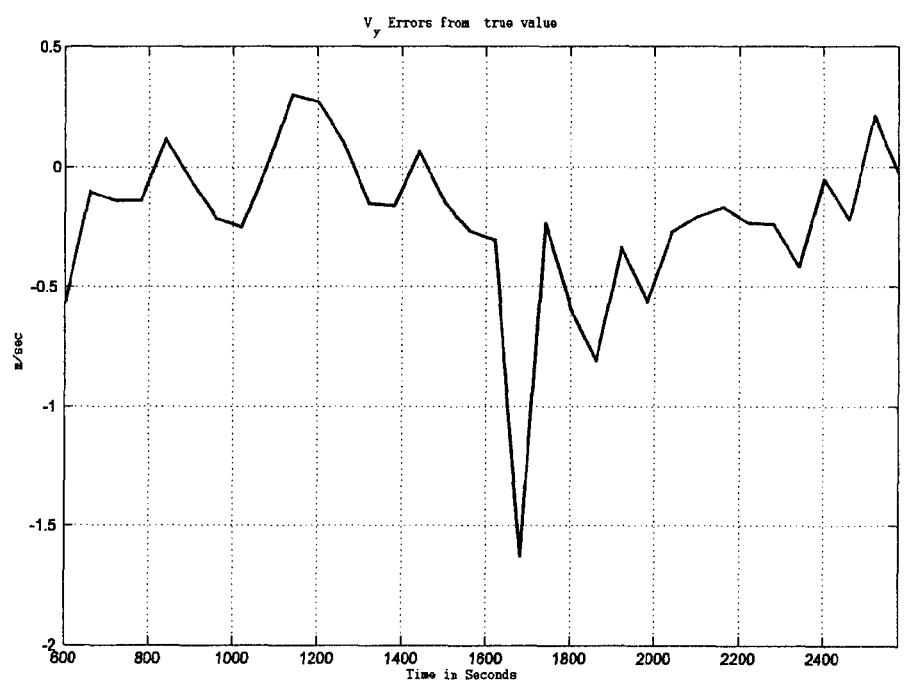
Figure 94: Velocity error along Y direction for third target of the fourth scenario with Doppler measurement.

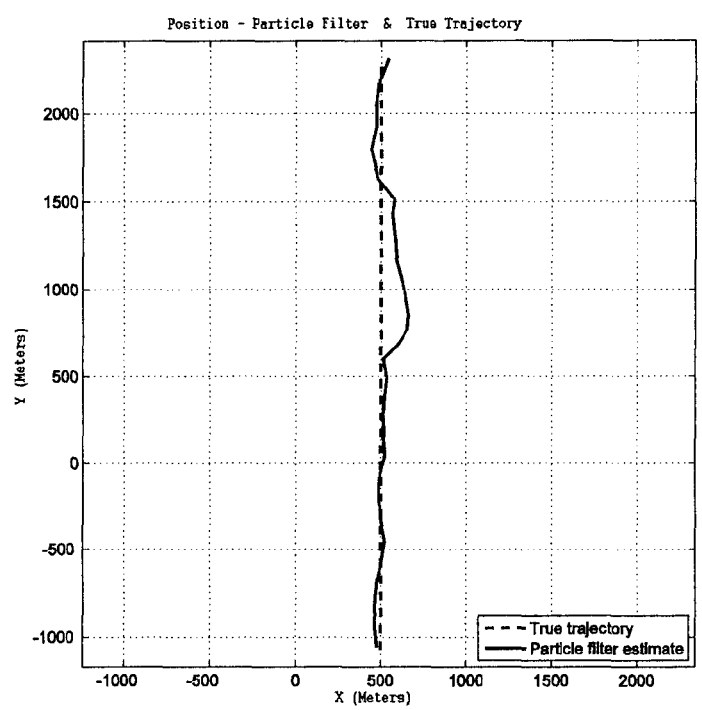
Figure 95: Estimated target track for the fourth target in the fourth scenario with Doppler measurement.

Figure 96: Position error along X direction for fourth target of the fourth scenario with Doppler measurement.

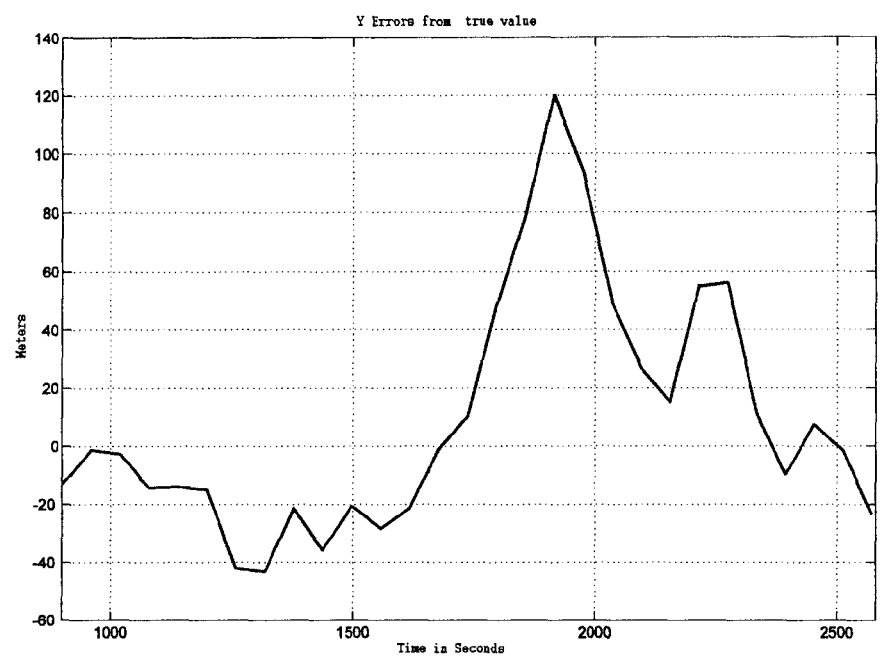
Figure 97: Position error along Y direction for fourth target of the fourth scenario with Doppler measurement.

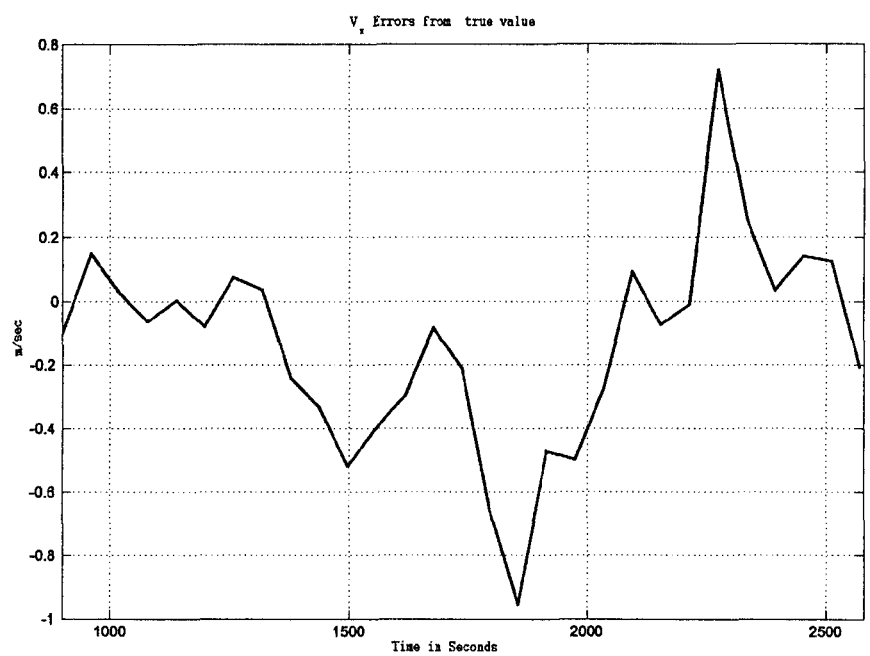
Figure 98: Velocity error along X direction fourth target of the fourth scenario with Doppler measurement.

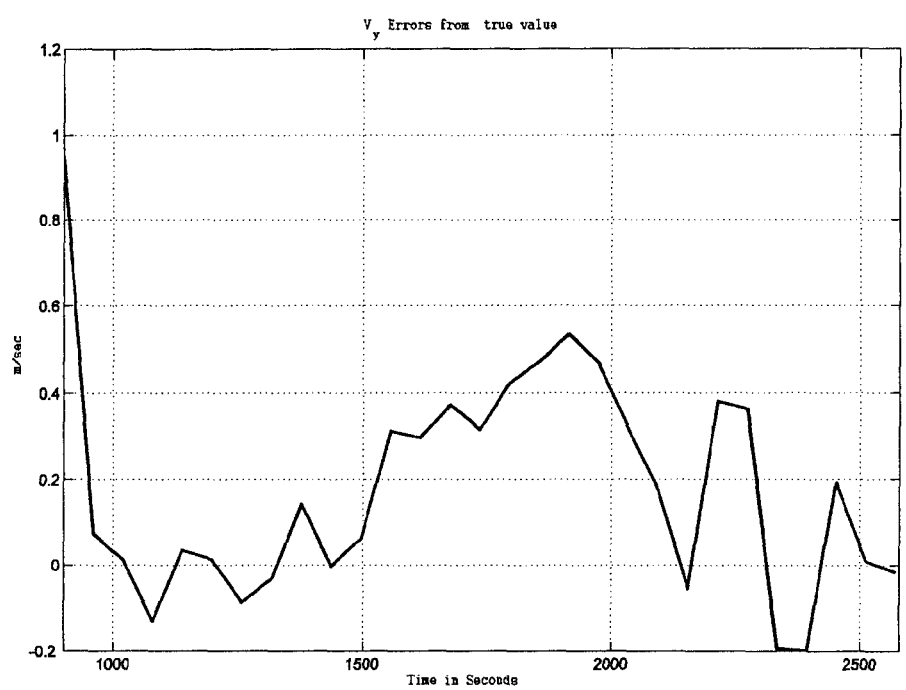
Figure 99: Velocity error along Y direction for fourth target of the fourth scenario with Doppler measurement.

TWO-STAGE FILTERING BASED METHOD FOR MULTIPLE TARGET TRACKING

TECHNICAL FIELD

The present invention relates to systems for detecting and tracking multiple previously unknown targets.

BACKGROUND OF THE INVENTION

Current systems for tracking moving targets are advancing from being totally dependent on a human operator to identify and follow the targets, to being automated aids that can identify and track the targets, with a final goal of being fully automated. These target tracking systems may rely, for example, on the use of sonar or radar.

In general, current target tracking systems can be categorized as either: passive systems or active systems. Passive systems may utilize passive receivers to acquire signals emitted from possible targets. Active systems may utilize one or more transmitters to produce a signal (described as a "ping") and one or multiple receivers to listen for reflections of the signal/ping from possible targets. If the transmitter and receiver are co-located the system is described as monostatic. If the transmitter and receiver are not co-located, the system is described as bistatic. When multiple transmitters or receivers are used, the system is described as multistatic.

Some examples of known techniques used for multi-target tracking are: (i) Maximum Likelihood (ML) probabilistic Data Association (PDA) (MLPDA); (ii) Multiple Hypothesis Tracking (MHT) and its variants such as, for example, Probabilistic MHT (PMHT), Maximum Likelihood PMHT, Distributed MHT; (iii) Probability Hypothesis Density (PHD) tracking and its variants such as, for example, Gaussian Mixture Cardinalized PHD; (iv) Particle Filtering (PF) and its variants.

Excluding the PF-based techniques, each of the foregoing techniques rely upon a linear Gaussian assumption and are thus not optimal for multiple target tracking applications or circumstances that do not follow these assumptions. PF-based techniques, on the other hand, are capable of dealing with nonlinear/non-Gaussian assumptions, making them more suitable for dealing with arbitrary sensor characteristics, motion dynamics and noise distributions. However, the known PF-based techniques also suffer from certain shortcomings regarding the problem of multiple target tracking. For instance, in some currently available systems, PF-based techniques are limited to only being capable of tracking a single target at a time (i.e. not multiple targets). The technique may be augmented to other techniques to allow for multiple-target tracking, such as, for example, by utilizing hierarchical data fusion systems, in which the sensor-level tracking may be performed using PF, and the central-level track fusion may be performed using a technique relying on a Gaussian model. Despite having improved performance at the sensor level, however, such adapted systems can still suffer from loss of performance if the sensor level tracks are fused using a Gaussian model. In order to avoid this, the overall technique should not need to rely, in any way, upon linear or Gaussian assumptions. Thus, the technique should rely on PF-based methods only.

As mentioned earlier the basic PF-based techniques can track only one target. One result of the foregoing limitations is that, where the PF-based technique is utilized to track multiple targets, the sample set of particles will tend to only track or follow one target over time, which will likely be the target that has the most persistent and/or consecutive measurements. Several attempts to overcome this have been made, including, for example, modifying the PF-based system.

For instance, some PF-based techniques have been modified to track a constant, previously-determined number of targets by augmenting the state vector used by the PF to include all the states for the known number of targets, while other techniques account for a previously unknown number of targets by estimating the number of targets and making the overall state vector size variable. Notwithstanding that the former approach is highly impractical in real life scenarios, neither approach has the capacity to tackle the initialization of new targets entering the surveillance area later in the scenario based on the observation sets.

Another approach of modifying known PF-based techniques has been to adapt the PF-based techniques to choose a large number of targets to constitute the state vector and to provide indicators of the targets that are considered to be "alive" (i.e. actual tracked targets). This approach is computationally expensive, however, because of the very large state vector.

Other approaches have modified the PF-based techniques to render them capable of tracking a random number of actual targets having a very small upper bound for the number targets tracked, however this approach is limited in its ability to cope with applications having a number of targets larger than the upper bound.

Finally, another approach of modifying known PF-based techniques is to render the technique capable of tracking an unknown number of targets by applying a separate filter (i.e. an additional PF) for each detected target. This solution is computationally expensive, and may not be feasible for performing online tracking.

There is therefore a need for a method of dealing with nonlinear/non-Gaussian systems (i.e. can deal with arbitrary sensor characteristics, motion dynamics, and noise distributions) that can be used for tracking an unknown and time-varying number of targets, without constraint on the number of targets tracked nor on the time of their appearance in the surveillance area. Such a method may be utilized in circumstances, such as for example:

having a high number of false contacts (i.e. high number of false measurements that are not related to a reflection from an actual target but rather to, for example, noise reaching the receiver);

having multiple reflections reaching the receivers, among which the true target reflections might be buried (such scenarios can arise, for example, in active multistatic systems); or having high possibilities of temporarily missing the true target contacts while still being able to keep continuous target tracks (such scenarios can arise, for example, in passive systems).

SUMMARY

A method for detecting and tracking an unknown and time-varying number of targets, without constraint on the number of targets, is provided. The method, which utilizes two-stage filtering or state estimation, can address nonlinear/non-Gaussian models with arbitrary sensor characteristics, motion dynamics, and noise distributions. The method can further address circumstances having: (i) high numbers of false contacts and multiple reflections reaching the receivers, among which the true target reflections could be buried; and (ii) high possibilities of temporarily missing the true target contacts while still being able to keep continuous target tracks. Thus, the present method may be suitable for active or passive target tracking systems.

More specifically, a method for tracking an unknown and time-varying number of targets within a surveillance area having sensors for receiving or detecting target information (i.e. having sensors that monitor the surveillance area), the method comprising the following steps:

(a) providing a first non-linear filter, such as, for example a Particle Filter or a Mixture Particle Filter, for detecting at least one target within the surveillance area or detecting the fact that there is no target in the area, wherein the first filter is initialized by a uniform density covering the area, and reset to said uniform density, periodically, upon a pre-determined or pre-defined number of time intervals or "iterations". The foregoing "iterations" may vary and will depend upon the time necessary for system sensors to receive and gather target measurements or information (i.e. the "iterations" will depend upon the sensor used, the speed/manoeuvrability of the target and the application of the method). The pre-determined number of those "iterations" upon which the filter will reset will depend upon the particular application of the method. For clarity, the first filter begins with a uniform probability density of the states over the surveillance area, which, for a PF, is a random uniformly distributed sample set, and periodically "resets" to the random uniformly distributed sample set after the pre-determined number of iterations.

(b) providing a clustering technique, such as, for example, a density-based clustering technique, to detect clusters corresponding to the detected at least one target by the first filter or detect the fact that there is no target in the area by detecting no clusters, wherein the clustering technique is adapted to operate at the pre-determined time intervals (after the same pre-determined number of iterations) and before the first filter is reset to a uniform density. More specifically, prior to the "reset" of the first filter, the clustering technique operates to detect clusters corresponding to different targets detected by the first filter and send this information to the second filter. The second filter will determine the existence of any new clusters that were not initially detected by the first filter and clustering technique, and thus were not tracked by the second filter (as might occur, for example, in a circumstance where a new target appears in the surveillance area), and (c) providing a second non-linear filter, such as, for example, a Particle Filter or a Mixture Particle Filter, for tracking the at least one target detected by the first filter and the clustering technique. More specifically, the second non-linear filter is initiated upon the first run of the clustering technique, and continues to operate, at each iteration, to track the at least one target previously detected by the first filter and clustering technique. In addition, and subsequent to the periodic run of the clustering technique at the pre-determined number of iterations, the second filter also receives information about the target clusters, from the clustering technique (i.e. the clusters detected) and compares these clustered targets to the at least one target that the second filter is already tracking, thereby tracking both the detected at least one target, as well as the "newly detected" target clusters.

For clarity, the clustering technique, which runs periodically every pre-determined number of iterations serves to provide an interconnection between the first and second filter. This is because the clustering technique first detects the clusters in the probability density that are output from the first filter before it is "reset", and second, the clustering technique then passes these detected clusters to the second filter, such that the second filter may determine if any of the clusters correspond to "newly" detected targets, that were not previously being tracked by the second filter and start to track them in addition to the previously tracked ones.

The above architecture enables the first filter and thus the present method to detect new targets, which can enter the scene at any time, and causing new clusters to be detected when the clustering technique is next run.

In circumstances where there is no target in the surveillance area, the first filter continues to operate, but the output from the first filter will remain a uniform probability density during and for each of the pre-determined iterations. Accordingly, in such circumstances, the clustering technique will not be initiated (i.e. no "peaks" or local maxima of the probability density will be detected), and no cluster will be detected. The second filter will also not be initiated. Thus, the present method is capable of monitoring the surveillance area and providing information, despite the absence of any targets within the area. Where one or more targets appears within the surveillance area, the uniform probability density of the first filter will begin to result in "peaks" corresponding to the detected targets, said peaks being detected by and initiating the clustering technique, and the second filter, which begins to run to track the targets. This technique will proceed as outlined herein, and any new targets entering the surveillance area can be detected and tracked upon their appearance within the area.

The present method serves to track an unknown and time-varying number of targets within a surveillance area, regardless of the monitoring sensors utilized by the underlying system. Each of the first and second filter may utilize system and measurement models, wherein the choice of models used may vary depending upon the nature of target being tracked, the targets motion characteristics and manoeuvrability, as well as on the type of sensors used and the measurements provided from them.

DESCRIPTION OF THE DRAWINGS

FIG. 1: A flow chart diagram demonstrating one iteration of the present method.

FIG. 2: An example of source-receiver-target geometry in an active system.

FIG. 3: A flow chart diagram demonstrating one iteration of the Clustered Mixture PF algorithm of Example 1 and 2.

FIG. 4: An example of a two dimensional histogram of particles showing six clusters corresponding to six targets.

FIG. 5: First simulated scenario, the active buoy is in green and the seven receivers are in red.

FIG. 6: Estimated target track for the first target in the first scenario.

FIG. 7: Position error along X direction for the first target of the first scenario.

FIG. 8: Position error along Y direction for the first target of the first scenario.

FIG. 9: Velocity error along X direction for the first target of the first scenario.

FIG. 10: Velocity error along Y direction for the first target of the first scenario.

FIG. 11: Estimated target track for the second target in the first scenario.

FIG. 12: Position error along X direction for the second target of the first scenario.

FIG. 13: Position error along Y direction for the second target of the first scenario.

FIG. 14: Velocity error along X direction for the second target of the first scenario.

FIG. 15: Velocity error along Y direction for the second target of the first scenario.

FIG. 16: Estimated target track for the third target in the first scenario (i.e. the first stationary clutter) showing the noise in estimation as compared to the true location.

FIG. 17: Position error along X direction for third target in the first scenario (i.e. the first stationary clutter).

FIG. 18: Position error along Y direction for third target in the first scenario (i.e. the first stationary clutter).

FIG. 19: Velocity error along X direction third target in the first scenario (i.e. the first stationary clutter).

FIG. 20: Velocity error along Y direction for third target in the first scenario (i.e. the first stationary clutter).

FIG. 21: Second simulated scenario having three moving targets with two crossing each other and one starting later, the active buoy is in green and the sixteen receivers are in red.

FIG. 22: A snapshot from the results of the two filters during the second simulated scenario. In left figure the current moving target locations are in green and stationary clutters are in orange, the seven corresponding clusters of particles can be seen in the right figure.

FIG. 23: Estimated target track for the first target in the second scenario.

FIG. 24: Position error along X direction for the first target of the second scenario.

FIG. 25: Position error along Y direction for the first target of the second scenario.

FIG. 26: Velocity error along X direction for the first target of the second scenario.

FIG. 27: Velocity error along Y direction for the first target of the second scenario.

FIG. 28: Estimated target track for the second target in the second scenario.

FIG. 29: Position error along X direction for the second target of the second scenario.

FIG. 30: Position error along Y direction for the second target of the second scenario.

FIG. 31: Velocity error along X direction for the second target of the second scenario.

FIG. 32: Velocity error along Y direction for the second target of the second scenario.

FIG. 33: Estimated target track for the third target in the second scenario.

FIG. 34: Position error along X direction for the third target of the second scenario.

FIG. 35: Position error along Y direction for the third target of the second scenario.

FIG. 36: Velocity error along X direction for the third target of the second scenario.

FIG. 37: Velocity error along Y direction for the third target of the second scenario.

FIG. 38: Third simulated scenario, the sixteen passive sonobuoys are in red.

FIG. 39: Estimated target track for the first target in the third scenario without Doppler measurement.

FIG. 40: Position error along X direction for the first target of the third scenario without Doppler measurement.

FIG. 41: Position error along Y direction for the first target of the third scenario without Doppler measurement.

FIG. 42: Velocity error along X direction for the first target of the third scenario without Doppler measurement.

FIG. 43: Velocity error along Y direction for the first target of the third scenario without Doppler measurement.

FIG. 44: Estimated target track for the second target in the third scenario without Doppler measurement.

FIG. 45: Position error along X direction for the second target of third scenario without Doppler measurement.

FIG. 46: Position error along Y direction for the second target of third scenario without Doppler measurement.

FIG. 47: Velocity error along X direction for the second target of third scenario without Doppler measurement.

FIG. 48: Velocity error along Y direction for the second target of the third scenario without Doppler measurement.

FIG. 49: Estimated target track for the first target in the third scenario with Doppler measurement.

FIG. 50: Position error along X direction for the first target of the third scenario with Doppler measurement.

FIG. 51: Position error along Y direction for the first target of the third scenario with Doppler measurement.

FIG. 52: Velocity error along X direction for the first target of the third scenario with Doppler measurement.

FIG. 53: Velocity error along Y direction for the first target of the third scenario with Doppler measurement.

FIG. 54: Estimated target track for the second target in the third scenario with Doppler measurement.

FIG. 55: Position error along X direction for the second target of third scenario with Doppler measurement.

FIG. 56: Position error along Y direction for the second target of third scenario with Doppler measurement.

FIG. 57: Velocity error along X direction for the second target of third scenario with Doppler measurement.

FIG. 58: Velocity error along Y direction for the second target of the third scenario with Doppler measurement.

FIG. 59: Fourth simulated scenario, the sixteen passive sonobuoys are in red.

FIG. 60: Estimated target track for the first target in the fourth scenario without Doppler measurement.

FIG. 61: Position error along X direction for the first target of the fourth scenario without Doppler measurement.

FIG. 62: Position error along Y direction for the first target of the fourth scenario without Doppler measurement.

FIG. 63: Velocity error along X direction for the first target of the fourth scenario without Doppler measurement.

FIG. 64: Velocity error along Y direction for the first target of the fourth scenario without Doppler measurement.

FIG. 65: Estimated target track for the second target in the fourth scenario without Doppler measurement.

FIG. 66: Position error along X direction for the second target of fourth scenario without Doppler measurement.

FIG. 67: Position error along Y direction for the second target of fourth scenario without Doppler measurement.

FIG. 68: Velocity error along X direction for the second target of fourth scenario without Doppler measurement.

FIG. 69: Velocity error along Y direction for the second target of the fourth scenario without Doppler measurement.

FIG. 70: Estimated target track for the third target in the fourth scenario without Doppler measurement.

FIG. 71: Position error along X direction for third target of the fourth scenario without Doppler measurement.

FIG. 72: Position error along Y direction for third target of the fourth scenario without Doppler measurement.

FIG. 73: Velocity error along X direction third target of the fourth scenario without Doppler measurement.

FIG. 74: Velocity error along Y direction for third target of the fourth scenario without Doppler measurement.

FIG. 75: Estimated target track for the fourth target in the fourth scenario without Doppler measurement.

FIG. 76: Position error along X direction for fourth target of the fourth scenario without Doppler measurement.

FIG. 77: Position error along Y direction for fourth target of the fourth scenario without Doppler measurement.

FIG. 78: Velocity error along X direction fourth target of the fourth scenario without Doppler measurement.

FIG. 79: Velocity error along Y direction for fourth target of the fourth scenario without Doppler measurement.

FIG. 80: Estimated target track for the first target in the fourth scenario with Doppler measurement.

FIG. 81: Position error along X direction for the first target of the fourth scenario with Doppler measurement.

FIG. 82: Position error along Y direction for the first target of the fourth scenario with Doppler measurement.

FIG. 83: Velocity error along X direction for the first target of the fourth scenario with Doppler measurement.

FIG. 84: Velocity error along Y direction for the first target of the fourth scenario with Doppler measurement.

FIG. 85: Estimated target track for the second target in the fourth scenario with Doppler measurement.

FIG. 86: Position error along X direction for the second target of fourth scenario with Doppler measurement.

FIG. 87: Position error along Y direction for the second target of fourth scenario with Doppler measurement.

FIG. 88: Velocity error along X direction for the second target of fourth scenario with Doppler measurement.

FIG. 89: Velocity error along Y direction for the second target of the fourth scenario with Doppler measurement.

FIG. 90: Estimated target track for the third target in the fourth scenario with Doppler measurement.

FIG. 91: Position error along X direction for third target of the fourth scenario with Doppler measurement.

FIG. 92: Position error along Y direction for third target of the fourth scenario with Doppler measurement.

FIG. 93: Velocity error along X direction third target of the fourth scenario with Doppler measurement.

FIG. 94: Velocity error along Y direction for third target of the fourth scenario with Doppler measurement.

FIG. 95: Estimated target track for the fourth target in the fourth scenario with Doppler measurement.

FIG. 96: Position error along X direction for fourth target of the fourth scenario with Doppler measurement.

FIG. 97: Position error along Y direction for fourth target of the fourth scenario with Doppler measurement.

FIG. 98: Velocity error along X direction fourth target of the fourth scenario with Doppler measurement.

FIG. 99: Velocity error along Y direction for fourth target of the fourth scenario with Doppler measurement.

DESCRIPTION OF EMBODIMENTS

An improved new method for detecting and tracking an unknown number and time-varying number of targets, without limitation or constraint on the number of targets, is provided. The present method can deal with nonlinear/non-Gaussian models, thus it can deal with arbitrary sensor characteristics, motion dynamics, and noise distributions.

In addition, the present method is suitable for "harsh" scenarios and applications that may have: (i) high numbers of false contacts and multiple reflections at the receivers, among which the true target reflections could be buried; and (ii) high possibilities of temporarily missing the true target contacts while still being able to keep continuous target tracks.

More specifically, and having regard to the flowchart provided in FIG. 1, the present method comprises the following steps:

(a) Providing a First Non-Linear Filter for Detecting at Least One Target.

This first non-linear filter or state estimation technique can accommodate both a uniform probability density and a multimodal probability density. Further, this first filter or state estimation technique may be capable of dealing with nonlinear systems and/or with non-Gaussian noises. In one embodiment, the first filter may be a Particle Filter (PF). Alternatively, in another embodiment, the first filter may be any varied or modified Particle Filter that may, for instance, incorporate improved sampling from better importance density or densities, for achieving faster convergence to target locations and thus the predefined period of iteration or time epochs before reset can be decreased (i.e. consist of a smaller number of iterations as compared with the case where other less performing filters are used). In a preferred embodiment, the first filter may be a Mixture Particle Filter.

(b) Providing a Clustering Technique for Detecting Different Clusters of the at Least One Target.

The clustering technique of the present method should be capable of being applied on the probability density, which is the output of the first filter, and capable of detecting the different clusters corresponding to the different targets, if any. In one embodiment, the clustering technique is a density-based clustering technique, and (c) Providing a Second Non-Linear Filter for Tracking the at Least One Target, Wherein the Second Filter is Further Adapted to Track the Detected Clusters of Targets Determined by the Clustering Technique.

The second filter or state estimation technique should be capable of accommodating a multimodal probability density. The second filter or state estimation technique should be capable of dealing with nonlinear systems and/or non-Gaussian noises. In one embodiment, the second filter may be a Particle Filter. Alternatively, in another embodiment, the second filter may be a varied or modified Particle Filter that can incorporate improved sampling from better importance density or densities. In a preferred embodiment, the second filter may be a Mixture Particle Filter.

This method uses only two filters or two state estimation techniques, so the number of filters does not grow with the number of targets tracked as compared to techniques that rely on, for example, KF, Extended KF (EKF), or Unscented KF (UKF), these latter techniques need to initiate and pursue running of a filter for each target tracked and they will need explicit routine for assigning measurements to tracks (which is a weak point in several available techniques). These previously available techniques also will suffer in problems with high numbers of false contacts and multiple reflections reaching the receivers because they have to initiate and temporarily pursue a large number of filters, the majority of which will be for false targets.

A brief overview of the role of each first and second filter, and the clustering technique is hereby provided, for explanatory purposes, and should in no way be considered to limit or alter the scope of the present method.

The first filter is provided for target detection. The probability density (for example represented by particles in the case of Particle Filter) will be multi-modal with each of the different modes corresponding to a detected target. The probability density is then clustered and each cluster corresponds to a detected target. The second filter then operates to track the detected targets by tracking the different clusters. In the case of using a Particle Filter for the second filter, each particle in the filter comprises a cluster ID in addition to the state vector values and the weight.

The first filter starts with a uniform probability density of the states (in the case of Particle Filter, a random uniformly distributed sample set) over the surveillance area and "resets" to such a random set periodically after a predefined number of iterations or time epochs, the number of these iterations may vary and will depend upon the application at hand. The surveillance area may be, for example, a two dimensional (2D) area or a three dimensional (3D) volume. Just before the "reset" of the first filter, the clustering technique is run and applied on the probability density obtained from the first filter to detect the different clusters corresponding to the different targets detected. The newly detected clusters that were not previously tracked by the second filter are passed to the first filter. This enables the first filter and thus the present method to detect new targets, which can enter the scene at any time, and causing new clusters to be detected when the clustering technique is next run.

The second filter commences operation following the end of operation of the first run of the clustering technique, and continues, uninterrupted, for each iteration or time epoch thereafter. In this first run of the second filter, the filter may begin tracking different clusters passed to it by the clustering technique. Afterward, every pre-determined period of iterations or time epochs (as discussed above), and after the end of operation of the clustering technique, the second filter receives the detected clusters from the clustering technique, determines which clusters are new, and adds them to the different "previously tracked" clusters. Where the second filter is a Particle Filter, sampling from the new clusters is performed in the second filter sampling step. In the iterations where the clustering technique is not initiated, both first and second filters continue to run normally without any interconnection between them.

It should be noted that in circumstances where there is no target in the surveillance area, the first filter continues to operate, but the output from the first filter will remain a uniform probability density during and for each of the pre-determined iterations (e.g. in the case of a PF, the output of the filter will remain a uniformly distributed sample set). Accordingly, in such circumstances, the clustering technique will not be initiated (i.e. no "peaks" or local maxima of the probability density will be detected), and no cluster will be detected. The second filter will also not be initiated. Thus, the present method is capable of monitoring the surveillance area and providing information about same, even in the absence of any targets within the area. Where one or more targets appears within the surveillance area, the uniform probability density of the first filter will begin to result in "peaks" corresponding to the detected targets (e.g. in the case of a PF, there will be groups or clusters of particles gathering in the locations of the targets), said peaks being detected by and initiating the clustering technique, and the second filter, which begins to run to track the targets. This technique will proceed as outlined herein, and any new targets entering the surveillance area can be detected and tracked upon their appearance within the area.

It is to be noted that the problem of measurement to track association is not a standalone component in the present method because it implicitly happen in the Particle Filter. The PF capability of using nonlinear measurement models enables the direct relation between the measurements (such as, for example, bearing and/or range measurements) and the target position, in the measurement model. Thus, in the update phase of PF, all the incoming measurements are used to weight all the intermediate particles coming out of the prediction phase, and the resampling step will remove the particles with low weights, so the data association implicitly happens in this weighting phase. In the case of Mixture PF, for the additional samples generated from measurements, they are weighted with respect to all the particles from last iteration and the latest motion before going to the resampling step.

It is understood that the present method may be applicable in the context of sonar systems and/or radar systems, regardless of whether said systems are active or passive. It is further understood that the present method may be generally applicable to any multiple target tracking application.

In one embodiment, each of the first and second filters provided in the present method are Mixture Particle Filters, the clustering technique used is a density-based clustering technique, and as exemplified in Example 1, the present method may be applied to multi-static active sonar systems.

In another embodiment, each of the first and second filters provided are Mixture Particle Filters, the clustering technique used is a density-based clustering technique, and, as exemplified in Example 2, the present method may be applied to passive sonar systems.

It is contemplated that the each of the first and second filters can be any PFs (such as, for example, Sampling/Importance Resampling (SIR) PF or any other PF). It is further contemplated that these PFs can be variants that benefit, during the sampling phase, from information from both the system model (which is the target motion model) and the observations (measurements from sensors), an example of such PFs is the Auxiliary PF also called Auxiliary SIR (ASIR) PF.

It is contemplated that the second filter may be replaced by a bank of KF-based filters or UKF-based filters or any other filters.

It is contemplated that the first filter may be replaced by another technique for detecting targets that might be more suitable for certain applications.

It is contemplated that other suitable clustering techniques may be used instead of the clustering technique used.

It is contemplated that in addition to, or as an alternative of, the bearing measurements only or the bearing and possibly the Doppler shift (or range rate) if available in case of passive systems or the bearing and range measurements or the bearing and range and possibly the Doppler shift (or range rate) if available in active systems, other measurements may be used and thus the measurement model may be augmented or replaced. Without limitation, examples of such measurements may be traces obtained from the association of detections between the consecutive time steps (which also can be seen as traces on the clutter image), the rate of change of these traces relate to target velocity. These traces can as well give an indication of change in relative range.

It is contemplated that the first and second filters can use other system models that may be better suited towards a certain application and the nature of targets to be tracked (i.e. not necessarily the near constant velocity model used in the present Examples). The near constant velocity model suits a certain category of targets that are not evasive and are not highly manoeuvrable, but it is understood that other system models can be used to suit the nature of motion and/or manoeuvrability of the targets to be tracked in other applications.

It is contemplated that the first and second filters can use multiple different system models either together simultaneously, or in switching mode (i.e. to "switch" or alternate between one system model and another, more suitable, system model depending upon the application). If multiple different system models are used simultaneously, PF-based filters can accommodate this by sampling multiple particles from each particle of the last iteration. Each particle of last iteration will be processed by each used probabilistic system model (i.e. each used system model together with process noise) to generate multiple possible successors in the sampling step. Measurements will be used to weight the different successor particles, and resampling will eliminate less likely candidates and duplicate strong candidates. Furthermore, techniques that learn or gather features about the target motion might be used as factors for choosing the system model or models to use.

It is contemplated that when the number of contacts is extremely large such as, for example, in multistatic active systems, some technique might be used to reduce the number of contacts to be introduced to the filters, to enhance the computational load and the running time. A very basic technique, but might cause missing the true target contacts, is applying a threshold by the signal to noise (SNR) values of the contacts. So the contacts that have SNR lower then the threshold are discarded right away. As mentioned, this basic technique might cause the missing of the true target contacts if they are very weak.

It is contemplated that when there is a large number of false contacts and the true reading (contact) is buried under false information, other techniques that try to identify the true contact or a set of possible true contacts from the false ones based on the current target tracks at hand can be used. An example of such technique is a fast search technique that can be applied to the very large number of incoming contacts to try to intelligently prune them before passing them to the filters. The fast search will keep all contacts that are near true target tracks. This operation is already implicitly happening by the filters if they are provided with all the contacts without any per-pruning. But the other techniques, such as for example the search technique, might be seeked for enhancing the computational complexity if the number of contacts is extremely large.

It is contemplated that the present method outputs or results can be plotted on a screen for possible operator to follow the solution. Furthermore the raw measurement contacts might also be plotted, whether on the same or separate plots.

It is contemplated that the present method can be fully or partially automated, or aided by a human operator. Where the present method is aided by an operator, the operator can (when needed) provide input, such as, for example, (i) information about the operator observance of the plotted contacts on a display, (ii) insertion of new targets; (iii) removal of a false target tracks; (vi) switching between different system models or choosing a set of system models to be used; and (v) choosing a range of velocities and/or dynamics to be used for the targets of interest to focus the method on tracking those targets of interest.

It is contemplated that to enhance the tracking solution, the present method can benefit from additional source of knowledge about the sensors positions. Such knowledge about sensor positions may come from, for example, a GNSS receiver at the sensor or attached to it, other motion sensors (such as, for example, inertial sensors, barometers, magnetometers, velocity readings derived from Doppler transceivers on the sensors), by an integrated solution such as GNSS/motion sensors integration, or by other positioning solutions suitable for the tracking application a surveillance area.

It is contemplated that the present method may be used for any target tracking problem such as, for example, tracking objects or people in video streams and/or in systems with one or multiple cameras, or using any other type of sensors (not necessarily cameras or vision systems), and that the present method may be used for tracking targets in sensors networks and wireless sensors networks used for tracking.

Without any limitation to the foregoing, the present method is further described by way of the following examples.

EXAMPLES

Example 1

Clustered Mixture Particle Filter for Underwater Multi-Target Tracking in Multistatic Active Sonar Systems This example focuses on sonar systems used for underwater target tracking. For underwater target tracking, sonar systems often use remote sensors, such as sonobuoys, which are deployed from an airplane or ship and submerged for monitoring the underwater acoustics. There are two main categories of sonar systems: passive systems and active systems. Passive systems employ passive receivers to acquire acoustic energy emitted by possible targets. Active sonar systems use one or more transmitters to produce an acoustic signal (described as a ping) and multiple receivers to listen for reflections of this ping from a target. If the transmitter and receiver are co-located, the system is described as monostatic. If the transmitter and receiver are not co-located, the system is described as bistatic. When multiple transmitters or receivers are used, the system is described as multistatic. The focus of this example is on the multistatic active system.

Despite the advantages of multistatic active sonar systems, their use is challenging because of the extremely large number of false contacts and multiple reflections reaching the receivers, among which true target reflections might be buried.

A two-dimensional (2D) case is presented in this Example 1. It is understood that such a case is used here for demonstration purposes of the present two-stage filtering technique for multi-target tracking in active systems only and in no way should limit the scope of the present method.

Multistatic Target Tracking Problem Formulation

Problem Statement

The aim is to estimate the state of the target $x_k$ at the current time step k, given a set of measurements (observations) $Z_k=\{z_0, \ldots, z_k\}$ acquired at time steps 0, 1, ..., k. The state of the target is $x_k=[x_k, y_k, v_{x,k}, v_{y,k}]^T$, where $x_k$ and $y_k$ constitute the 2D target position relative to the origin of the surveillance area, and $v_{x,k}$ and $v_{y,k}$ constitute the target 2D velocity.

The nonlinear state transition model (system or motion model) is given by $$x_k = f(x_{k-1}, w_{k-1}) \quad (1)$$

where $w_k$ is the process noise which is independent of the past and present states and accounts for the uncertainty in the target motion. The state measurement model is $$z_k = h(x_k, v_k) \quad (2)$$

where $v_k$ is the measurement noise which is independent of the past and current states and the process noise and accounts for uncertainty in the receiver sonobuoys measurements.

The measurement model is a nonlinear model as will be seen in the next subsection. This suits the PF, which can deal with nonlinear models.

Measurement Model

The work in this Example 1 is at the contact level, i.e. this technique can be implemented or used regardless of the sensors used because the appropriate processing at the acoustic level is achieved to prepare the contact level data. Each contact at each receiver contains time of arrival at the receiver, the time when the signal originated from the source, and the bearing information. From the propagation time (which is the difference between time of arrival at the receiver and the time of transmission from the source) and the bearing, the range from target to receiver can be calculated. Thus, the two measurements that will be considered from each contact are the bearing and range. In order to derive the full measurement model, the case of one receiver, one active source and one target is considered first. At time k the location of the source is $(x_k^S, y_k^S)$, the location of the receiver is $(x_k^R, y_k^R)$ and the location of the target is $(x_k, y_k)$. As shown in FIG. 2, the bearing of the reflected signal from the target is $\theta$, the distance between the source and target is $l_1$, the distance between the target and receiver is $l_2$, the distance between the source and receiver is $l_3$.

From the geometry of the figure, the following can be deduced:

$$\psi = \arctan((x_k^S - x_k^R), (y_k^S - y_k^R)) - \theta \quad (3)$$

$$\ell_3 = ((x_k^S - x_k^R)^2 + (y_k^S - y_k^R)^2)^{\frac{1}{2}} \quad (4)$$

$$\ell_2 = \frac{c^2\tau^2 - \ell_3^2}{2(c\tau - \ell_3 \cos\psi)} \quad (5)$$

where c is the speed of sound in water, and $\tau$ is the propagation time. The range from the target to the receiver is $r=l_2$.

For the case with M receivers, the measurement model is as follows:

$$z_k = \begin{bmatrix} r_k^1 \\ \vdots \\ r_k^M \\ \theta_k^1 \\ \vdots \\ \theta_k^M \end{bmatrix} = \begin{bmatrix} ((x_k - x_k^{R1})^2 + (y_k - y_k^{R1})^2)^{\frac{1}{2}} \\ \vdots \\ ((x_k - x_k^{RM})^2 + (y_k - y_k^{RM})^2)^{\frac{1}{2}} \\ \arctan((x_k - x_k^{R1}), (y_k - y_k^{R1})) \\ \vdots \\ \arctan((x_k - x_k^{RM}), (y_k - y_k^{RM})) \end{bmatrix} + v_k \quad (6)$$

where the measurement noise is $v_k \sim N(0, R_k)$, and $R_k$ is the measurement noise covariance matrix. To deal with missing measurements from some of the sonobuoys, a vector of indicator function is used $[i_r^1 \ldots i_r^M \; I_\theta^1 \ldots I_\theta^M]^T$, where $$I_r^j = I_\theta^j = \begin{cases} 0 & \text{if measurement of receiver } j \text{ is unavailable} \\ 1 & \text{if measurement of receiver } j \text{ is available} \end{cases} \quad (7)$$

Normally, if more than one active source is present they will either ping at different times or they will use different frequencies. Thus, for each active source and the corresponding receptions at the receivers, a measurement model like the above can be used.

If the waveforms used allow obtaining Doppler shifts at the receivers, then this information might be used as an additional or alternative measurement to amend or replace part of the measurement model. The range rate can be derived from Doppler shift and might be used instead of the Doppler shift itself in the measurement model. The range rate might also be derived from other information or features. The part of the measurement model using the range rate as a measurement update is as follows:

$$\begin{bmatrix} \dot{r}_k^1 \\ \vdots \\ \dot{r}_k^M \end{bmatrix} = \begin{bmatrix} \frac{(x_k - x_k^{R1})(v_{x,k} - v_{x,k}^{R1}) + (y_k - y_k^{R1})(v_{y,k} - v_{y,k}^{R1})}{((x_k - x_k^{R1})^2 + (y_k - y_k^{R1})^2)^{\frac{1}{2}}} \\ \vdots \\ \frac{(x_k - x_k^{RM})(v_{x,k} - v_{x,k}^{RM}) + (y_k - y_k^{RM})(v_{y,k} - v_{y,k}^{RM})}{((x_k - x_k^{RM})^2 + (y_k - y_k^{RM})^2)^{\frac{1}{2}}} \end{bmatrix} + v_k \quad (8)$$

To deal with missing measurements from some of the sonobuoys, a vector of indicator function is used $[I_{\dot{r}}^1 \ldots I_{\dot{r}}^M]^T$, where $$I_{\dot{r}}^j = \begin{cases} 0 & \text{if measurement of receiver } j \text{ is unavailable} \\ 1 & \text{if measurement of receiver } j \text{ is available} \end{cases} \quad (9)$$

For example, if the three types of measurements, which are bearing, range, and range rate (or another observation that can provide range rate), are available in an application, the measurement model will be:

$$z_k = \begin{bmatrix} r_k^1 \\ \vdots \\ r_k^M \\ \theta_k^1 \\ \vdots \\ \theta_k^M \\ \dot{r}_k^1 \\ \vdots \\ \dot{r}_k^M \end{bmatrix} = \begin{bmatrix} ((x_k - x_k^{R1})^2 + (y_k - y_k^{R1})^2)^{\frac{1}{2}} \\ \vdots \\ ((x_k - x_k^{RM})^2 + (y_k - y_k^{RM})^2)^{\frac{1}{2}} \\ \arctan((x_k - x_k^{R1}), (y_k - y_k^{R1})) \\ \vdots \\ \arctan((x_k - x_k^{RM}), (y_k - y_k^{RM})) \\ \frac{(x_k - x_k^{R1})(v_{x,k} - v_{x,k}^{R1}) + (y_k - y_k^{R1})(v_{y,k} - v_{y,k}^{R1})}{((x_k - x_k^{R1})^2 + (y_k - y_k^{R1})^2)^{\frac{1}{2}}} \\ \vdots \\ \frac{(x_k - x_k^{RM})(v_{x,k} - v_{x,k}^{RM}) + (y_k - y_k^{RM})(v_{y,k} - v_{y,k}^{RM})}{((x_k - x_k^{RM})^2 + (y_k - y_k^{RM})^2)^{\frac{1}{2}}} \end{bmatrix} + v_k \quad (10)$$

Again, to deal with missing measurements from some of the sonobuoys, a vector of indicator function is used like what was described above.

It is contemplated that in addition or as an alternative of the bearing and range measurements or the bearing and range and possibly the Doppler shift (or range rate) if available in active systems, other measurements may be used and thus the measurement model may be augmented or replaced.

System Model

The targets under consideration in this Example are not highly evasive, thus a near constant velocity model is adequate for being the system model in this example. The discrete-time 2D near constant velocity model used is as follows:

$$x_k = \begin{bmatrix} x_k \\ y_k \\ v_{x,k} \\ v_{y,k} \end{bmatrix} = \begin{bmatrix} 1 & 0 & \Delta t_{k-1} & 0 \\ 0 & 1 & 0 & \Delta t_{k-1} \\ 0 & 0 & 1 & 0 \\ 0 & 0 & 0 & 1 \end{bmatrix} \begin{bmatrix} x_{k-1} \\ y_{k-1} \\ v_{x,k-1} \\ v_{y,k-1} \end{bmatrix} + w_{k-1} \quad (11)$$

where $\Delta t_{k-1} = t_k - t_{k-1}$, $w_{k-1} \sim N(0, Q_{k-1})$, and $Q_{k-1}$ is the process noise covariance matrix.

This target motion model accounts for manoeuvres through the process noise term $w_{k-1}$.

The present two-stage technique for multi-target tracking can use any system model, and should not be limited to the example presented here. This is because the first and second filters can use any other system models that suit a certain application and the nature of targets to be tracked, not necessarily the near constant velocity model used in this Example 1. The near constant velocity model suits a certain category of targets that are not evasive and are not highly manoeuvrable, but other system models can be used to suit the nature of motion and/or manoeuvres of the targets to be tracked in a certain application.

Bayesian Filtering

The errors and uncertainty in sensor readings and in target motion motivates the use of a probabilistic algorithm for this estimation problem. Probabilistic algorithms for estimation calculate a probability distribution instead of calculating only a single best estimate. The state of the target, $x_k$, is a vector of stochastic processes, and it is necessary to obtain $p(x_k|Z_k)$, the probability density function (PDF) of the state, at each time step, k, conditioned on the whole set of sensors measurements from the beginning to time k.

Bayesian filtering addresses the problem of estimating the state of a dynamical system as a set of observations becomes available online. They make the assumption that the states are an unobserved Markov process and the measurements are assumed to be conditionally independent given the states. A process is a first-order Markov process if the conditional probability distribution of future states, given the present state and all past states, depends only upon the present state and not on any past states.

The previously stated estimation problem (estimating the state of a target) is an instance of the Bayesian filtering problem, where the interest is in constructing the probability density $p(x_k|Z_k)$ of the current state conditioned on the set of all measurements. This PDF represents all of the knowledge possessed about the state $x_k$, and from it the current position or any other function of $x_k$ conditioned on the measurements can be estimated.

The probabilistic model of the state transition (probabilistic motion model) is specified as the conditional density $p(x_k|x_{k-1})$, and it is fully specified by the function f in equation (1) and the process noise PDF, $p(w_k)$. The observation likelihood $p(z_k|x_k)$ is fully specified by the measurement model given by the function h in equation (2) and the observation noise PDF, $p(v_k)$.

To estimate the target state, the density $p(x_k|Z_k)$ is computed recursively at each time step. This is performed in two phases: prediction phase and update phase.

In the prediction phase, the target motion is taken into account. Supposing that the PDF $p(x_{k-1}|Z_{k-1})$ at time step k−1 is available, the motion model is used to predict the current target state in the form of a predictive PDF $p(x_k|Z_{k-1})$. This PDF is obtained by integration:

$$p(x_k|Z_{k-1}) = \int p(x_k|x_{k-1}) p(x_{k-1}|Z_{k-1}) dx_{k-1}. \quad (12)$$

In the update phase, the measurement model is used to incorporate information from the sensors (here the receivers) to update the predictive PDF to obtain the posterior PDF $p(x_k|Z_k)$ using Bayes theorem:

$$p(x_k|Z_k) = \frac{p(z_k|x_k) p(x_k|Z_{k-1})}{p(z_k|Z_{k-1})} \quad (13)$$

where $$p(z_k|Z_{k-1}) = \int P(z_k|x_k) p(x_k|Z_{k-1}) dx_k \quad (14)$$

These two phases are repeated recursively and they constitute the solution of the Bayesian recursive estimation problem. In a typical scenario, the density of the unknown initial state, $p(x_0)$, is initialized with a uniform PDF over the surveillance area.

The recursive use of Bayes' theorem yields multi-dimensional integrals. According to, it is impossible to evaluate this recursive solution analytically except in a few special cases, including linear Gaussian state space models (using the Kalman Filter). For nonlinear non-Gaussian systems these multi-dimensional integrals are intractable and approximate solutions must be used.

One solution that avoids the linearization of the models, is to handle the multidimensional integrals numerically using the Monte Carlo integration method. This solution to the Bayesian filtering problem leads to the sequential Monte Carlo methods (Particle Filters). These sampling based methods propagate the probability density in the form of a set of random samples or particles.

Particle Filtering

The SIR Particle Filter

At time k, the PDF $p(x_k|Z_k)$ is represented by a set of N random samples or particles $S_k = \{s_k^{(1)}, \ldots, s_k^{(N)}\}$. $s_k^{(i)} = (x_k^{(i)}, \pi_k^{(i)})$ denotes the i-th sample where $x_k^{(i)}$ is the value of the target state and $\pi_k^{(i)}$ is the weight of the sample.

To initialize the filter at time k=0, the sample set $S_0 = \{(x_0^{(i)}, \pi_0^{(i)})|i=1, \ldots, N\}$ is sampled from $p(x_0)$, which encodes any knowledge about the targets initial state, and $$\pi_0^{(i)} = \frac{1}{N}.$$

As mentioned previously, in the typical scenario the initial target state is unknown, thus the initial sample set consists of uniformly distributed particles over the surveillance area.

Each iteration of the SIR algorithm consists of three steps, the first two of which are analogous to the Bayesian filtering prediction and update phases:

1. The Prediction Phase:
Starting from the set of samples $$S_{k-1} = \{(x_{k-1}^{(i)}, \pi_{k-1}^{(i)}) | i = 1, \ldots, N\}$$

$$\left(\text{where } \pi_{k-1}^{(i)} = \frac{1}{N}\right)$$

of the previous iteration, the motion model with process noise is applied to each sample $$s_{k-1}^{(i)} = \left(x_{k-1}^{(i)}, \frac{1}{N}\right)$$

and one sample $$s_k'^{(i)} = \left(x_k'^{(i)}, \frac{1}{N}\right)$$

is obtained, this means that this new sample is drawn from $p(x_k|x_{k-1}^{(i)})$ which is fully specified by the system model in equation (1) and the process noise PDF $p(w_k)$. A new sample set $S'_k$ is obtained that approximates the predictive density $p(x_k|Z_{k-1})$.

2. The Update Phase:

The measurement $z_k$ is taken into account and each of the samples in $S'_k$ is weighted using the observation likelihood $p(z_k|x'^{(i)}_k)$, which is fully specified by the measurement model in equation (2) and the measurement noise PDF $p(v_k)$. All weights are then normalized. The weighted sample set $\tilde{S}_k$ approximates the density $p(x_k|Z_k)$.

3. The Resampling Step:

The sample set $$S_k = \{(x_k^{(i)}, \pi_k^{(i)}) \mid i = 1, \ldots, N\}$$

$$\left(\text{where } \pi_k^{(i)} = \frac{1}{N}\right)$$

is obtained by resampling from the weighted set $\tilde{S}_k=\{(\tilde{x}_k^{(i)}, \tilde{\pi}_k^{(i)})|i=1,\ldots,N\}$ such that $p(x_k^{(i)}=\tilde{x}_k^{(j)})=\tilde{\pi}_k^{(j)}$. The resulting $S_k$ approximates the density $p(x_k|Z_k)$.

In the predictive phase of this target tracking problem the samples are predicted from the motion model. In the update phase, observations from the receivers are used to adjust the importance weights of the samples obtained in the prediction stage. Then, the sample set is resampled to uniformly distribute the sample weights.

Mixture Particle Filter

This modified version of the PF was first reported in the area of robotics. In the field of robotics, the use of the SIR PF for mobile robot localization is called Monte Carlo Localization (MCL), and the following modified version is called MCL with planned sampling or Mixture MCL.

In the prediction phase, the SIR PF samples from the importance density $p(x_k|x_{k-1}^{(i)})$, which does not depend on the last observation. So, the samples are predicted from the motion model, and then the most recent observation is used to adjust the importance weights of this prediction. The idea used in this enhancement to particle filtering is to add to those samples predicted from the motion model some samples predicted from the most recent observation. The importance weights of these new samples are adjusted according to the probability that they came from the previous belief of target state (i.e. samples of the last iteration) and the latest motion. These new samples were called planned samples or samples generated from the dual of MCL.

These planned samples are drawn from the importance density $p(z_k|x_k)$ which is the observation likelihood. These samples are consistent with the most recent observation but ignorant of the previous belief about the target state $p(x_{k-1}|Z_{k-1})$. These samples are weighted using $p(x_k^{(i)}|x_{k-1}^{(i)})$. The version of PF that uses this type of sampling alone is known as a Likelihood PF.

In the version of PF used in this Example, a number of samples (a suitably chosen proportion of the total number of samples) are drawn from $p(z_k|x_k)$ and added to the samples drawn from $p(x_k|x_{k-1}^{(i)})$. Samples in these two groups are weighted, each with its respective weight update equation, and then the resampling is carried out. These two importance densities have complimentary advantages and disadvantages so their combination gives better performance. This version of PF is called Mixture PF, because it samples from a mixture of importance densities instead of only one.

In the problem at hand, some samples predicted according to the receiver's observations are added to those samples predicted according to the target motion model. The importance weights of these additional samples are adjusted according to the probability that they were generated from the samples of the last iteration and the motion model. In the event that there are no observations, only samples based on motion model are used in prediction mode (more details about this will come later), but if observations are available, then both types of samples are used. This enhances the performance in terms of providing a faster target detection and localization, and the ability to recover in case of tracking failure. All these advantages are needed in the problem at hand, especially the fact that it is faster to detect and localize (i.e. in a lower number of pings) targets when compared to the SIR PF. Faster detection is important because the target will be aware of the presence of the multistatic active sonar system and it is an important enabling factor for the technique presented here.

For example, in the case of bearing and range measurements the generation of samples from observation in the Mixture PF will use the bearing and range to generate the position components of these generated samples. For the velocity components they will be generated at random from both: (a) a speed (which is randomly chosen to cover pre-chosen range of speeds suitable for an application and the nature of the targets to be tracked or chosen online by a human operator; (b) a random target heading from a uniform distribution covering all the heading ambiguity from 0 to 360 deg. The generated samples will be then weighted by the probability that they came from the samples of last iteration and latest target motion before going to the resampling step with the samples generated from the prior and weighted from observation.

For example, in the case of bearing, range and Doppler (or range rate) measurements available the generation of samples from observation in the Mixture PF will use the bearing and range information to generate the position components of these generated samples. For the velocity components they will be generated from both: (a) a speed (which is randomly chosen to cover a pre-chosen range of speeds suitable for an application and the nature of the targets to be tracked or chosen online by a human operator; (b) a target heading calculated from the speed randomly chosen in (b) and the range rate measured (or calculated from Doppler) as follows:

$$h_k^j = \theta_k^{R_i} - \cos^{-1}\left(\frac{\dot{r}_k^{R_i}}{speed_k^j}\right) \tag{15}$$

where $h_k^j$ is the heading of the jth sample generated from observation at time iteration k, $\theta_k^{R_i}$ is the measured bearing from the ith sonobuoy at time iteration k, $\dot{r}_k^{R_i}$ is the range rate obtained from the ith sonobuoy at time iteration k, and speed$_k^j$ is the speed of the jth sample generated from observation at time iteration k. The generated samples will be then weighted by the probability that they came from the samples of last iteration and latest target motion before going to the resampling step with the samples generated from the prior and weighted from observation.

The derivation of equation (15) is as follows:

$$\theta_k^{R_i} = \arctan((x_k - x_k^{R_i}), (y_k - y_k^{R_i})) \quad (16)$$

$$\dot{r}_k^{R_i} = \frac{(x_k - x_k^{R_i})(v_{x,k} - v_{x,k}^{R_i}) + (y_k - y_k^{R_i})(v_{y,k} - v_{y,k}^{R_i})}{((x_k - x_k^{R_i})^2 + (y_k - y_k^{R_i})^2)^{\frac{1}{2}}}$$

$$= \cos(\theta_k^{R_i})(v_{x,k} - v_{x,k}^{R_i}) + \sin(\theta_k^{R_i})(v_{y,k} - v_{y,k}^{R_i})$$

$$speed_k^j = ((v_{x,k} - v_{x,k}^{R_i})^2 + (v_{y,k} - v_{y,k}^{R_i})^2)^{\frac{1}{2}}$$

$$\frac{\dot{r}_k^{R_i}}{speed_k^j} = \frac{\cos(\theta_k^{R_i})(v_{x,k} - v_{x,k}^{R_i}) + \sin(\theta_k^{R_i})(v_{y,k} - v_{y,k}^{R_i})}{((v_{x,k} - v_{x,k}^{R_i})^2 + (v_{y,k} - v_{y,k}^{R_i})^2)^{\frac{1}{2}}}$$

$$= \cos(\theta_k^{R_i})\cos(h_k^j) + \sin(\theta_k^{R_i})\sin(h_k^j) = \cos(\theta_k^{R_i} - h_k^j)$$

$$h_k^j = \theta_k^{R_i} - \cos^{-1}\left(\frac{\dot{r}_k^{R_i}}{speed_k^j}\right)$$

Clustered Mixture Particle Filter for Multi-Target Tracking

The proposed system is based on two Mixture PFs and one density-based clustering technique. The first filter is for target detection. The particles corresponding to the detected targets are then clustered and the second filter tracks the detected targets by tracking the different clusters. In the second filter each particle has a cluster ID in addition to the state vector values and the weight. Density-based clustering is applied periodically at a predefined period of time epochs (in this example it is every five time steps, i.e. every five pings from the source in this active system) on the sample set obtained from the first filter. The newly discovered clusters are passed to the second filter and sampling from the new clusters is performed in the second filter sampling step. In addition, at the end of this time step, the sample set of the first filter is reset to a uniform density over the surveillance area. This enables the first filter to detect new targets, which can enter the scene at any time, and causing new clusters to be detected when the clustering technique is next run. In the four iterations when density based clustering does not run, both filters continue to run normally without any interconnection between them. The second filter continues to run normally, with sampling from both prior and observation likelihood only, as in these iterations it does not receive any information from the first filter. This system is capable of tracking any unknown, time-varying number of targets; it is also capable of keeping continuous tracks of the targets as well as working with a large number of false contacts.

It is to be noted that the problem of measurement to track association is not a standalone component in the proposed technique because it implicitly happens in the particle filter (PF). The PF capability of using nonlinear measurement models enables the direct relation between the bearing and range measurements and the target position, in the measurement model. Thus, in the update phase of PF, all the incoming measurements are used to weight all the intermediate particles coming out of the prediction phase, and the resampling step will remove the particles with low weights, so the data association implicitly happens in this weighting phase. For the additional samples generated from measurements in Mixture PF, they are weighted with respect to all the particles from last iteration and the latest motion before going to the resampling step.

The flow of operation in every iteration of the proposed Clustered Mixture PF is shown in FIG. 3, where a flowchart of each iteration is presented.

First Mixture PF

The role of the first filter is target detection. In the sampling step, particles are sampled from the prior, according to a near constant velocity model, and the observation likelihood, from the observed bearing and range. In the update step, the particles are weighted as follows: (i) those sampled from the prior are weighted according to the observation likelihood; (ii) those sampled from the observation are weighted according to the probability that they were generated from the motion model and the last sample set. In the resampling step, the particles are resampled to eliminate those with low weights and multiply those with high weights.

Using a Mixture PF with its mixture of importance densities provides better performance and faster convergence of the particle cloud to the true locations of the targets. This is one important factor in the role of this filter that enables it to adequately converge to groups of particles around the detected target locations just after, for example, five time steps (i.e. after five pings from the source). An SIR PF would have required additional iterations to converge to the multiple clusters.

The objective of the second filter is to continue tracking the distinct targets. If the first filter was left to operate indefinitely, most of the detected groups of particles would soon fade out as their particles gradually moved to stronger groups (by the resampling step), with possibly only a single group remaining. This process causes an individual PF to be suitable for tracking only one target. As discussed earlier the technique presented in this example relies only on two PFs to track the unknown, time varying number of targets.

Second Mixture PF

This role of the second filter is to track multiple targets in the scene. This filter starts running, in this example, after the fifth ping, when the first filter has detected some targets clusters. This filter tracks the different clusters detected. Each particle is augmented with a cluster ID, thus $s_k^{(i)} = (x_k^{(i)}, \pi_k^{(i)}, c_k^{(i)})$ denotes the i-th sample where $x_k^{(i)}$ is the state of the target, $\pi_k^{(i)}$ is the weight of this sample, and $c_k^{(i)}$ is the cluster ID. All particles share the prediction and update phases, but each cluster is resampled separately.

In the sampling step of every iteration, particles are sampled from the prior and from the observation likelihood, depending, of course, on the availability of measurements. At those iterations which are multiples of the pre-determined number of time epochs (five in this example), samples are also drawn from the newly found clusters found by the first PF, provided that they were not previously present in the second PF. In the update step, particles are weighted as follows: (i) those sampled from the prior are weighted according to observation; (ii) those sampled from the observation are weighted according to the motion model and the last sample set; (iii) those sampled from new clusters are weighted according to observation likelihood.

The resampling step is preceded by a routine that weights the different clusters, taking account of the weights of the particles in that cluster, then checks which clusters should continue and which should be removed. Each remaining cluster is resampled separately. For example, in the case where a target leaves the detection range of the receivers, there will be no measurement updates. The sum of the weights of the particles in this cluster will be zero and it will be automatically removed.

In order to allow for a temporary lack of target observations, target clusters that have survived for at least five time steps are permitted to continue to operate in a prediction-only mode for up to seven time steps before they are deleted. Clusters that do not receive a measurement update in any of their first five time steps are deleted immediately. To implement this, each cluster is assigned a coherence value which starts at 0 when the cluster is newly added to the second Mixture PF.

At this time, particles are also checked to ensure that they were erroneously assigned to the wrong cluster. An example of such situation can happen when two targets are simultaneously crossing each other, which can lead to a small number of particles with incorrect headings gaining their way into another cluster because of the sampling from observation likelihood. Over time, those particles will move far from the other particles in the cluster. This routine checks for such a situation and eliminates those particles. The phenomenon discussed above about a small number of particles being mislead and not the larger ratio inside the cluster is because the target velocity is part of the state (i.e. the speed and heading information are there) so this limits the probability of the misleading to happen.

A final task is to check whether two clusters need to be merged because they correspond to the same target. This is determined by the distance between the cluster centers, the speeds of the clusters (the average speed calculated from the estimated velocities of the particles) and the cluster headings (the average heading of the particles in the cluster). If two clusters are within 500 m of each other, the difference in their speeds is less than 1 msec and the difference in their headings is less than 20°, then the two clusters are merged and the ID of the oldest cluster is used for all the particles in this cluster.

After each of these checks, the particles in each of the remaining clusters are resampled separately.

Density-Based Clustering

Regarding the clustering technique used, since the objects to cluster are particles which represent a probability density, density-based clustering is used. This clustering is for the equally weighted set of particles that is the outcome of the first Mixture PF. A two dimensional histogram of particles in 100×100 bins in the surveillance area is formed. An example of such a histogram is shown in FIG. 4. The local maxima of this histogram indicate the different clusters. Each cluster center is determined by the mean of particles in this cluster.

The histogram is represented by a 100×100 matrix. To get the local maxima, gradient operators like those used in image processing are used along x and y directions of the matrix:

$$\begin{bmatrix} -1 & 0 & 1 \\ -2 & 0 & 2 \\ -1 & 0 & 1 \end{bmatrix}, \begin{bmatrix} -1 & -2 & -1 \\ 0 & 0 & 0 \\ 1 & 2 & 1 \end{bmatrix} \quad (17)$$

These masks are convolved with the matrix to get 1st order gradients, and then convolved once again on the outcome of the 1st order gradient to obtain 2nd order gradients along these directions. A local maxima is where the $1^{st}$ gradient crosses 0, and the $2^{nd}$ gradient is negative (negative peak).

Experimental Results

The performance of the present two-stage filtering technique multi-target tracking in active sonar systems is examined with simulated scenarios, as example for the sake of demonstration of the technique. The simulated scenarios were generated using a contact-level simulation. The settings used in this simulation are: (i) Standard deviation of bearing noise is 10 degrees; (ii) Standard deviation of range noise is 50 meters; (iii) Number of contacts due to non-stationary clutter is 10 contacts per receiver per ping; (iv) Number of stationary clutters is 4; (v) One active source that pings every 60 seconds. For the sake of example only, the different buoys' (source or receiver) locations were assumed fixed in this simulation, but the present two-stage filtering technique multi-target tracking accepts time varying buoys locations. Furthermore, for the sake of example, it is assumed that the ping rate is one minute (which is a typical value for the application used as an example), The contact coming as reflections of this ping are collected and fed to one iteration of the present algorithm, i.e. one iteration of the algorithm will run every minute. This example choice of one minute is suitable for an application with slow targets that are not highly manoeuvrable, which is used here just as example and can be changed based on the application and the nature of targets to be tracked. Furthermore, in this example the predetermined period where the first filter will reset to a uniform distribution is used as five iterations, which is suitable for this application, and can be changed depending on the application and its needs.

Simulated Scenarios

First Scenario

The first scenario consists of 7 stationary receivers forming an L shape and one active source. It contains two moving targets that move at 2 m/sec speed in addition to the 4 stationary clutters. Thus this scenario contains 6 different targets whether moving or stationary. The scenario is illustrated in FIG. 5. It is to be noted that the first Mixture PF and the clustering technique that follows it will detect all targets whether moving or stationary, and the second Mixture PF will assign a different cluster to each target. In addition to this, if needed, the technique can discriminate which target is moving and which is stationary. This is because the state consists of 2D position and velocity, so from velocity one can know which targets are moving and which are stationary.

The two moving targets as well as the four stationary clutters (which are considered as targets) were detected at the fifth ping when the density based clustering technique was run for the first time. The second Mixture PF begun then to track them. The root-mean-square (RMS) position error of the first moving target (from ping 5 till end) is 84.42 m and its maximum position error (from ping 5 till end) equals 290.30 m. The RMS of velocity error of the first moving target (from ping 5 till end) is 0.75 msec and its maximum velocity error (from ping 5 till end) equals 2.40 msec. The estimated target track of the first target is shown in FIG. 6, while the position error along x and y directions are shown in FIG. 7 and FIG. 8 respectively, and the velocity error along x and y directions are shown in FIG. 9 and FIG. 10. The RMS position error of the second moving target and its maximum position error (both from ping 5 till end) are 57.14 m and 165.69 m, respectively. The RMS of velocity error of the second moving target (from ping 5 till end) is 0.53 msec and its maximum velocity error (from ping 5 till end) equals 2.21 msec. The estimated target track of the second target is shown in FIG. 11, while the position error along x and y directions are shown in FIG. 12 and FIG. 13 respectively, and the velocity error along x and y directions are shown in FIG. 14 and FIG. 15. The first target has four sharp manoeuvres while the second has only two; this is why the position error is larger in the first target. The manoeuvres, in the current example, are dealt with through the process noise term in the system model. This near constant velocity model with process noise is enough for the targets under consideration in this example which are slow and not highly manoeuvrable or evasive. So the performance during straight portions is in general better than the performance during manoeuvres because of the system model used as example. FIG. 16 presents the estimated target track for one of the stationary clutters (stationary target) to show the proposed technique's capability with such targets. The position error along x and y directions are shown in FIG. 12 and FIG. 13 respectively, and the velocity error along x and y directions are shown in FIG. 19 and FIG. 20. The RMS position error of the third target (stationary clutter) and its maximum position error (both from ping 5 till end) are 51.80 m and 134.50 m, respectively. The RMS of velocity error of this third target (from ping 5 till end) is 0.47 msec and its maximum velocity error (from ping 5 till end) equals 2.65 msec.

Second Scenario

The second scenario consists of 16 stationary receivers forming a rectangular grid shape and one active source. It contains three moving targets that move at 2 m/sec speed in addition to the 4 stationary clutters. Thus this scenario contains 7 different targets whether moving or stationary. The third of the moving targets appears at the $18^{th}$ ping, to demonstrate the ability of the technique to detect any new target in the scenario shortly after its appearance in the surveillance area. Therefore, from the beginning, the technique detect then track 6 targets, and later on it detects then track the seventh one. The first two targets intersect each other in the midway. The scenario is illustrated in FIG. 21, and a snapshot showing the two filters is shown in FIG. 22.

The first two moving targets as well as the four stationary clutters were detected at the fifth ping when the density based clustering technique was run for the first time and they were tracked by the $2^{nd}$ Mixture PF. The third moving target entered the surveillance area at the ping 18, it was not detected at the ping 20, but rather at ping 25 and then it was tracked by the 2nd Mixture PF. The RMS position error of the first moving target and its maximum position error (both from ping 5 till end) are 72.19 m and 327.49 m, respectively. The RMS of velocity error of the first moving target (from ping 5 till end) is 0.54 msec and its maximum velocity error (from ping 5 till end) equals 3.06 msec. The estimated target track of the first target is shown in FIG. 23, while the position error along x and y directions are shown in FIG. 24 and FIG. 25, respectively, and the velocity along x and y directions are shown in FIG. 26 and FIG. 27. The RMS position error of the second moving target and its maximum position error (both from ping 5 till end) are 62.66 m and 228.9 m. The RMS of velocity error of the second moving target (from ping 5 till end) is 0.55 msec and its maximum velocity error (from ping 5 till end) equals 3.46 msec. The estimated target track of the second target is shown in FIG. 28, while the position error along x and y directions are shown in FIG. 29 and FIG. 30, respectively, and the velocity error along x and y directions are shown in FIG. 31 and FIG. 32. The RMS position error of the third moving target and its maximum position error (from ping 25 till end) are 40.76 m and 119.57 m. The RMS of velocity error of the third moving target (from ping 5 till end) is 0.50 msec and its maximum velocity error (from ping 5 till end) equals 2.26 msec. The estimated target track of the third target is shown in FIG. 33, while the position error along x and y directions are shown in FIG. 34 and FIG. 35, respectively, and the velocity error along x and y directions are shown in FIG. 36 and FIG. 37.

The maximum position error for the first two moving targets happens near the intersection because of some simultaneous interference between the two clouds of particles belonging to the two clusters.

Running Times

To give an idea about the running times and the applicability of this solution for online running in real-life scenarios the following briefing is given. Running this technique for active systems on an Intel Core 2 Duo T7100 1.8 GHz processor with 2 GB RAM, using MATLAB 2007 takes: (i) Nearly 6 sec./ping for 5000 samples with 30% sampled from observation; (ii) Nearly 4.8 sec./ping for 5000 samples with 20% sampled from observation. These numbers are from the average of all iterations. Running this technique on an Intel Core 2 Duo P8600 2.4 GHz processor with 4 GB RAM, using MATLAB 2009 2007 takes: (i) Nearly 2.5 sec./ping for 5000 samples with 30% sampled from observation; (ii) Nearly 1.8 sec./ping for 5000 samples with 20% sampled from observation. These numbers are from the average of all iterations. Thus this technique can work online with the ping times used in real scenarios (example of typical interval between ping times in real scenarios for multi-static active sonar systems is 60 seconds).

Example 2

Clustered Mixture Particle Filter for Underwater Multi-Target Tracking in Passive Sonar Systems This example also focuses on sonar systems used for underwater target tracking. For underwater target tracking, sonar systems often use remote sensors, such as sonobuoys, which are deployed from an airplane or ship and submerged for monitoring the underwater acoustics. There are two main categories of sonar systems: passive systems and active systems. Passive systems employ passive receivers to acquire acoustic energy emitted by possible targets. Active sonar systems use one or more transmitters to produce an acoustic signal (described as a ping) and multiple receivers to listen for reflections of this ping from a target. The focus of this example is on the passive systems of multiple receivers.

A two-dimensional (2D) case is presented in this Example 2. It is understood that such a case is used here for demonstration purposes of the present two-stage filtering technique for multi-target tracking in passive systems only and in no way should limit the scope of the present method.

Problem Formulation of Target Tracking in Passive scenarios

Problem Statement

The aim is to estimate the state of the target $x_k$ at the current time step k, given a set of measurements (observations) $Z_k = \{z_0, \ldots, z_k\}$ acquired at time steps 0, 1, ..., k. The state of the target is $x_k = [x_k, y_k, v_{x,k}, v_{y,k}]^T$, where $x_k$ and $y_k$ constitute the 2D target position relative to the origin of the surveillance area, and $v_{x,k}$ and $v_{y,k}$ constitute the target 2D velocity.

The nonlinear state transition model (system or motion model) is given by $$x_k = f(x_{k-1}, w_{k-1}) \tag{18}$$

where $w_k$ is the process noise which is independent of the past and present states and accounts for the uncertainty in the target motion. The state measurement model is $$z_k = h(x_k, v_k) \quad (19)$$

where $v_k$ is the measurement noise which is independent of the past and current states and the process noise and accounts for uncertainty in the receiver sonobuoys measurements.

The measurement model is a nonlinear model as will be seen in the next subsection. This suits the PF, which can deal with nonlinear models.

Measurement Model

The work in this Example 2 is at the contact level, i.e. this technique can be implemented or used regardless of the sensors used because the appropriate processing at the acoustic level is achieved to prepare the contact level data. Each contact at each sonobuoy contains bearing information. In order to derive the full measurement model, the case of one receiver and one target is considered first. At time k the location of the receiver is $(x_k^R, y_k^R)$ and the location of the target is $(x_k, y_k)$. The bearing of the received signal from the target is $\theta$, where:

$$\theta = \arctan((x_k - x_k^R), (y_k - y_k^R)) \quad (20)$$

For the case with M receivers, the measurement model is as follows:

$$z_k = \begin{bmatrix} \theta_k^1 \\ \vdots \\ \theta_k^M \end{bmatrix} = \begin{bmatrix} \arctan((x_k - x_k^{R1}), (y_k - y_k^{R1})) \\ \vdots \\ \arctan((x_k - x_k^{RM}), (y_k - y_k^{RM})) \end{bmatrix} + v_k \quad (21)$$

where the measurement noise is $v_k \sim N(0, R_k)$, and $R_k$ is the measurement noise covariance matrix. To deal with missing measurements from some of the sonobuoys, a vector of indicator function is used $[I_\theta^1 \ldots I_\theta^M]^T$ as in [27], where $$I_\theta^j = \begin{cases} 0 & \text{if measurement of receiver } j \text{ is unavailable} \\ 1 & \text{if measurement of receiver } j \text{ is available} \end{cases} \quad (22)$$

If the frequency of the noise from the target (which is needed to be tracked by the system) is known, the calculation of Doppler shift can be achieved from the received frequency. This Doppler information might be used as an additional measurement to amend the measurement model. The Doppler shift is related to the target and receiver velocities as follows:

$$D^R = \frac{((v^R - v) \cdot 1^R)\gamma}{c} \quad (23)$$

Where $D^R$ is the Doppler shift measured at the passive sonobuoy, $v^R$ is the vector of the sonobuoy velocity, $v$ is the vector of the target velocity, $1^R$ is the unit vector from the receiver to the target, c is the speed of sound in water (in this example), and $\gamma$ is the frequency from the targets noise.

The range rate (noted $\dot{r}^R$) can be derived from Doppler shift as follows:

$$\dot{r}^R = ((v - v^R) \cdot 1^R) = -((v^R - v) \cdot 1^R) = \frac{-D^R c}{\gamma} \quad (24)$$

and might be used instead of the Doppler shift itself in the measurement model. The part of the measurement model using the range rate as a measurement update is as follows:

$$\begin{bmatrix} \dot{r}_k^1 \\ \vdots \\ \dot{r}_k^M \end{bmatrix} = \begin{bmatrix} \frac{(x_k - x_k^{R1})(v_{x,k} - v_{x,k}^{R1}) + (y_k - y_k^{R1})(v_{y,k} - v_{y,k}^{R1})}{((x_k - x_k^{R1})^2 + (y_k - y_k^{R1})^2)^{\frac{1}{2}}} \\ \vdots \\ \frac{(x_k - x_k^{RM})(v_{x,k} - v_{x,k}^{RM}) + (y_k - y_k^{RM})(v_{y,k} - v_{y,k}^{RM})}{((x_k - x_k^{RM})^2 + (y_k - y_k^{RM})^2)^{\frac{1}{2}}} \end{bmatrix} + v_k \quad (25)$$

To deal with missing measurements from some of the sonobuoys, a vector of indicator function is used $[I_{\dot{r}}^1 \ldots I_{\dot{r}}^M]^T$, where $$I_{\dot{r}}^j = \begin{cases} 0 & \text{if measurement of receiver } j \text{ is unavailable} \\ 1 & \text{if measurement of receiver } j \text{ is available} \end{cases} \quad (26)$$

For example, if the two types of measurements, which are bearing and range rate (or another observation that can provide range rate), are available in an application, the measurement model will be:

$$z_k = \begin{bmatrix} \theta_k^1 \\ \vdots \\ \theta_k^M \\ \dot{r}_k^1 \\ \vdots \\ \dot{r}_k^M \end{bmatrix} = \begin{bmatrix} \arctan((x_k - x_k^{R1}), (y_k - y_k^{R1})) \\ \vdots \\ \arctan((x_k - x_k^{RM}), (y_k - y_k^{RM})) \\ \frac{(x_k - x_k^{R1})(v_{x,k} - v_{x,k}^{R1}) + (y_k - y_k^{R1})(v_{y,k} - v_{y,k}^{R1})}{((x_k - x_k^{R1})^2 + (y_k - y_k^{R1})^2)^{\frac{1}{2}}} \\ \vdots \\ \frac{(x_k - x_k^{RM})(v_{x,k} - v_{x,k}^{RM}) + (y_k - y_k^{RM})(v_{y,k} - v_{y,k}^{RM})}{((x_k - x_k^{RM})^2 + (y_k - y_k^{RM})^2)^{\frac{1}{2}}} \end{bmatrix} + v_k \quad (27)$$

Again, to deal with missing measurements from some of the sonobuoys, a vector of indicator function is used like what was described above.

It is contemplated that in addition or as an alternative of the bearing measurements only or the bearing and possibly the Doppler shift (or range rate) if available in case of passive systems other measurements may be used and thus the measurement model may be augmented or replaced.

System Model

The targets under consideration in this example are not highly evasive, thus a near constant velocity model is adequate for being the system model in this example. The discrete-time 2D near constant velocity model used is as follows:

$$x_k = \begin{bmatrix} x_k \\ y_k \\ v_{x,k} \\ v_{y,k} \end{bmatrix} = \begin{bmatrix} 1 & 0 & \Delta t_{k-1} & 0 \\ 0 & 1 & 0 & \Delta t_{k-1} \\ 0 & 0 & 1 & 0 \\ 0 & 0 & 0 & 1 \end{bmatrix} \begin{bmatrix} x_{k-1} \\ y_{k-1} \\ v_{x,k-1} \\ v_{y,k-1} \end{bmatrix} + w_{k-1} \quad (28)$$

where $\Delta t_{k-1} = t_k - t_{k-1}$, $w_{k-1} \sim N(0, Q_{k-1})$, and $Q_{k-1}$ is the process noise covariance matrix.

This target motion model accounts for manoeuvres through the process noise term $w_{k-1}$.

The present two-stage technique for multi-target tracking can use any system model not necessarily the one presented in this Example. This is because the filters can use any other system models that suit a certain application and the nature of targets to be tracked, not necessarily the near constant velocity model used in this example. The near constant velocity model suits a certain category of targets that are not evasive and are not highly manoeuvrable, but other system models can be used to suit the nature of motion and/or manoeuvres of the targets to be tracked in a certain application.

Bayesian Filtering

The errors and uncertainty in sensor readings and in target motion motivates the use of a probabilistic algorithm for this estimation problem. Bayesian filtering addresses the problem of estimating the state of a dynamical system as a set of observations becomes available online. The previously stated estimation problem (estimating the state of a target) is an instance of the Bayesian filtering problem, where the interest is in constructing the probability density $p(x_k|Z_k)$ of the current state conditioned on the set of all measurements. This PDF represents all of the knowledge possessed about the state $x_k$, and from it the current position or any other function of $x_k$ conditioned on the measurements can be estimated.

It is impossible to evaluate the Bayesian recursive solution analytically except in a few special cases, including linear Gaussian state space models (using the Kalman Filter). For nonlinear non-Gaussian systems these multi-dimensional integrals are intractable and approximate solutions must be used. One solution that avoids the linearization of the models, is to use Particle Filters.

Particle Filtering

The SIR Particle Filter

In the predictive phase of this target tracking problem the samples are predicted from the motion model. In the update phase, observations from the receivers are used to adjust the importance weights of the samples obtained in the prediction stage. Then, the sample set is resampled to uniformly distribute the sample weights.

Mixture Particle Filter

In the problem at hand, some samples predicted according to the receiver's observations (here bearing information with complete uncertainty of the range of the target except being in the detection range of the receiver) are added to those samples predicted according to the target motion model. The importance weights of these additional samples are adjusted according to the probability that they were generated from the samples of the last iteration and the motion model. In the event that there are no observations, only samples based on motion model are used in prediction mode (more details about this will come later), but if observations are available, then both types of samples are used. This enhances the performance in terms of providing a faster target detection and localization, and the ability to recover in case of tracking failure. All these advantages are needed in the problem at hand, especially the fact that it is faster to detect and localize (i.e. in a lower number of time steps, which means in less iterations by the algorithm) targets when compared to the SIR PF. Faster detection is an important enabling factor for the technique presented here, so that the first filter can detect targets in, for example, five time steps (i.e. five iterations). Measurements are gathered every minute and one iteration of the algorithm runs each minute on the detected measurements. This is acceptable for the range of speeds and maneuverability of the targets under consideration in this example.

For example, in the case of bearing measurements only available the generation of samples from observation in the Mixture PF will use the bearing information with complete uncertainty of the range of the target except being in the detection range of the receiver to generate the position components of these generated samples. For the velocity components they will be generated at random from both: (a) a speed (which is randomly chosen to cover pre-chosen range of speeds suitable for an application and the nature of the targets to be tracked or chosen online by a human operator; (b) a random target heading from a uniform distribution covering all the heading ambiguity from 0 to 360 deg. The generated samples will be then weighted by the probability that they came from the samples of last iteration and latest target motion before going to the resampling step with the samples generated from the prior and weighted from observation.

For example, in the case of bearing and Doppler (or range rate) measurements available the generation of samples from observation in the Mixture PF will use the bearing information with complete uncertainty of the range of the target except being in the detection range of the receiver to generate the position components of these generated samples. For the velocity components they will be generated from both: (a) a speed (which is randomly chosen to cover a pre-chosen range of speeds suitable for an application and the nature of the targets to be tracked or chosen online by a human operator; (b) a target heading calculated from the speed randomly chosen in (b) and the range rate measured (or calculated from Doppler) as follows:

$$h_k^j = \theta_k^{R_i} - \cos^{-1}\left(\frac{\dot{r}_k^{R_i}}{speed_k^j}\right) \quad (29)$$

where $h_k^j$ is the heading of the jth sample generated from observation at time iteration k, $\theta_k^{R_i}$ is the measured bearing from the ith sonobuoy at time iteration k, $\dot{r}_k^{R_i}$ is the range rate obtained from the ith sonobuoy at time iteration k, and $speed_k^j$ is the speed of the jth sample generated from observation at time iteration k. The generated samples will be then weighted by the probability that they came from the samples of last iteration and latest target motion before going to the resampling step with the samples generated from the prior and weighted from observation.

The derivation of equation (29) is as follows:

$$\theta_k^{R_i} = \arctan\left((x_k - x_k^{R_i}), (y_k - y_k^{R_i})\right) \quad (30)$$

$$\dot{r}_k^{R_i} = \frac{(x_k - x_k^{R_i})(v_{x,k} - v_{x,k}^{R_i}) + (y_k - y_k^{R_i})(v_{y,k} - v_{y,k}^{R_i})}{\left((x_k - x_k^{R_i})^2 + (y_k - y_k^{R_i})^2\right)^{\frac{1}{2}}}$$

$$= \cos(\theta_k^{R_i})(v_{x,k} - v_{x,k}^{R_i}) + \sin(\theta_k^{R_i})(v_{y,k} - v_{y,k}^{R_i})$$

$$speed_k^j = \left((v_{x,k} - v_{x,k}^{R_i})^2 + (v_{y,k} - v_{y,k}^{R_i})^2\right)^{\frac{1}{2}}$$

$$\frac{\dot{r}_k^{R_i}}{speed_k^j} = \frac{\cos(\theta_k^{R_i})(v_{x,k} - v_{x,k}^{R_i}) + \sin(\theta_k^{R_i})(v_{y,k} - v_{y,k}^{R_i})}{\left((v_{x,k} - v_{x,k}^{R_i})^2 + (v_{y,k} - v_{y,k}^{R_i})^2\right)^{\frac{1}{2}}}$$

$$= \cos(\theta_k^{R_i})\cos(h_k^j) + \sin(\theta_k^{R_i})\sin(h_k^j) = \cos(\theta_k^{R_i} - h_k^j)$$

$$h_k^j = \theta_k^{R_i} - \cos^{-1}\left(\frac{\dot{r}_k^{R_i}}{speed_k^j}\right)$$

Clustered Mixture Particle Filter for Multi-Target Tracking

The proposed system is based on two Mixture PFs and one density-based clustering technique. The first filter is for target detection. The particles corresponding to the detected targets are then clustered and the second filter tracks the detected targets by tracking the different clusters. In the second filter each particle has a cluster ID in addition to the state vector values and the weight. Density-based clustering is applied periodically every pre-determined period of time steps (in this example it is five time steps, which are every five minutes in this example) on the sample set obtained from the first filter. The newly discovered clusters are passed to the second filter and sampling from the new clusters is performed in the second filter sampling step. In addition, at the end of this time step, the sample set of the first filter is reset to a uniform density over the surveillance area. This enables the first filter to detect new targets, which can enter the scene at any time, and causing new clusters to be detected when the clustering technique is next run. In the four iterations when density based clustering does not run, both filters continue to run normally without any interconnection between them. The second filter continues to run normally, with sampling from both prior and observation likelihood only, as in these iterations it does not receive any information from the first filter. This system is capable of tracking any unknown, time-varying number of targets; it is also capable of keeping continuous tracks of the targets.

The flow of operation in every iteration of the proposed Clustered Mixture PF is shown in FIG. 3, where a flowchart of each iteration is presented.

First Mixture PF

The role of the first filter is target detection. In the sampling step, particles are sampled from the prior, according to a near constant velocity model, and the observation likelihood, from the observed bearing (with complete uncertainty of the range of the target except being in the detection range of the receiver). In the update step, the particles are weighted as follows: (i) those sampled from the prior are weighted according to the observation likelihood; (ii) those sampled from the observation are weighted according to the probability that they were generated from the motion model and the last sample set. In the resampling step, the particles are resampled to eliminate those with low weights and multiply those with high weights.

Using a Mixture PF provides better performance and faster convergence of the particle cloud to the true locations of the targets. This is one important factor in the role of this filter that enables it to adequately converge to groups of particles around the detected target locations just after, for example, five time steps of the algorithm. A SIR PF would have required additional iterations to converge to the multiple clusters.

The objective of the second filter is to continue tracking the distinct targets. If the first filter was left to operate indefinitely, most of the detected groups of particles would soon fade out as their particles gradually moved to stronger groups (by the resampling step), with possibly only a single group remaining. This process causes an individual PF to be suitable for tracking only one target. As discussed earlier the technique presented in this example relies only on two PFs to track the unknown, time varying number of targets.

Second Mixture PF

The role of the second filter is to track multiple targets in the scene. This filter starts running, in this example, after the fifth iteration, when the first filter has detected some targets clusters. This filter tracks the different clusters detected. Each particle is augmented with a cluster ID, thus $s_k^{(i)} = (x_k^{(i)}, \pi_k^{(i)}, c_k^{(i)})$ denotes the i-th sample where $x_k^{(i)}$ is the state of the target, $\pi_k^{(i)}$ is the weight of this sample, and $c_k^{(i)}$ is the cluster ID. All particles share the prediction and update phases, but each cluster is resampled separately.

In the sampling step of every iteration, particles are sampled from the prior and from the observation likelihood, depending, of course, on the availability of measurements. At those iterations which are multiples of the pre-determined number of time epochs (five in this example), samples are also drawn from the newly found clusters found by the first PF, provided that they were not previously present in the second PF. In the update step, particles are weighted as follows: (i) those sampled from the prior are weighted according to observation; (ii) those sampled from the observation are weighted according to the motion model and the last sample set; (iii) those sampled from new clusters are weighted according to observation likelihood.

The resampling step is preceded by a routine that weights the different clusters, taking account of the weights of the particles in that cluster, then checks which clusters should continue and which should be removed. Each remaining cluster is resampled separately. For example, in the case where a target leaves the detection range of the receivers, there will be no measurement updates. The sum of the weights of the particles in this cluster will be zero and it will be automatically removed.

In order to allow for a temporary lack of target observations, target clusters that have survived for at least five time steps are permitted to continue to operate in a prediction-only mode for up to seven time steps before they are deleted. Clusters that do not receive a measurement update in any of their first five time steps are deleted immediately. To implement this, each cluster is assigned a coherence value which starts at 0 when the cluster is newly added to the second Mixture PF.

At this time, particles are also checked to ensure that they were erroneously assigned to the wrong cluster. An example of such situation can happen when two targets are simultaneously crossing each other, which can lead to a small number of particles with incorrect headings gaining their way into another cluster because of the sampling from observation likelihood. Over time, those particles will move far from the other particles in the cluster. This routine checks for such a situation and eliminates those particles.

A final task is to check whether two clusters need to be merged because they correspond to the same target. This is determined by the distance between the cluster centers, the speeds of the clusters (the average speed calculated from the estimated velocities of the particles) and the cluster headings (the average heading of the particles in the cluster). If two clusters are within 500 m of each other, the difference in their speeds is less than 1 msec and the difference in their headings is less than 20°, then the two clusters are merged and the ID of the oldest cluster is used for all the particles in this cluster.

After each of these checks, the particles in each of the remaining clusters are resampled separately.

Density-Based Clustering

The same clustering technique used in example 1 is utilized in this example as well.

Experimental Results

The performance of the presented two-stage filtering technique multi-target tracking in passive sonar systems is examined with simulated scenarios, as example for the sake of demonstration of the technique. The simulated scenarios were generated using a contact-level simulation. The settings used in this simulation are: (i) Standard deviation of bearing noise is 10 degrees; (ii) Standard deviation of range rate noise (in the cases where it was used) is 0.2 meters/ second; (iii) the detection range of the sonobuoys (i.e. the distance within which the sonobuoy can detect a target) is 1000 meters, i.e. if the target is further from a certain buoy than this distance it is not detected at all by this buoy. For the sake of example only, the sonobuoys' locations were assumed fixed in this simulation, but the present two-stage filtering technique multi-target tracking accepts time varying buoys locations. Furthermore, for the sake of example only, it is assumed that the measurement over one minute are collected and fed to one iteration of the present algorithm, i.e. one iteration of the algorithm will run every minute. This example choice of one minute is suitable for an application with slow targets that are not highly manoeuvrable, which is used here just as example and can be changed based on the application and the nature of targets to be tracked. Furthermore, in this example the predetermined period where the first filter will reset to a uniform distribution is used as five iterations, which is suitable for this application, and can be changed depending on an application and its needs.

For each scenario, two different cases are presented: (i) one with bearing measurements only; and (ii) one with both bearing and range rate (obtained from Doppler) measurements. In case (i), the measurement model of equation (25) is used; while in case (ii) the measurement model of equation (27) is used.

Simulated Scenarios

Third Scenario

The third scenario consists of 16 stationary receivers forming a rectangular grid shape. It contains two targets that move at 2 m/sec speed. The scenario is illustrated in FIG. 38. The first target was inside the surveillance area at the time the algorithm started; while the second target was outside and it keeps moving towards the surveillance area, it enters the detection range of the nearest buoys in the area at the $7^{th}$ iteration of the algorithm, i.e. after seven minutes.

In both cases (i) and (ii), the first target was detected at the $5^{th}$ iteration (when the clustering technique did run for the first time), while the second target was detected at the $15^{th}$ iteration, rather at the $10^{th}$ iteration. The second Mixture PF begun then to track them at the respective iterations when each was detected. The root-mean-square (RMS) position error of the first target (from $5^{th}$ iteration till end) is 167.84 m for case (i) and 59.93 m for case (ii); while its maximum position error (from $5^{th}$ iteration till end) equals 368.31 m for case (i) and 113.90 m for case (ii). The RMS of velocity error of the first target (from $5^{th}$ iteration till end) is 1.05 msec for case (i) and 0.37 msec for case (ii); while its maximum velocity error (from $5^{th}$ iteration till end) equals 3.62 m/sec for case (i) and 0.87 msec for case (ii). The estimated target track of the first target for case (i) is shown in FIG. 39, while the position error along x and y directions are shown in FIG. 40 and FIG. 41 respectively, and the velocity error along x and y directions are shown in FIG. 42 and FIG. 43, The estimated target track of the first target for case (ii) is shown in FIG. 49, while the position error along x and y directions are shown in FIG. 50 and FIG. 51 respectively, and the velocity error along x and y directions are shown in FIG. 52 and FIG. 53. The RMS position error of the second target (from $15^{th}$ iteration till end) is 84.20 m for case (i) and 74.27 m for case (ii); while its maximum position error (from $15^{th}$ iteration till end) equals 201.96 m for case (i) and 130.42 m for case (ii). The RMS of velocity error of the second target (from $15^{th}$ iteration till end) is 0.76 msec for case (i) and 0.38 msec for case (ii); while its maximum velocity error (from $15^{th}$ iteration till end) equals 1.94 msec for case (i) and 1.37 msec for case (ii). The estimated target track of the second target in case (i) is shown in FIG. 44, while the position error along x and y directions are shown in FIG. 45 and FIG. 46 respectively, and the velocity error along x and y directions are shown in FIG. 47 and FIG. 48. The estimated target track of the second target in case (ii) is shown in FIG. 54, while the position error along x and y directions are shown in FIG. 55 and FIG. 56 respectively, and the velocity error along x and y directions are shown in FIG. 57 and FIG. 58.

Fourth Scenario

The fourth scenario consists of 16 stationary receivers forming a rectangular grid shape. It contains four targets that move at 2 m/sec speed. The first and second targets were inside the surveillance area at the time the algorithm started; while the both the third and fourth targets were outside and they keep moving towards the surveillance area, each of them enters the detection range of the respective nearest buoys in the area at the $8^{th}$ iteration of the algorithm, i.e. after eight minutes. This is to demonstrate the ability of the technique to detect any new target in the scenario shortly after its appearance in the surveillance area. Therefore, from the beginning, the technique detect then track 2 targets, and later on it detects then track the third and fourth. The third and fourth targets intersect each other in the midway. The scenario is illustrated in FIG. 59. The motion of targets in this scenario makes it a harsh one as will be discussed below.

For both cases (i) and (ii), the first two targets were detected at the $5^{th}$ iteration when the density based clustering technique was run for the first time and they were tracked by the $2^{nd}$ filter. The third target was detected at the $10^{th}$ iteration, but the fourth target was detected at the $15^{th}$ iteration. Each target was tracked by the 2nd filter in the respective iteration where it was detected. The RMS position error of the first target (from $5^{th}$ iteration till end) is 230.98 m for case (i) and 154.29 m for case (ii); while its maximum position error (from $5^{th}$ iteration till end) equals 607.39 m for case (i) and 347.14 m for case (ii). The RMS of velocity error of the first target (from $5^{th}$ iteration till end) is 1.64 m/sec for case (i) and 0.83 msec for case (ii); while its maximum velocity error (from $5^{th}$ iteration till end) equals 3.46 msec for case (i) and 2.11 msec for case (ii). This target is toward the edge of the grid formed by the sonobuoys and it has four sharp manoeuvres, two of which are outside the grid of buoys while of course are still within detection range of at least one buoy. The estimated target track of the first target for case (i) is shown in FIG. 60, while the position error along x and y directions are shown in FIG. 61 and FIG. 62 respectively, and the velocity error along x and y directions are shown in FIG. 63 and FIG. 64. The estimated target track of the first target for case (ii) is shown in FIG. 80, while the position error along x and y directions are shown in FIG. 81 and FIG. 82 respectively, and the velocity error along x and y directions are shown in FIG. 83 and FIG. 84.

The RMS position error of the second target (from $5^{th}$ iteration till end) is 277.92 m for case (i) and 165.87 m for case (ii); while its maximum position error (from $5^{th}$ iteration till end) equals 535.70 m for case (i) and 314.97 m for case (ii). The RMS of velocity error of the second target (from $5^{th}$ iteration till end) is 1.18 msec for case (i) and 0.52 msec for case (ii); while its maximum velocity error (from $5^{th}$ iteration till end) equals 2.71 msec for case (i) and 1.84 msec for case (ii). The second half of this target trajectory is outside the grid formed by the sonobuoys, while of course are still within detection range of at least one buoy, but it is a straight portion. The estimated target track of the second target for case (i) is shown in FIG. 65, while the position error along x and y directions are shown in FIG. 66 and FIG. 67 respectively, and the velocity error along x and y directions are shown in FIG. 68 and FIG. 69. The estimated target track of the second target for case (ii) is shown in FIG. 85, while the position error along x and y directions are shown in FIG. 86 and FIG. 87 respectively, and the velocity error along x and y directions are shown in FIG. 88 and FIG. 89.

The RMS position error of the third target (from $10^{th}$ iteration till end) is 131.86 m for case (i) and 90.60 m for case (ii); while its maximum position error (from $10^{th}$ iteration till end) equals 271.40 m for case (i) and 144.22 m for case (ii). The RMS of velocity error of the third target (from $10^{th}$ iteration till end) is 0.69 msec for case (i) and 0.59 msec for case (ii); while its maximum velocity error (from $10^{th}$ iteration till end) equals 1.91 msec for case (i) and 2.52 msec for case (ii). The estimated target track of the third target for case (i) is shown in FIG. 70, while the position error along x and y directions are shown in FIG. 71 and FIG. 72 respectively, and the velocity error along x and y directions are shown in FIG. 73 and FIG. 74. The estimated target track of the third target for case (ii) is shown in FIG. 90, while the position error along x and y directions are shown in FIG. 91 and FIG. 92 respectively, and the velocity error along x and y directions are shown in FIG. 93 and FIG. 94.

The RMS position error of the fourth target (from $15^{th}$ iteration till end) is 112.15 m for case (i) and 75.09 m for case (ii); while its maximum position error (from $15^{th}$ iteration till end) equals 233.02 m for case (i) and 198.01 m for case (ii). The RMS of velocity error of the fourth target (from $15^{th}$ iteration till end) is 0.74 msec for case (i) and 0.46 msec for case (ii); while its maximum velocity error (from $15^{th}$ iteration till end) equals 2.82 msec for case (i) and 1.06 msec for case (ii). The estimated target track of the fourth target for case (i) is shown in FIG. 75, while the position error along x and y directions are shown in FIG. 76 and FIG. 77 respectively, and the velocity error along x and y directions are shown in FIG. 78 and FIG. 79. The estimated target track of the fourth target for case (ii) is shown in FIG. 95, while the position error along x and y directions are shown in FIG. 96 and FIG. 97 respectively, and the velocity error along x and y directions are shown in FIG. 98 and FIG. 99.

A large part of the error for the third and fourth targets happens during and after the intersection because of some simultaneous interference between the two clouds of particles belonging to the two clusters.

The first target has four sharp manoeuvres, the second has two, while the third and fourth have no manoeuvres; this is why the position error is larger in the first and second target in the case of bearing only measurements. The manoeuvres, in the current example, are dealt with through the process noise term in the system model. This near constant velocity model with process noise is enough for the targets under consideration in this example which are slow and not highly manoeuvrable or evasive. So, when bearing only is used, the performance during straight portions is in general better than the performance during manoeuvres because of the system model used as an example. When Doppler or its derived range rate information is used, this issue is not as influential as when bearing measurements are the only ones available.

Running Times

To give an idea about the running times and the applicability of this solution for online running in real-life scenarios the following briefing is given. Running this technique for passive systems on an Intel Core 2 Duo P8600 2.4 GHz processor with 4 GB RAM, using MATLAB 2009 takes: (i) Nearly 2.5 sec./iteration for 5000 samples with 30% sampled from observation; (ii) Nearly 1.4 sec./iteration for 5000 samples with 20% sampled from observation. These numbers are from the average of all iterations. Thus this technique can work online on measurement gathered during periods larger than the above number, which is applicable for different applications.

The embodiments of the invention in which an exclusive property or privilege is claimed are defined as follows:

1. A method for detecting and tracking an unknown number and time-varying number of targets within a surveillance area, the method comprising:
    (a) obtaining readings from at least one sensor in the surveillance area, wherein the at least one sensor monitors the surveillance area,
    (b) providing a first non-linear filter for detecting at least one target within the area, wherein the first filter is initialized by a uniform density covering the area, and is reset to said uniform density upon a pre-determined number of iterations,
    (c) providing a clustering technique to detect clusters corresponding to the at least one target, wherein the clustering technique is adapted to operate at said pre-determined iterations, and before said first filter is reset,
    (d) providing a second non-linear filter for tracking the at least one target detected by the first filter which is represented by at least one cluster detected by the clustering technique, and
    wherein the targets are detected and tracked within the surveillance area from the readings of the at least one sensor, wherein the first non-linear filter and the clustering technique can further operate to detect the absence of targets within the surveillance area.

2. The method in claim 1, wherein the first filter is any Particle filter.

3. The method in claim 1, wherein the second filter is Particle filter.

4. The method in claim 2, wherein the first filter is a Mixture Particle filter.

5. The method in claim 3, wherein the second filter is a Mixture Particle filter.

6. The method in claim 1, wherein the clustering technique is a density-based clustering technique.

7. The method in claim 1, wherein the method is used with a passive tracking system.

8. The method in claim 7, wherein the passive tracking system comprises multiple sensors.

9. The method in claim 1, wherein the method is used with an active tracking system.

10. The method in claim 9, where an application of the method is in multistatic active systems.

11. The method in claim 1, wherein obtaining readings from the at least one sensor can happen: (i) in real-time, (ii) online, or (iii) offline by obtaining logged sensor readings.

* * * * *

UNITED STATES PATENT AND TRADEMARK OFFICE
CERTIFICATE OF CORRECTION

Page 1 of 3

PATENT NO. : 9,562,965 B2
APPLICATION NO. : 14/115287
DATED : February 7, 2017
INVENTOR(S) : Georgy et al.

It is certified that error appears in the above-identified patent and that said Letters Patent is hereby corrected as shown below:

On the Title Page

Item (74), delete "Jonathan" and insert therefore --Jonathon--

In the Specification

Column 4, Line 36, delete "targets" and insert therefore --target's--

Column 7, Lines 63 and 64, delete "Providing a First Non-Linear Filter for Detecting at Least One Target." and insert therefore --Providing a first non-linear filter for detecting at least one target.--

Column 8, Lines 13 and 14, delete "Providing a Clustering Technique for Detecting Different Clusters of the at least one Target." and insert therefore --Providing a clustering technique for detecting different clusters of the at least one target.--

Column 8, Lines 21 and 24, delete "Providing a Second Non-Linear Filter for Tracking at Least One Target, Wherein the Second Filter is Further Adapted to Track the Detected Clusters of Targets Determined by the Clustering Techniques." and insert therefore --Providing a second non-linear filter for tracking the at least one target, wherein the second filter is further adapted to track the detected clusters of targets determined by the clustering technique.--

Column 21, Line 38, delete "msec" and insert therefore --m/sec--

Column 22, Line 56, delete "msec" and insert therefore --m/sec--

Column 22, Line 57, delete "msec" and insert therefore --m/sec--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*

Column 22, Line 65, delete "msec" and insert therefore --m/sec--

Column 22, Line 67, delete "msec" and insert therefore --m/sec--

Column 23, Line 23, delete "msec" and insert therefore --m/sec--

Column 23, Line 25, delete "msec" and insert therefore --m/sec--

Column 23, Line 50, delete "msec" and insert therefore --m/sec--

Column 23, Line 51, delete "msec" and insert therefore --m/sec--

Column 23, Line 59, delete "msec" and insert therefore --m/sec--

Column 23, Line 60, delete "msec" and insert therefore --m/sec--

Column 24, Line 1, delete "msec" and insert therefore --m/sec--

Column 24, Line 3, delete "msec" and insert therefore --m/sec--

Column 30, Line 48, delete "msec" and insert therefore --m/sec--

Column 31, Line 46, delete "msec" and insert therefore --m/sec--

Column 31, Line 47, delete "msec" and insert therefore --m/sec--

Column 31, Line 49, delete "msec" and insert therefore --m/sec--

Column 31, Line 63, delete "msec" and insert therefore --m/sec--

Column 31, Line 64, delete "msec" and insert therefore --m/sec--

Column 31, Line 65, delete "msec" and insert therefore --m/sec--

Column 31, Line 66, delete "msec" and insert therefore --m/sec--

Column 32, Line 37, delete "msec" and insert therefore --m/sec--

Column 32, Line 39, delete "3.46 msec" and insert therefore --3.46 m/sec--

Column 32, Line 39, delete "2.11 msec" and insert therefore --2.11 m/sec--

Column 32, Line 57, delete "msec" and insert therefore --m/sec--
Column 32, Line 58, delete "msec" and insert therefore --m/sec--

CERTIFICATE OF CORRECTION (continued)
U.S. Pat. No. 9,562,965 B2

Column 32, Line 59, delete "msec" and insert therefore --m/sec--

Column 32, Line 60, delete "msec" and insert therefore --m/sec--

Column 33, Line 10, delete "msec" and insert therefore --m/sec--

Column 33, Line 11, delete "msec" and insert therefore --m/sec--

Column 33, Line 12, delete "msec" and insert therefore --m/sec--

Column 33, Line 13, delete "msec" and insert therefore --m/sec--

Column 33, Line 27, delete "msec" and insert therefore --m/sec--

Column 33, Line 28, delete "msec" and insert therefore --m/sec--

Column 33, Line 29, delete "msec" and insert therefore --m/sec--

Column 33, Line 30, delete "msec" and insert therefore --m/sec--

In the Claims

Column 34, Line 39, delete "any" and insert therefore --a--

Column 34, Lines 41-42, delete "is Particle" and insert therefore --is a Particle--